(12) United States Patent
Altman

(10) Patent No.: US 11,873,005 B2
(45) Date of Patent: Jan. 16, 2024

(54) DEVICE, SYSTEM, AND METHOD OF WIRELESS MULTIPLE-LINK VEHICULAR COMMUNICATION

(71) Applicant: DRIVEU TECH LTD., Kfar Saba (IL)

(72) Inventor: Baruch Yosef Altman, Pardes Hanna (IL)

(73) Assignee: DRIVEU TECH LTD., Kfar Saba (IL)

( * ) Notice: Subject to any disclaimer, the term of this patent is extended or adjusted under 35 U.S.C. 154(b) by 236 days.

(21) Appl. No.: 16/494,295

(22) PCT Filed: Dec. 10, 2017

(86) PCT No.: PCT/IL2017/051331
§ 371 (c)(1),
(2) Date: Sep. 15, 2019

(87) PCT Pub. No.: WO2018/211488
PCT Pub. Date: Nov. 22, 2018

(65) Prior Publication Data
US 2021/0114616 A1    Apr. 22, 2021

Related U.S. Application Data

(60) Provisional application No. 62/553,931, filed on Sep. 4, 2017, provisional application No. 62/507,805, filed on May 18, 2017.

(51) Int. Cl.
*B60W 60/00* (2020.01)
*H04W 36/00* (2009.01)
(Continued)

(52) U.S. Cl.
CPC ..... *B60W 60/0011* (2020.02); *G01C 21/3461* (2013.01); *G01C 21/3848* (2020.08);
(Continued)

(58) Field of Classification Search
CPC ......... B60W 60/0011; B60W 2420/42; B60W 2420/52; B60W 2556/50; G01C 21/3461;
(Continued)

(56) References Cited

U.S. PATENT DOCUMENTS 5,280,470 A    1/1994 Buhrke et al.
5,574,970 A    11/1996 Lindquist et al.
(Continued)

FOREIGN PATENT DOCUMENTS

CA    2664349 C    2/2014
CN    1606857      4/2005
(Continued)

OTHER PUBLICATIONS

Machine Translation of JP 2002010332 Generated online at Japanese patent office website on May 1, 2013.
(Continued)

*Primary Examiner* — Nga X Nguyen
(74) *Attorney, Agent, or Firm* — BROWDY AND NEIMARK, P.L.L.C.

(57) ABSTRACT

Devices, system, and method of vehicular multiple-link wireless communication. A vehicular communication bonding unit creates a bonded wireless communication connection that transports data-packets of a source data-stream from a remote server to a vehicular transceiver, by transporting the data-packets over at least two wireless communication links. The vehicular communication bonding unit utilizes a vehicular cellular transceiver to receive a first batch of the data-packets over a first cellular communication link that connects between the vehicular cellular transceiver and the remote server. The vehicular communication bonding unit further utilizes least one end-user device, of an occupant of a vehicle, to receive a second batch of the data-packets of the particular data-stream, over a second (Continued)

cellular communication link that connects between the end-user device and the remote server.

38 Claims, 4 Drawing Sheets

(51) Int. Cl.
    *H04W 76/15*     (2018.01)
    *H04N 21/414*     (2011.01)
    *H04N 21/4363*     (2011.01)
    *H04N 21/61*     (2011.01)
    *H04N 21/4402*     (2011.01)
    *H04N 21/462*     (2011.01)
    *G01C 21/00*     (2006.01)
    *G01C 21/34*     (2006.01)
    *G05D 1/00*     (2006.01)
    *G01S 17/931*     (2020.01)
    *G01S 17/86*     (2020.01)

(52) U.S. Cl.
    CPC ....... *G01C 21/3889* (2020.08); *G05D 1/0011* (2013.01); *H04N 21/41422* (2013.01); *H04N 21/43637* (2013.01); *H04N 21/4402* (2013.01); *H04N 21/4621* (2013.01); *H04N 21/6131* (2013.01); *H04N 21/6143* (2013.01); *H04W 36/00837* (2018.08); *H04W 76/15* (2018.02); *B60W 2420/42* (2013.01); *B60W 2420/52* (2013.01); *B60W 2556/50* (2020.02); *G01S 17/86* (2020.01); *G01S 17/931* (2020.01)

(58) Field of Classification Search
    CPC ............ G01C 21/3848; G01C 21/3889; G05D 1/0011; H04N 21/41422; H04N 21/43637; H04N 21/4402; H04N 21/4621; H04N 21/6131; H04N 21/6143; H04N 21/43615; H04W 36/00837; H04W 76/15; H04W 84/005; H04W 36/0083; H04W 8/205; H04W 40/02; G01S 17/86; G01S 17/931; Y02D 30/70
    See application file for complete search history.

(56) References Cited

U.S. PATENT DOCUMENTS

| | | | |
|---|---|---|---|
| 5,699,413 A | 12/1997 | Sridhar | |
| 5,771,229 A | 6/1998 | Gavrilovich | |
| 5,918,021 A | 6/1999 | Aditya | |
| 6,154,637 A | 11/2000 | Wright et al. | |
| 6,169,896 B1 | 1/2001 | Sant et al. | |
| 6,288,753 B1 | 9/2001 | DeNicola et al. | |
| 6,496,477 B1 | 12/2002 | Perkins | |
| 6,510,553 B1 | 1/2003 | Hazra | |
| 6,647,015 B2 | 11/2003 | Malkemes et al. | |
| 6,683,877 B1 | 1/2004 | Gibbs et al. | |
| 6,754,872 B2 | 6/2004 | Zhang et al. | |
| 6,757,256 B1 | 6/2004 | Anandakumar et al. | |
| 6,785,330 B1 | 8/2004 | Whealton et al. | |
| 6,788,686 B1 | 9/2004 | Khotimsky et al. | |
| 6,801,508 B1 | 10/2004 | Lim | |
| 6,831,574 B1 | 12/2004 | Mills et al. | |
| 6,842,446 B2 | 1/2005 | Everson et al. | |
| 6,904,049 B1 | 6/2005 | Maeda | |
| 6,987,732 B2 | 1/2006 | Gracon et al. | |
| 6,999,432 B2 | 2/2006 | Zhang et al. | |
| 7,013,354 B1 | 3/2006 | Beck et al. | |
| 7,027,415 B1 | 4/2006 | Dahlby et al. | |
| 7,082,221 B1 | 7/2006 | Jiang | |
| 7,151,762 B1 | 12/2006 | Ho et al. | |
| 7,237,032 B2 | 6/2007 | Gemmell | |
| 7,237,033 B2 | 6/2007 | Weigand et al. | |
| 7,292,571 B2 | 11/2007 | Brown | |
| 7,317,750 B2 | 1/2008 | Shattil | |
| 7,324,491 B1 | 1/2008 | Benveniste | |
| 7,340,764 B2 | 3/2008 | Kubota et al. | |
| 7,542,456 B2 | 6/2009 | Garg et al. | |
| 7,551,671 B2 | 6/2009 | Tyldesley et al. | |
| 7,738,391 B2 | 6/2010 | Melpignano et al. | |
| 7,894,807 B1 | 2/2011 | Drennan | |
| 7,948,933 B2 | 5/2011 | Ohayon | |
| 8,125,989 B2 | 2/2012 | Kissel | |
| 8,165,044 B2 | 4/2012 | Mahajan et al. | |
| 8,204,085 B1 | 6/2012 | Courtney et al. | |
| 8,467,337 B1 | 6/2013 | Phayon | |
| 8,488,659 B2 | 7/2013 | Ohayon | |
| 8,649,402 B2 | 2/2014 | Ohayon | |
| 8,737,436 B2 | 5/2014 | Ohayon | |
| 8,787,966 B2 | 7/2014 | Altman | |
| 8,811,292 B2 | 8/2014 | Ohayon | |
| 8,831,780 B2 | 9/2014 | Zelivinski | |
| 8,848,697 B2 | 9/2014 | Ohayon | |
| 8,942,179 B2 | 1/2015 | Ohayon | |
| 8,942,215 B2 | 1/2015 | Mallet | |
| 8,964,646 B2 | 2/2015 | Ohayon | |
| 8,984,576 B2 | 3/2015 | Sze | |
| 9,042,444 B2 | 5/2015 | Frusina | |
| 9,154,247 B2 | 10/2015 | Altman | |
| 9,203,498 B2 | 12/2015 | Ohayon | |
| 9,237,490 B2 | 1/2016 | Pereira | |
| 9,277,176 B2 | 3/2016 | Khay-Ibbat | |
| 9,338,650 B2 | 5/2016 | Stein | |
| 9,357,427 B2 | 5/2016 | Sze | |
| 9,369,921 B2 | 6/2016 | Altman | |
| 9,379,756 B2 | 6/2016 | Altman | |
| 9,538,513 B2 | 1/2017 | Ohayon | |
| 9,692,913 B2 | 6/2017 | Altman | |
| 9,712,267 B2 | 7/2017 | Altman | |
| 9,736,079 B2 | 8/2017 | Sze | |
| 9,756,468 B2 | 9/2017 | Frusina | |
| 9,826,565 B2 | 11/2017 | Ohayon | |
| 9,980,171 B2 | 5/2018 | Stein | |
| 10,086,782 B1* | 10/2018 | Konrardy | G05D 1/0255 |
| 10,153,854 B2 | 12/2018 | Altman | |
| 10,194,034 B2 | 1/2019 | Altman | |
| 10,206,143 B2 | 2/2019 | Altman | |
| 10,349,462 B2 | 7/2019 | Altman | |
| 2002/0040479 A1 | 4/2002 | Ehrman et al. | |
| 2002/0054578 A1 | 5/2002 | Zhang et al. | |
| 2002/0071393 A1 | 6/2002 | Musoll | |
| 2002/0146232 A1 | 10/2002 | Harradine et al. | |
| 2002/0154703 A1 | 10/2002 | Kubota et al. | |
| 2002/0174434 A1 | 11/2002 | Lee et al. | |
| 2002/0176482 A1 | 11/2002 | Chien | |
| 2003/0002577 A1 | 1/2003 | Pinder | |
| 2003/0009717 A1 | 1/2003 | Fukushima et al. | |
| 2003/0016770 A1 | 1/2003 | Trans et al. | |
| 2003/0046708 A1 | 3/2003 | Jutzi | |
| 2003/0074554 A1 | 4/2003 | Roach et al. | |
| 2003/0174733 A1 | 9/2003 | Kawai et al. | |
| 2004/0013192 A1 | 1/2004 | Kennedy | |
| 2004/0023652 A1 | 2/2004 | Shah et al. | |
| 2004/0025186 A1 | 2/2004 | Jennings et al. | |
| 2004/0088634 A1 | 5/2004 | Kim et al. | |
| 2004/0098748 A1 | 5/2004 | Bo et al. | |
| 2004/0133917 A1 | 7/2004 | Schilling | |
| 2004/0135879 A1 | 7/2004 | Stacy et al. | |
| 2004/0177155 A1 | 9/2004 | Enokida et al. | |
| 2004/0180696 A1 | 9/2004 | Foore et al. | |
| 2005/0034155 A1 | 2/2005 | Gordon et al. | |
| 2005/0035368 A1 | 2/2005 | Bunyk | |
| 2005/0041586 A1 | 2/2005 | Jiang | |
| 2005/0047363 A1 | 3/2005 | Jiang | |
| 2005/0066033 A1 | 3/2005 | Cheston | |
| 2005/0105815 A1 | 5/2005 | Zhang et al. | |
| 2005/0163093 A1 | 7/2005 | Garg et al. | |
| 2005/0169177 A1 | 8/2005 | Park | |
| 2005/0185621 A1 | 8/2005 | Sivakumar | |
| 2005/0243835 A1 | 11/2005 | Sharma | |
| 2005/0265383 A1 | 12/2005 | Melpignano et al. | |
| 2006/0015637 A1 | 1/2006 | Chung | |

(56) References Cited

U.S. PATENT DOCUMENTS

| | | |
|---|---|---|
| 2006/0015917 A1 | 1/2006 | Rozental |
| 2006/0015924 A1 | 1/2006 | Kortum et al. |
| 2006/0062242 A1 | 3/2006 | Dacosta |
| 2006/0062243 A1 | 3/2006 | Dacosta |
| 2006/0085551 A1 | 4/2006 | Xie et al. |
| 2006/0088092 A1 | 4/2006 | Chen et al. |
| 2006/0098573 A1 | 5/2006 | Beer |
| 2006/0146831 A1 | 7/2006 | Argyropoulos et al. |
| 2006/0221846 A1 | 10/2006 | Dyck et al. |
| 2006/0264184 A1 | 11/2006 | Li et al. |
| 2006/0274773 A1 | 12/2006 | Cohen et al. |
| 2007/0064811 A1 | 3/2007 | Zador et al. |
| 2007/0064949 A1 | 3/2007 | Choi et al. |
| 2007/0083899 A1 | 4/2007 | Compton et al. |
| 2007/0098007 A1 | 5/2007 | Prodan et al. |
| 2007/0121678 A1 | 5/2007 | Brooks et al. |
| 2007/0124773 A1 | 5/2007 | Morris |
| 2007/0136777 A1 | 6/2007 | Hasek et al. |
| 2007/0171928 A1 | 7/2007 | Kim et al. |
| 2007/0183452 A1 | 8/2007 | Hryszko et al. |
| 2007/0207782 A1 | 9/2007 | Tran |
| 2007/0207832 A1 | 9/2007 | Gerardi et al. |
| 2007/0230475 A1 | 10/2007 | Langner |
| 2007/0247515 A1 | 10/2007 | Roman |
| 2007/0263072 A1 | 11/2007 | Lochbaum et al. |
| 2007/0268876 A1 | 11/2007 | Yellin et al. |
| 2008/0025210 A1 | 1/2008 | Honary et al. |
| 2008/0034396 A1 | 2/2008 | Lev |
| 2008/0075031 A1 | 3/2008 | Ohayon |
| 2008/0285555 A1 | 11/2008 | Ogashara |
| 2008/0320501 A1 | 12/2008 | Li |
| 2010/0299703 A1 | 11/2010 | Altman |
| 2010/0322259 A1 | 12/2010 | Garg et al. |
| 2012/0008496 A1* | 1/2012 | Saavedra .............. H04L 45/123 370/231 |
| 2012/0039391 A1 | 2/2012 | Frusina |
| 2012/0195259 A1 | 8/2012 | Ohayon |
| 2013/0088961 A1 | 4/2013 | Ramachandran |
| 2013/0142234 A1 | 6/2013 | Ohayon |
| 2013/0145404 A1 | 6/2013 | Ohayon |
| 2013/0155231 A1 | 6/2013 | Ohayon |
| 2013/0227670 A1 | 8/2013 | Ahmad |
| 2013/0242873 A1 | 9/2013 | Ohayon |
| 2013/0276044 A1 | 10/2013 | Ohayon |
| 2013/0301584 A1* | 11/2013 | Addepalli ............. H04W 76/45 370/329 |
| 2013/0307980 A1* | 11/2013 | Stone .................... H04N 7/185 348/148 |
| 2013/0310108 A1 | 11/2013 | Altman |
| 2014/0036781 A1 | 2/2014 | Ohayon |
| 2014/0040442 A1 | 2/2014 | Saavedra |
| 2014/0105115 A1 | 4/2014 | Ohayon |
| 2014/0112191 A1 | 4/2014 | Farkas |
| 2014/0220966 A1 | 8/2014 | Muetzel |
| 2014/0269553 A1 | 9/2014 | Stein |
| 2014/0274064 A1 | 9/2014 | Al-Shalash |
| 2014/0355446 A1 | 12/2014 | Altman |
| 2014/0376370 A1 | 12/2014 | Cioffi |
| 2015/0003465 A1 | 1/2015 | Saavedra |
| 2015/0057044 A1 | 2/2015 | Altman |
| 2015/0089020 A1 | 3/2015 | Altman |
| 2015/0124752 A1 | 5/2015 | Ohayon |
| 2015/0215738 A1* | 7/2015 | Frusina ............. H04N 21/64723 455/552.1 |
| 2015/0215840 A1 | 7/2015 | Mu |
| 2015/0244580 A1 | 8/2015 | Saavedra |
| 2015/0263991 A1 | 9/2015 | Macchiano |
| 2015/0271534 A1 | 9/2015 | Altman |
| 2016/0014176 A1 | 1/2016 | Ariav |
| 2016/0057749 A1 | 2/2016 | Ohayon |
| 2016/0255531 A1 | 9/2016 | Stein |
| 2016/0255541 A1 | 9/2016 | Altman |
| 2016/0261756 A1 | 9/2016 | Altman |
| 2016/0373220 A1 | 12/2016 | Raniere |
| 2017/0078945 A1 | 3/2017 | Ma |
| 2017/0086244 A1 | 3/2017 | Ohayon |
| 2017/0195208 A1 | 7/2017 | Kissel |
| 2017/0251515 A1 | 8/2017 | Altman |
| 2017/0264752 A1 | 9/2017 | Altman |
| 2017/0288799 A1 | 10/2017 | Altman |
| 2017/0347236 A1* | 11/2017 | Frusina ............... G06F 9/44505 |
| 2018/0242185 A1 | 8/2018 | Stein |
| 2019/0074919 A1 | 3/2019 | Altman |
| 2019/0149667 A1 | 5/2019 | Altman |
| 2019/0150035 A1 | 5/2019 | Altman |
| 2019/0312815 A1 | 10/2019 | Altman |

FOREIGN PATENT DOCUMENTS

| | | |
|---|---|---|
| CN | 101584157 B | 12/2013 |
| CN | 105722016 A | 6/2016 |
| CN | 106034340 A | 10/2016 |
| CN | 106063330 A | 10/2016 |
| CN | 103414917 B | 4/2017 |
| EP | 1976202 A2 | 10/2008 |
| EP | 2074762 B1 | 4/2015 |
| EP | 2978182 A1 | 1/2016 |
| EP | 3079293 A1 | 10/2016 |
| GB | 2428529 | 1/2007 |
| IL | 197687 | 7/2013 |
| JP | H 10-41954 | 2/1998 |
| JP | 2000216815 | 8/2000 |
| JP | 2000333231 | 11/2000 |
| JP | 2002010332 | 1/2002 |
| JP | 2002152310 | 5/2002 |
| JP | 2002344965 | 11/2002 |
| JP | 2003152787 | 5/2003 |
| JP | 2005065207 | 3/2005 |
| JP | 2005341310 | 12/2005 |
| KR | 101223950 B1 | 1/2013 |
| WO | 03 036886 | 5/2003 |
| WO | 2003098850 | 11/2003 |
| WO | 2005/048044 A2 | 5/2005 |
| WO | 2005055524 | 6/2005 |
| WO | 2005060300 | 6/2005 |
| WO | 2005109789 | 11/2005 |
| WO | 2008/038261 A2 | 4/2008 |
| WO | 2009093252 | 7/2009 |
| WO | 2011075739 | 6/2011 |
| WO | 2013/171648 A1 | 11/2013 |
| WO | 2014/036640 A1 | 3/2014 |
| WO | 2014/055680 A2 | 4/2014 |
| WO | 2015/188935 A1 | 12/2015 |
| WO | 2016/038611 A1 | 3/2016 |
| WO | 2018/203336 A1 | 11/2018 |

OTHER PUBLICATIONS

Machine Translation of JP 2005065207 Generated online at Japanese patent office website on May 1, 2013.

Machine Translation of JP 2002344965 Generated online at Japanese patent office website on May 1, 2013.

Machine Translation of JP 2003152787 Generated online at Japanese patent office website on May 21, 2014.

Machine Translation of JP 2005341310 A Obtained from "Google Patents" on Jul. 23, 2019.

Machine Translation of JP 2000216815 A Obtained from "Google Patents" on Jul. 23, 2019.

Machine Translation of JP H 10-41954 A Obtained from "Google Patents" on Jul. 23, 2019.

Machine Translation of JP 2000333231 A Obtained from "Google Patents" on Jul. 23, 2019.

Machine Translation of JP 2002152310 A Obtained from "Google Patents" on Jul. 23, 2019.

Machine Translation of CN 1606857 A Obtained from "Google Patents" on Jul. 23, 2019.

Bibliographical Data and Abstract of HK 1137278 (A1) Printed from Espacenet on Jul. 23, 2019.

Masayoshi Kobayashi et al., "Maturing of Open Flow and Software-defined Networking through deployments", Computer Networks 61 (2014) 151-175.

(56) References Cited

OTHER PUBLICATIONS

Ford et al., "TCP Extensions for Multipath Operation with Multiple Addresses", Internet Engineering Task Force (IETF), draft IETF mptcp rfc-6824-bis-09, Jul. 28, 2017.
Internet Engineering Task Force (IETF), "Threat Analysis for TCP Extensions for Multipath Operation with Multiple Addresses", Request for Comments (RFC) 6181, Mar. 2011.
Internet Engineering Task Force (IETF), "Analysis of Residual Threats and Possible Fixes for Multipath TCP (MPTCP)", Request for Comments (RFC) 7430, Jul. 2015.
First Office Action dated Jun. 17, 2021, in Chinese Patent Application No. 2017800900859.
Machine Translation of First Office Action dated Jun. 17, 2021, in Chinese patent application No. 2017800900859 ; translation obtained using "Google Translate" dated Jul. 1, 2021.
First Office Action dated Oct. 17, 2021 in Israeli patent application No. 269277.
English Summary of the First Office Action dated Oct. 17, 2021 in Israeli patent application No. 269277; summary dated Nov. 7, 2021.
Notice of Allowance dated Oct. 11, 2021 in Chinese Patent Application No. 2017800900859.
English translation of Notice of Allowance dated Oct. 11, 2021 in Chinese Patent Application No. 2017800900859.
Extended European Search Report (EESR) in European patent application No. EP 17910418, dated Nov. 19, 2020.
Notice of Intent to Grant a European Patent, mailed by the European Patent Office (EPO) in European patent application No. EP 17910418.7 dated May 16, 2023; with its appendices.
Notice Before Allowance in Israel patent application No. 269277, mailed by the Israel Patent Office dated Feb. 23, 2023; and its brief summary in English.
Communication from the European Patent Office (EPO) in European patent application No. EP 17910418.7, dated Apr. 4, 2022.
Raid Y. Zaghal and Javed I. Khan, "EFSM/SDL modeling of the original TCP standard (RFC793) and the Congestion Control Mechanism of TCP Reno", Jan. 2005; downloaded on Jul. 15, 2019 from: www.medianet.kent.edu/techreports/TR2005-07-22-tcp-EFSM.pdf.
Quentin De Coninck and Olivier Bonaventure, "Multipath QUIC: Design and Evaluation", 13th International Conference on emerging Networking Experiments and Technologies (CoNEXT 2017), Dec. 12-15, 2017; Downloaded from: https://multipath-quic.org.
International Search Report for PCT application PCT/IL2017/051331, dated Mar. 13, 2018.
Written Opinion of the International Searching Authority for PCT application PCT/IL2017/051331, dated Mar. 13, 2018.
Wikipedia, "TCP Congestion Control", downloaded from the Internet on Jul. 14, 2019 from: https://en.wikipedia.org/wiki/TCP_congestion_control.
Wikipedia, "Head of-line blocking", downloaded from the Internet on Jul. 15, 2019 from: https://en.wikipedia.org/wiki/Head-of-line_blocking.
Wikipedia, "Multipath TCP", downloaded from the Internet on Jul. 15, 2019 from: https://en.wikipedia.org/wiki/Multipath_TCP.
Wikipedia, "Transmission Control Protocol", printed on Jul. 16, 2019 from: https://en.wikipedia.org/wiki/Transmission_Control_Protocol.
The Internet Engineering Task Force (IETF), "TCP Congestion Control", Request For Comments (RFC) 5681, Sep. 2009.
Information Sciences Institute—University of Southern California, "Transmission Control Protocol", Request For Comments (RFC) 793, Sep. 1981.
Information Sciences Institute—University of Southern California, "Internet Protocol", Request For Comments (RFC) 791, Sep. 1981.
Network Working Group, "TCP Extensions for High Performance", Request For Comments (RFC) 1323, May 1992.
Network Working Group, "TCP Selective Acknowledgment Options", Request For Comments (RFC) 2018, Oct. 1996.
Network Working Group, "The TCP Maximum Segment Size and Related Topics", Request For Comments (RFC) 879, Nov. 1983.
Internet Engineering Task Force (IETF), "The NewReno Modification to TCP's Fast Recovery Algorithm", Request For Comments (RFC) 6582, Apr. 2012.
Network Working Group, "TCP Slow Start, Congestion Avoidance, Fast Retransmit, and Fast Recovery Algorithms", Request For Comments (RFC) 2001, Jan. 1997.
Network Working Group, "Increasing TCP's Initial Window", Request For Comments (RFC) 3390, Oct. 2002.
Network Working Group, "TCP Extensions for Long-Delay Paths", Request For Comments (RFC) 1072, Oct. 1988.
Network Working Group, "TCP Congestion Control", Request For Comments (RFC) 2581, Apr. 1999.
Internet Engineering Task Force (IETF), "TCP Extensions for Multipath Operation with Multiple Addresses", Request For Comments (RFC) 6824, Jan. 2013.
Internet Engineering Task Force (IETF), "Coupled Congestion Control for Multipath Transport Protocols", Request For Comments (RFC) 6356, Oct. 2011.
Internet Engineering Task Force (IETF), "Architectural Guidelines for Multipath TCP Development", Request For Comments (RFC) 6182, Mar. 2011.
Internet Engineering Task Force (IETF), "Multipath TCP (MPTCP) Application Interface Considerations", Request For Comments (RFC) 6897, Mar. 2013.
Internet Engineering Task Force (IETF), "Use Cases and Operational Experience with Multipath TCP", Request For Comments (RFC) 8041, Jan. 2017.
Institute of Electrical and Electronics Engineers (IEEE), "Part 3: Carrier sense multiple access with collision detection (CSMA/CD) access method and physical layer specifications", Standard 802.3, Mar. 2000 Edition; Clause 43, "Link Aggregation", pp. 1254 to 1317.
Institute of Electrical and Electronics Engineers (IEEE), "Information technology—Telecommunications and information—exchange between systems—Local and metropolitan area networks—Specific requirements—Part 1AX: Link Aggregation", IEEE standard 802.1AX, First Edition, Jan. 15, 2016; "Table of Contents", pp. (i) to (xx).

* cited by examiner

DEVICE, SYSTEM, AND METHOD OF WIRELESS MULTIPLE-LINK VEHICULAR COMMUNICATION

CROSS-REFERENCE TO RELATED APPLICATIONS

This patent application is a National Stage of PCT international application number PCT/IL2017/051331, having an international filing date of Dec. 10, 2017, published as international publication number WO 2018/211488 A1, which is hereby incorporated by reference in its entirety. The above-mentioned PCT/IL2017/051331 claims benefit and priority from U.S. provisional patent application No. 62/507,805, filed on May 18, 2017, which is hereby incorporated by reference in its entirety; and from U.S. provisional patent application No. 62/553,931, filed on Sep. 4, 2017, which is hereby incorporated by reference in its entirety.

FIELD

The invention relates to the field of wireless communication and cellular communication.

BACKGROUND

Millions of people utilize portable electronic devices every day. For example, smartphones are utilized for placing and receiving phone calls, for browsing the Internet, for playing games, for capturing images and video clips, for engaging in Instant Messaging (IM), and for other purposes. Similarly, millions of users utilize tablet devices on a daily basis, to perform similar tasks.

SUMMARY

The present invention includes devices, systems, and methods of wireless multiple-link vehicular communication.

For example a vehicular communication bonding unit creates a bonded wireless communication connection, which transports data-packets of a source data-stream from a remote server to a vehicular transceiver, by transporting the data-packets over at least two wireless communication links. The vehicular communication bonding unit utilizes a vehicular cellular transceiver to receive a first batch of the data-packets over a first cellular communication link that connects between the vehicular cellular transceiver and the remote server. The vehicular communication bonding unit further utilizes least one device, of an occupant of a vehicle, to receive a second batch of the data-packets of the particular data-stream, over a second cellular communication link that connects between the end-user device and the remote server.

The present invention may provide other and/or additional benefits or advantages.

DETAILED DESCRIPTION OF SOME DEMONSTRATIVE EMBODIMENTS OF THE PRESENT INVENTION

Figure 1:
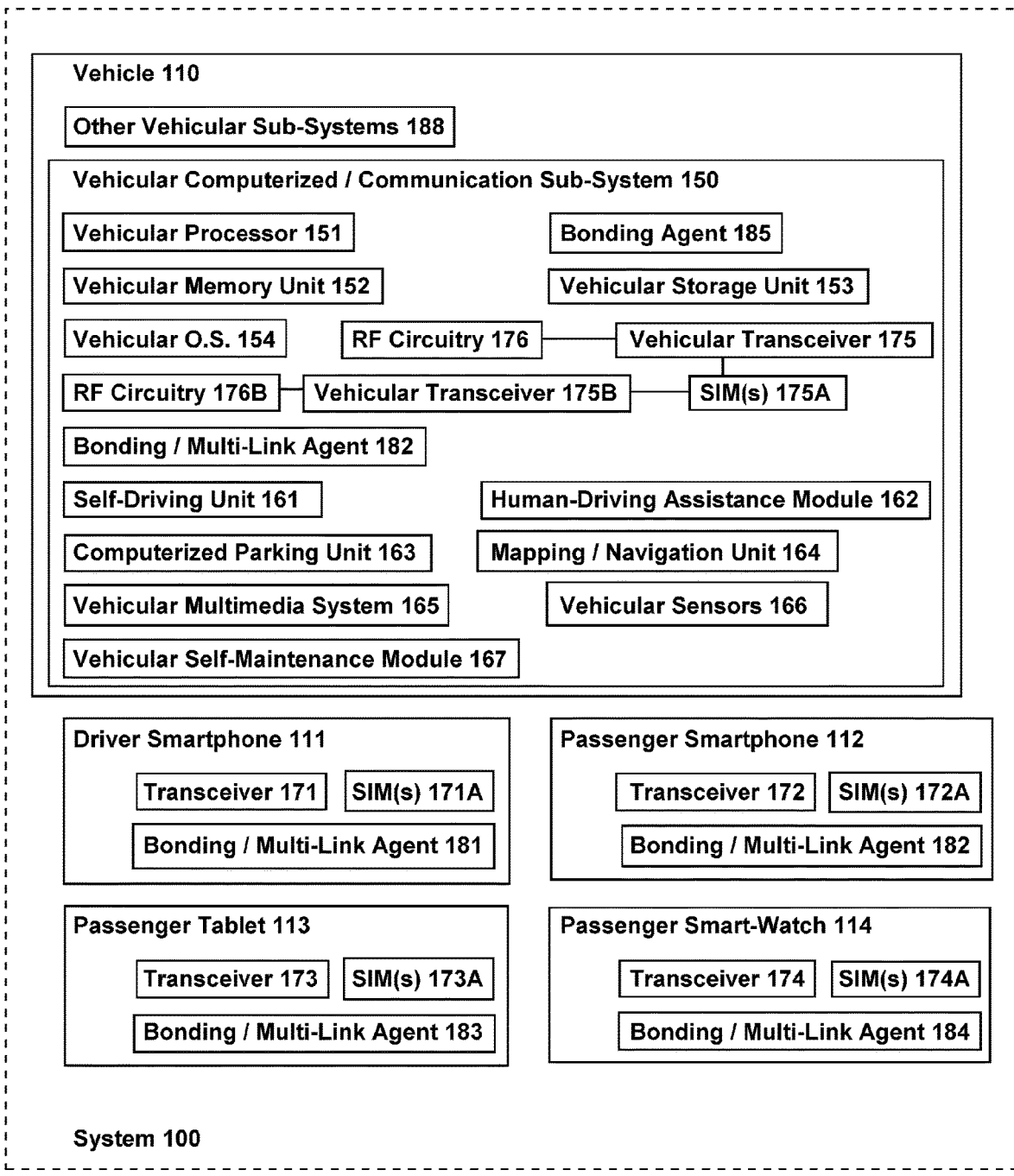
FIG. 1 is a schematic block-diagram illustration of a system, in accordance with some demonstrative embodiments of the present invention.

The present invention includes an apparatus, method and system for using multiple links and/or Internet Protocol based (IP-based) connections and/or modems (e.g., cellular modems, Wi-Fi modems, satellite modems, V2X modems) and/or transceivers (e.g., cellular transceivers, Wi-Fi transceivers, satellite transceivers, 802.11p transceivers) and/or operators (e.g., cellular operators or cellular communication providers, wireless communication operators or providers, satellite networks operators or providers, IoT networks operators or providers, V2X or V2V networks operators or providers; all of these may be referred to herein as "operators" or "network operators" or "providers"), simultaneously or at least partially concurrently, and/or to provide reliable or enhanced or augmented broadband or throughput as well as high-speed or high-quality wireless communication, in transportation in general, as well as in a Connected Car, Smart Car, Smart Vehicle, Autonomous Vehicles (e.g., able to travel via land, sea, air), self-driving car or vehicle or boat or airplane or aircraft or drone, or wheelchair, trains, busses, trucks, tractors, utility vehicles, motorcycles, bicycles and/or in motor vehicles and cars and automobiles in particular or any device used to move from one point to another (all of these may be referred to herein as "vehicles" or "vehicle").

The Applicants have realized that many mobile devices operating on standard communication networks, such as cellular networks, Wi-Fi networks, satellite networks, IoT networks, V2X (Vehicle to Anything) networks or wire lines (e.g., utilizing cable modems, fiber, DSL, ADSL, xDSL), are limited in the geographical areas in which they have coverage (or "reception") from their network operator, and/or in their actual or effective download/upload rate(s). In addition, even in areas wherein the mobile device has relatively good service, a typical transmission rate, or "goodput" or goodput or bandwidth or throughput, or Quality of Service or Quality of Experience or their equivalent measures, to or from the mobile device, may not be sufficient for the desired applications or experiences that the user, or vehicle, or service provider wants to utilize, manually or automatically and/or autonomously.

The Applicants have further realized that these problems may be aggravated in transportation or while the device is being utilized within a moving car or vehicle. For example, In non-mass transportation, such as vehicular, motorcycles, drones, or the like, passengers such as the family children riding in the car may require more and more bandwidth for their mobile devices and applications, such as for the purposes of watching video, or transmitting (or sharing) video clips of themselves or of the surrounding, including High Definition (HD) video, 3D video, 360 degrees video, Virtual Reality (VR), Augmented Reality (AR), immersive media content or other rich-media content. The vehicle itself or related applications or software modules may require or may prefer to be connected to the Internet with sufficient broadband goodput (or throughput) for their own operation, management, maintenance and monitoring, and/or for various vehicular applications (e.g., vehicular route guidance, vehicular mapping, remote or Over-The-Air upgrades, handling the vehicle by a remote handler or driver, or the like); particularly in a "Connected Car" type of vehicle, the autonomous car or vehicle (of any level of autonomy such as in accordance with a five-level model of autonomy or other models), or in an Internet-of-Things (IoT) type of vehicle or vehicle-carried equipment.

The Applicants have also realized that in mass transportation or public transportation, such as in a bus, train, subway, shuttle, ferryboat, or the like, these problems are further aggravated by the multitude of commuters that share the same vehicle. In some cases, the available bandwidth is even further limited by Radio Frequency (RF) phenomena such as reflections or fading, or cross interference among multiple transceivers of multiple devices, or by congestion or cell congestion, or by congested traffic, or failures of certain cellular infrastructure segments, or terror attacks, or weather conditions, or other factors.

The Applicants have realized that some vehicles or vehicle-carried equipment may be equipped with a cellular modem or cellular transceiver, or satellite modem or terminal, or V2V or V2X transceivers, or IoT transceivers either from the manufacturer or from another provider along the supply chain, including after-market sources or vendors. Such conventional modem is used to provide communications for the car's own applications, such as remote uploading or updating of software into the car's computerized units, monitoring the car's status, placing of emergency calls, some digital services via the car media system, navigation applications, mapping applications, route guidance applications, driving or handling or assisting by a remote handler, radio, or the like. In mass transportation, some conventional systems utilize satellite connectivity (e.g., for trains), multiple cellular modems for trains, near-shore ships, or the like, or for the passenger usage.

The Applicants have realized that broadband connection and/or reliable connection and/or high-quality connection and/or high-throughput connection may be needed even more in autonomous cars or self-driving vehicles or driverless cars or other autonomous (or self-driving or self-operating) vehicles, ships, tractors, trucks, cars, trains, shuttles, or the like. In order to enable massive data collection from the multiplicity of sensors installed in such car or vehicle or in its vicinity, and in order to ensure the efficient analysis of collected data, a reliable broadband connection may be required; even more so if needed in real time, for example, for real-time data collection, uploading, downloading, analysis, processing, or other handling. For example, in order to perform proper, quick and reliable software upgrade to any of the autonomous vehicle processors, a reliable broadband connection, or overall QoS, may be required. Similarly, for any handling or assistance from a remote source or operator, either due to a vehicle fault or in the regular normal procedure, including driving the vehicle remotely or moving it or adjusting it in any way or any other remote intervention, the human or non-human remote handler may need a lot of data in real time, such as visual data from one or more cameras, Light Detection and Ranging (LIDAR) units, sensors, etc.

The present invention provides a reliable broadband communication link as a virtual communication link that is comprised of a dynamic adaptive combination of multiplicity of available communication modems, transceivers, links, operators and networks, including any suitable combination or aggregation of multiple types (e.g., cellular, 2G, 3G, 4G, 4G-LTE, 5G, Wi-Fi, satellite, V2X, V2V, IoT, or the like); and loading and utilizing them dynamically in both the upstream direction and the downstream direction, with the suitable amount of packets uploaded or downloaded or transmitted according to the requirements from the applications and the available performance of each one of them and the total of them, both measured and predicted.

The Applicants have realized that, for example, in 3GPP Release 15 and other specifications, standards and/or protocols of public bodies and/or commercial entities, specific Vehicle to Vehicle (V2V) or Vehicle to Anything (V2X) communications protocols may be utilized. The system of the present invention may enable reliable communications between vehicles, and between vehicles and infrastructure (V2X—Vehicle to Anything), to allow specific applications or to achieve particular goals, for example, minimizing or reducing or preventing traffic accidents or traffic jams, improving traffic flow, automating parking, and/or automating the driving itself with autonomous cars. The Applicants have thus realized that within several years, many or most vehicles and even infrastructure (e.g., a crane, a cement mixer, a tractor, a storage container, or the like) may be equipped with yet another type of communications and modem (or transceiver), which may operate at a currently-unknown performance level, bandwidth, reliability level, and/or other characteristics.

The Applicants have realized that none of the conventional systems and methods make use of available cellular links or other connectivity links which may be otherwise available, for example, the driver's own cellular phone or multiple mobile devices of one or more of the passengers available with cellular or Wi-Fi-based connectivity, either momentary or continuously, in conjunction with the vehicle's cellular modem or in coordination or in cooperation among themselves, to create multi-link broadband access for bandwidth-hungry uplink and/or downlink applications of the vehicle itself and/or of one or more of the passengers or the driver. The vendors or system providers in the ecosystem of the vehicle, or vehicle communication system, or after-market of vehicles or similar use and rely on their own-supplied modem, network, operator for the communications.

Further, the Applicants have realized that the utilization of multiple cellular or other connections, or modems, or transceivers, or technologies, from the same network operator or from different network operators, may not be optimized for autonomous vehicles, and/or for significant broadband consumption, and/or for geo-spatial movement of vehicles (e.g., on the ground, and/or also in the air, including three dimensional movement), and/or for the significant quantity of such vehicles, for sharing the multi-link or its specific variant of bonded broadband bandwidth in each vehicle by various types of users or applications. The systems and methods of the present invention provide such solutions.

In accordance with the present invention, bonded wireless communication may be produced and utilized, and/or multiple-link wireless communication may be produced and utilized. For example, a multi-link agent or a Bonding/Multi-Link Agent may be operable, in a vehicular unit or in a mobile electronic device of the driver or of one or more of the passengers of the vehicle. The bonding or multi-link agent, or a multiplicity of such agents, may operate to enable the utilization of multiple wireless communication links, each one of them contributing to at least some of the upstream transfer of packets and/or to at least some of the downstream transfer of packets, for the aggregated benefit of one particular vehicular or in-vehicle device, or for the aggregated benefit of multiple such vehicular devices or in-vehicle devices. For example, a 4G LTE cellular transceiver of a smartphone of the Driver of the vehicle, and a 3G cellular transceiver of a tablet of a Passenger in the vehicle, may be utilized to receive incoming packets of a streaming video that would be played on the vehicular multimedia system; and such received packets are transferred by these end-user devices (the smartphone, the tablet) to the vehicular multimedia system, via such Bonding/Multi-Link Agent(s) or multi-link agent(s), for example over a local WLAN or over a local Bluetooth connection; and the incoming packets are aggregated and/or re-assembled before or at the vehicular multimedia system to construct the media stream for playback. Other types of multi-link vehicular communications may be used; for example, sending and/or receiving packets of each session (or each application) via a separate or dedicated link (or set of links), and/or via a separate or dedicated modem or transceiver (or set of modems, or set of transceivers); with or without switching between (or among) links during the session; such that each such session or each such application (e.g., streaming media application; mapping application; video conference application; or the like) is using a single link at any point in time (or, a particular subset of the available links), but not necessarily the wireless or cellular link of the device itself or the equipment itself that it is running on. For example, if the modem of one passenger provides a broader bandwidth at a certain point in time (or during a particular time-slot), then the vehicle may use it for downloading software to upgrade one of its components; similar determinations or operations may be performed based on other and/or additional criteria or conditions, for example, cost of data transfer, policies, over-usage of a certain link or device, or the like.

The present invention also facilitates and utilizes interfaces and communications between multi-link communications data, layers and application, as well as other applications. Such usage includes, for example, coordinating the communications of one or more applications of one or more of the vehicle occupants, according to the current or recent or predicted or estimated or past/historical performance (for example, at least one or more of: bandwidth, goodput, throughput, error rate, latency, jitter behavior, dropped packets, defective packets, erroneous packets, requests for retransmission of packets) over at least one of the communication links and/or over all of them combined. Other parameters that may be considered are, for example, cost of using each of the links; aggregated cost of using a particular group or batch or set of the available links; pre-defined, system-defined and/or user-defined policies; preferences of the user or the vehicle owner or the service provider or the operator or others, or information passed from or to or through one or more of the communication networks. It may also include delivering the information about the current or expected or predicted performance, and/or current or predicted demand for bandwidth or other performance by any one or all of the other applications, in an open Application Programming Interface (API) or otherwise to other applications. These applications may then use this data or predictions to decide about their own behavior, demand for bandwidth, recommendation to the user, to time or schedule their network usage level and absolute usage and utilization, to activate or de-activate certain features of the application, to increase or decrease a level Quality of Service (QoS) service provided by the application, and/or to synchronize or adjust or modify their performance demands, momentary or for a pre-defined time-slot or in a continuous manner, with the actual performance or predictions of one or more of the communication links or of the combined communication link, and even select a particular communications link or a particular set of some particular multiple links to be used or to be excluded from usage, for any period of time, or during particular time-slot(s).

By exchanging this performance and demand information and predictions between the bonding layer and the applications that use it, the bonding layer may, for example, use it to facilitate optimization of the bonded communication, and/or of the network or multiple cellular networks performances according to data associated from the bonding devices and/or from applications (e.g., route guidance or mapping) and other navigation devices or software applications, maps, media streaming applications, fleet management devices or services, sensors in the vehicle, sensors in the environment, sensors in the passenger or passengers mobile devices, sensors in other vehicles, bonding devices in other vehicles, sensors or indicators from the network or networks, or a combination of the above.

This information may be used, for example, to allocate one or more communication devices to one or more applications, and one or more other communication devices to other applications. For example, the vehicle may use a passenger smartphone to download navigation maps because the momentarily available goodput on that passenger's smartphone is better or higher than that of the cellular communication device of the vehicle itself; and since this navigation map is deemed very important and/or is assigned a higher priority than infotainment applications. At the same time, the vehicle's cellular transceiver or device may be bonded with another passenger's mobile device (e.g., tablet) and they may be used to stream video into the vehicle for infotainment purposed (e.g., utilizing in parallel a 4G transceiver of a tablet of a passenger, which receives cellular packets of the streaming video, and which transmits them to the vehicular entertainment system over Bluetooth or Zigbee or WLAN or Wi-Fi). The passengers' devices and the vehicular device(s) may be tethered or may cooperate with each other, either directly or via a proxy or another unit (e.g., a Wi-Fi Access Point or similar), or by using a wired cable or a hardware connection), and/or using a wireless mesh-based internal network or intra-vehicular network. Additionally or alternatively, a Bonding/Multi-Link Agent or a multi-link agent, in the vehicular device, or in any other device (e.g., passenger handheld device, passenger or driver smartphone, passenger tablet, passenger smart-watch, or other in-vehicle device) may aggregate or may participate in the aggregation of bandwidth, and/or may opt-in to such multi-link scheme, or may opt-out of such multi-link scheme.

Policies used by the Bonding/Multi-Link Agents or units, or by the multi-link units or agents, may be based on performance of each link, and/or on the total performance of multiple links, and/or the requirements of each application, and/or the cost of using each link, and/or other preferences such as of the user or of the owner of the vehicle or of the service provider, and/or based on a pre-defined order of priority among devices (e.g., self-driving unit gets priority over vehicular multimedia system) or among applications (e.g., video conference application gets priority over streaming audio application). The information and real time or near-real-time data about the performance and/or characteristics and/or quality and/or reliability of each link and/or the network or a multiplicity of links, may be monitored by the Bonding/Multi-Link Agent or unit (or multi-link unit or agent), and/or may be reported in real-time or near-real-time by a relevant network element or software interface such as the modem software or the core network interface over dedicated or broadcast channel or control channel or any other network route or element, and/or may be reported or relayed by (or from, or through) a proxy unit such as from another vehicle coming from the destination or opposite direction which has recently monitored and measured the actual performance of any relevant (or irrelevant) link in the area it is coming from or received it as relayed information from other vehicles that were in that area, and is now sharing this information with on-going traffic or with same-direction vehicular traffic and/or with opposite direction vehicular traffic and/or with other vehicles that are located within a particular geographical region or route or road, and/or any other traffic so that a real time or near real time map of communications links performances may be generated, shared and/or updated. Sharing the data can be done over or using a wireless link different from the link(s) used by the network or operator or technology being reported on; for example, used for closer range communication, 802.11/ DSRC V2X or V2V or other communication methods, and/or such information and data may be known in advance to the bonding (or multi-link) software or device either from its own previous experiences (e.g., the same vehicle drives the same route from 9:00 AM to 9:10 AM, and then drives it again from 9:20 AM to 9:30 AM), or from information that others reported or downloaded to it.

The vehicle communication system or device may optionally be equipped with a eUSIM or virtual SIM or IoT SIM, so that the SIM or credentials to be used for the ongoing communications and data transmission/reception in that session (or part of session) are downloaded from a remote server and loaded into (or configure) the vehicular device's modem (or transceiver). This way, the vehicle may switch to a different cellular network, or operator, or communication technology, or communication protocol or communication standard, according to any of the suitable or relevant performance parameters or cost parameters or preferences or policies. This particular or special or separate eUSIM or IoT SIM may further be used. Optionally, to download or to transfer such credentials or log-in data to the passengers' cellular devices (e.g., smartphones, tablets, smart-watches) so that they can switch to and/or among cellular operators, technologies, standards and/or networks. Additionally or alternatively, one of the virtually bonded devices with its SIMs may be used as a proxy for the other devices or software modules participating in the multi-link or bonded operation; and in such case, the bonding device, or any of the participating devices, or software modules, may request to use a protocol from the other devices to download credentials of VSIM (Virtual SIM) identity or identities, from a VSIM provider. This way, one or more of the participating devices or software modules may be used as a proxy for one or more of the others to download or to obtain VSIM or similar identities or credentials to be used by such other or others to identify themselves or to sign-in to a different network or operator and to get serviced by it. The benefits are, for example, that a better or faster or increased-bandwidth service or increased-throughout service may be provided to any one or more of the cellular devices participating in such multi-link communications, because its previous service was poor or low-quality or expensive or low-bandwidth or low-throughput or not sufficient, due to one or more issues such as coverage areas of the various cellular operators, congestions in any specific cellular area or sector or tower or cell, cost issues, data excess usage, throttling or other policies, and/or any other effect that may be amplified when the vehicle is moving from one area or cellular coverage area to another. In some embodiments, changing identity or credentials, downloading new ones, connecting to an operator, disconnecting from an operator and using an eSIM or VSIM for data communication, and/or other suitable operations or changes, may be triggered by (or may be autonomously initiated by) pre-defined events or pre-defined conditions, such accidents, which may be automatically identified or detected by sensors or systems in the vehicle which are connected or commanding the bonding or multi-link software, or by events or conditions such as heavy traffic, or by the need of the remote service provider to obtain more or additional information from the vehicle, or by the need to download software into a vehicular unit as quickly and reliably as possible, and/or by any other momentary or temporary trigger or need or condition; and this may be performed, in some embodiments, instead of using an extra eSIM or VSIM or operator or regular SIM or operator connectivity at all times.

In a demonstrative example, the Bonding/Multi-Link Agent or software or device or unit of the vehicle may be triggered into transmitting to a remote receiver or to other vehicles information related to the vehicle, such as telemetry, sensory information and/or video from one or more cameras installed in the vehicle. Such transmission may be of high importance, such as in the case of a traffic accident or a vehicular failure or a health situation of a passenger. The trigger may be from within the vehicle or from around it or external to it. As the data may be of high importance or even critical, and/or may require high bandwidth, and/or the vehicular cellular or other communication system may not be sufficient to transmit it reliably and/or quickly and/or in full, the vehicular communication system may tether into or may bond with the passenger communication device(s), or any other communication device(s) in the vehicle, and use it to transmit part or all of the information, in conjunction or simultaneously with the vehicular communication device or on its own. Such automatic tethering or bonding may be allowed or authorized or enforced by regulation or by passenger opting-in for emergency cases, either with passenger real-time approval or without it. This allows automatic emergency or high bandwidth transmission and/or reception of traffic using multiple links where the traffic is split or divided across them according to performance of each, or according to the total performance of all links, or according to the requirements of the particular application, or according to the user preferences or the networks or operators information and preferences, based on cost criteria, based on current and/or expected battery level or levels of one or more of the participating devices and the preferences of maintaining such battery levels, and/or based on regulations. For example, in case of a nearby traffic accident, the vehicle communication system may bond the passenger or passengers smartphones to start transmitting live real time video, or recorded video from just before the accident, to any remote location or multiple locations or receivers, with or without additional telemetry and vehicular related information about the status of the vehicle and/or of the passengers, such as health or biophysical related information. This may be done automatically, even in cases where the passenger is incapable of activating it or opting-in, according to pre-defined operational conditions or Artificial Intelligence (AI) decisions, regulations, or in-advance conditional opting-in, or other conditions or criteria.

Connecting to more than a single IP link, on the same network or operator or on a different network or operator, may allow separation of control and data flows as needed. For example, control instructions or control data pertaining to the operation of a cellular connection may be delivered to the cellular modem or bonding device or Bonding/Multi-Link Agent or multi-link unit over a V2X or 802.11p network and operator, as it may have a lower latency, while the data flow may continuously be transferred or delivered via that cellular network for that cellular modem.

Reference is made to FIG. 1, which is a schematic block-diagram illustration of a system 100, in accordance with some demonstrative embodiments of the present invention. System 100 may comprise a vehicle 110 having one or more occupants.

Vehicle 110 may be a car or truck or automobile or motor vehicle or bus or shuttle, a gas-based or fuel-based or electric-based vehicle, a hybrid vehicle, a zero-emission vehicle, a vehicle driven by a human driver, a vehicle operated by a human operator, an autonomous vehicle or self-driving vehicle, a vehicle operated or controlled or driven by a non-human machine or robot or processor or automated driving system (which may be local or internal to the vehicle; or may be remote or external to the vehicle and may control it remotely via wireless commands). In other embodiments, vehicle 110 may be a train, a subway train, an underground train, and over-ground train, a car or a wagon or chamber of a train, a ship, a boat, a yacht, an airplane, an aircraft, a helicopter, a manned aircraft, an unmanned or autonomous aircraft, a wheelchair (e.g., autonomous, manual, automatic, self-driving, manual, or the like), bicycles, a robotic device or other suitable apparatus of transportation that is able to transport one or more humans and/or one or more non-human items (e.g., cargo or payload), and which may be operated by a human or autonomously operated by a machine or remotely controlled by a remote human or by a remote machine, and/or any suitable moving or roving device.

In some embodiments, the vehicle 110 may include one or more Occupants; for example, a human driver, and optionally one or more passengers or riders. For example, a human driver in vehicle 110 may have a driver smartphone 111; a passenger in vehicle 110 may have a passenger smartphone 112; another passenger 113 in vehicle 110 may have a passenger tablet 113; another passenger 113 in vehicle 110 may have a passenger smart-watch 114. Other number of occupants and devices may exist, and other types of devices may be used by such occupants.

Vehicle 110 may comprise one or more vehicular processor(s) 151 able to execute code or programs (e.g., a Central Processing Unit (CPU), one or more processor cores, a controller, an Integrated Circuit (IC), or the like); a vehicular memory unit 152 to store data short-term (e.g., RAM memory, Flash memory, SD card), a vehicular storage unit 153 to store data long-term (e.g., hard disk drive, solid state drive, Flash memory), a vehicular Operating System 154, one or more wireless transceiver(s) and/or wireless modem(s) associated with the vehicle or with its computing elements providing them communications and hereby referred to as vehicular transceiver 175, vehicular RF circuitry 176 (e.g., comprising or having or associated with one or more antennas, amplifiers, transmitters, receivers, modems, wires, cables, or the like) and/or other suitable units or modules (e.g., vehicular applications), a vehicular bonding/multi-link agent 185 which may be part of a vehicular sub-system 150 or a dashboard sub-system or a separate device. Vehicle 110 may comprise other vehicular sub-systems 188, which may (or may not) operate in association with (or in conjunction with) the vehicular computerized/communication sub-system; for example, a braking system, an acceleration system, an electricity system, or the like.

For demonstrative purposes, some portions of the discussion may refer to a single vehicular transceiver, or to a single RF circuitry; however, a vehicle may comprise multiple vehicular transceivers (e.g., e.g., 175, and 175B, and optionally additional ones) which may be of the same type or which may be of different types (e.g., cellular, 4G, 3G, 2G, 4G LTE, 5G, Wi-Fi, satellite, Bluetooth, Zigbee, V2V, V2X, 802.11, 802.11p/DSRC, or the like), and/or a vehicle may comprise multiple RF circuitries (e.g., 176, and 176B, and optionally additional ones) which may be of the same type or of different types. In some embodiments, one of those multiple vehicular transceivers (175, 175B), or one of those multiple vehicular RF circuitries (176, 176B) may be referred to as a "primary" or "main", whereas the other transceiver(s) and/or RF circuitry (or circuitries) may be referred to as "secondary" or "additional".

Optionally, vehicle 110 and/or a vehicular computerized/communication sub-system 150 may comprise one or more units or modules that may provide a particular functionality or a particular set of functionalities, to the vehicle 110 itself and/or to one or more of the vehicular occupants. Such units or modules may comprise, for example: a non-human/autonomous/self-driving unit 161; a human-driving assistance module 162 (e.g., able to provide to the human driver messages or warnings, for example, about diverting out of lane, about being at excessive proximity to another vehicle or to a pedestrian,); a computerized parking unit 163 (e.g., able to self-park the vehicle 110 in a parking spot, and/or able to guide or assists a human user in a parking process); a vehicular or dashboard-based mapping/navigation unit 164 or route guidance unit (e.g., equipped with a GPS unit or other location-based or location-finding unit); a vehicular multimedia system 165 able to playback pre-recorded or pre-stored audio/video (e.g., via CD or DVD) and/or able to play real-time streaming audio/video media or buffered audio/video media (e.g., via a streaming service such as Netflix, Hulu, YouTube), typically having at least one display unit (e.g., screen, monitor) and/or audio output units (e.g., speakers, audio output socket); one or more vehicular sensors 166 (e.g., proximity sensor, velocity sensor, acceleration sensor, accelerometer, compass, gyroscope, or the like); a vehicular self-maintenance module 167 (e.g., able to collect and transmit data about the vehicle's behavior or performance of features, to a remote server of the manufacturer or vendor or service-entity that services the vehicle; and able to receive from such remote server updates, software upgrades, new applications, messages to the vehicle's owner, or the like); and/or other suitable units or modules.

Each one of occupant devices 111-114, as well as the vehicular sub-system 150, may be equipped with one or more wireless transceivers; for example, a Wi-Fi transceiver, an IEEE 802.11 transceiver, a V2V transceiver, a V2X transceiver, a cellular transceiver, a 2G cellular transceiver, a 3G cellular transceiver, a 4G cellular transceiver, an LTE or 4G-LTE cellular transceiver, a 5G cellular transceiver, a 3GPP transceiver, a satellite communications transceiver, a Bluetooth transceiver, a ZigBee transceiver, or the like.

For demonstrative purposes, and in order to avoid overcrowding of the drawing, FIG. 1 shows a single transceiver in each one of the above-mentioned units: a transceiver 171 in device 111, a transceiver 172 in device 112, a transceiver 173 in device 111, a transceiver 174 in device 114, and a vehicular transceiver 175 in vehicular sub-system 150; although in some embodiments, each one of those devices 111-114 and/or the vehicular sub-system 150 may include multiple transceivers, each of which may be of multiple different types (e.g., a cellular transceiver co-located with a Wi-Fi transceiver and further co-located with a Bluetooth transceiver).

Each transceiver (or modem) may be associated with one or more Subscriber Identification Module (SIM), SIM card(s), U-SIM cards, Virtual SIM (VSIM) units or modules, E-USIM modules or units, or a combination thereof. For demonstrative purposes, there are shown SIM(s) 171A associated with transceiver 171; SIM(s) 172A associated with transceiver 172; SIM(s) 173A associated with transceiver 173; SIM(s) 174A associated with transceiver 174; and SIM(s) 175A and/or logical or computational credentials used to identify, authorize, register, authenticate or otherwise allow wireless communication service by a network operator, which may be associated with vehicular transceiver 175 and/or with vehicular transceiver 175B or the vehicle owner or service provider or a billable entity.

Each one of occupant devices 111-114, as well as the vehicular sub-system 150, may comprise at least one Bonding/Multi-Link Agent (denoted 181-184 and 185, respectively). Each Bonding/Multi-Link Agent may operate to control, regulate, enable and/or facilitate the upload and/or the download of data packets to the device in which it is located and/or from the device in which it is located; and/or may coordinate or control the allocation or reservation or allotment of bandwidth to a particular device out of devices 111-114 and/or to the vehicular sub-system 150; and/or may handle the utilization of a transceiver of a first device, for the purposes of facilitating or improving the wireless communications that a second device performs or intends to perform; and/or the communication performance relevant to or from a specific device, application or user, or overall to or from several of them, or according to the network or networks or management software instructions according to a network-level or network-operator level considerations such as balancing the overall load between multiple links or users of that network or multiple networks, or according to cost-performance related functions or policies; and/or may handle the distribution of packets among devices for the purpose of uploading data, downloading data, dis-assembling or converting a data-stream (or an audio/video stream) into sub-streams or into groups of packets that are then uploaded (or downloaded) combined or separately via multiple transceivers of multiple different devices or units or transceivers in the vehicle; re-assembling or re-generating a data-stream (or an audio/video stream) from multiple sub-streams or groups of packets that were uploaded (or downloaded) combined or separately via multiple transceivers of multiple different devices or units or transceivers in the vehicle and/or of its occupants; predicting or estimating or determining future performance or future communication requirements of a particular device in the vehicle and/or of its occupants, or of all or some of the devices in the vehicle; analyzing past performance and/or past consumption of bandwidth by one or more, or some, or all, of the transceivers in the vehicle; and/or performing other functions or operations that are described herein. Each Bonding/Multi-Link Agent may be an integral or internal or built-in component in each device 111-114 or in vehicular sub-system 150; or may be an add-on or plug-in or extension or accessory which may be added to or connected to or coupled to such device 111-114 or to the vehicular sub-system 150; and/or may be implemented using a controller and/or an application and/or hardware unit and/or software module.

In some embodiments, vehicle 110 itself may have two (or more) units or modules that operate as Bonding/Multi-Link Agents. For example, the vehicular multimedia system 165 may have or may comprise (or may be associated with) its own Bonding/Multi-Link Agent, which may control or regulate the data consumption needs of the vehicular multimedia system 165; similarly, the self-driving unit 161 may have or may comprise (or may be associated with) its own Bonding/Multi-Link Agent, which may control or regulate the data consumption needs of the self-driving unit 161, which may be pre-defined or may be set as having higher priority relative to the data consumption needs of the vehicular multimedia system 165; similarly, the vehicular or dashboard-based mapping/navigation unit 164 may have or may comprise (or may be associated with) its own Bonding/Multi-Link Agent, which may control or regulate the data consumption needs of the mapping/navigation unit 164, which may be pre-defined or may be set as having higher priority relative to the data consumption needs of the vehicular multimedia system 165 but also as having lower priority relative to the data consumption needs of the self-driving unit 161; and so forth.

It is noted that the terms "consumption" or "data consumption", as used above or herein, may relate to all relevant type of consumption or data, including but not limited to: transmitting of data, receiving of data, uploading, downloading, relaying data for (or on behalf of) another unit or transceiver; multi-casting or broadcasting of data; forwarding of data or data-packets; re-transmitting of data or data-packets (e.g., due to erroneous packet, lost packet, or the like); and/or other suitable operations. Regulating or coordinating or managing the consumption may be done by the Bonding/Multi-Link Agent on its own, or by the remote side Bonding/Multi-Link Agent (e.g., Gateway side or Server side) on its own, or in combination of both wherein data is exchanged between the two sides in real time or near real time, or in a communication scheme such that deduction or determinations or estimation from one direction of the consumption is made in part or in full regarding the other direction (e.g. deduce information about the uplink from the downlink, or vice versa), or using synchronization of the two sides (e.g., clock-based synchronization), or by sharing performance data of one or more of the links or IP routes.

It is also noted that the term Bonding/Multi-Link Agent is also used herein interchangeably with similar terms such as "bonding layer" or "bonding unit" or "bonding circuitry" or "multi-link agent" or "multi-link layer" or "multi-link module" or "multi-link circuitry".

In a demonstrative non-limiting example, the driver and three passengers are travelling in vehicle 110 towards a destination point that is located approximately 70 miles away or approximately 90 minutes (of driving time) away. Some of the passengers (e.g., two children seated in the back seats of vehicle 110) would like to watch a High Definition (HD) movie on the vehicular multimedia system 165. Instead of playing a movie from a DVD disk or other local storage unit, they desire to watch a movie at HD quality from a movie-streaming (or content-streaming) service such as Netflix. In one example, the HD streaming of the movie may require approximately 8 megabits per second (MBPS) for adequate and smooth streaming. However, the vehicular transceiver 175 by itself may be a cellular 3G transceiver that is registered via a SIM card with Cellular Provider A, and is capable of receiving at one point in time or duration or window of time or time-slot approximately data packets at a bandwidth of approximately 0.5 MBPS.

In accordance with the present invention, the vehicular Bonding/Multi-Link Agent 185 operates to create a bonded communication channel, that would be able to reliably receive data-packets at a sufficient aggregate bandwidth that is suitable for the desired HD movie streaming or close to it or with the purpose and algorithm of achieving as close as possible performance as needed; by combining or bonding together data paths of multiple transceivers that are located in vehicle 110, each one of such transceivers contributing a portion to the aggregate bandwidth that is then utilized in an aggregate manner by the vehicular multimedia system 165.

For example, the driver's smartphone 111 may be equipped with a cellular 4G-LTE transceiver, having a SIM card able to communicate with Cellular Provider B, which provides a reliable incoming reception of approximately 6 MBPS. Similarly, the passenger tablet 113 may have a 5G cellular transceiver able to receive data from Cellular Provider A which may be the same or different than Cellular Provider B (in this example and throughout this disclosure), at an effective bandwidth of approximately 2 MBPS. Additionally, the passenger smart-watch 114 may have a 3G cellular transceiver able to receive data from Cellular Provider C which may be the same or different than Cellular Providers A and B (in this example and throughout this disclosure), at a bandwidth of approximately 1.5 MBPS. All such rates or bandwidths may be values computed at, or for, specific points in time, or durations, or time windows, or time-slots; and may vary slightly or significantly from one time-point in time to another time-point, or from one time-slot to another time-slot. Similarly, other application level or Quality of Service (QoS) related parameters such as latency or delay, lost packets, erroneous packets, or the like, may be computed for various time-slots or time-windows or at specific time-points, and may similarly vary.

Accordingly, the vehicular Bonding/Multi-Link Agent 185 generates or creates a virtual broadband connection or a bonded or aggregated communication channel, in which each of at least some selected of the above-mentioned transceivers, in any combination, contributes a portion of the total bandwidth towards the goal of serving an HD stream of data-packets to the vehicular multimedia system 165. Each one of those end devices may have a Bonding/Multi-Link Agent of its own, which controls or operates the end device to receive some of the required data-packets, and to relay or transport or forward the received packets—at the data-packets level (and not at the RF signal level)—to the vehicular Bonding/Multi-Link Agent 185, which in turn utilizes its assembly engine to re-assemble the HD streaming video from the data-packets that were received (e.g., in non-serialized order) by multiple different transceivers of multiple different devices within vehicle 110. The number and type of transceivers or modems are not limited; the number and type of providers or operators are not limited; the technology or standards or protocols of communication are not limited; and all these may not necessarily be single but rather may be or may comprise multiple operators, transceivers, links and/or technology (e.g., unlike the demonstrative example which mentioned only a cellular link to simplify the discussion; but either one of the transceivers and operators may also be non-cellular, e.g., satellite. V2X, V2V, 802.11p, Wi-Fi, or others).

Each one of such devices, that received some of the data-packets, may relay or transport or transfer them to the vehicular Bonding/Multi-Link Agent 185 (or to its assembly engine) by one or more suitable means; for example, via a wire or cable or other non-wireless connection (e.g., a smartphone of a passenger may be physically plugged-in or connected to a USB port of the vehicular multimedia system 165, or may be placed into a vehicular docking port or into a vehicular cradle unit), and/or via a short-range or local wireless connection; for example, the passenger tablet 113, which received via its cellular 5G transceiver a batch of data packets that needs to be forwarded from the passenger tablet to the vehicular Bonding/Multi-Link Agent 185, may transport those data packets wirelessly to the vehicular Bonding/Multi-Link Agent 185 over a short-range Bluetooth connection or ZigBee connection, or over an ad hoc Wi-Fi network or Wi-Fi communication link (or a vehicular Wireless LAN or W-LAN) or a mesh network between the passenger tablet 113 and the vehicular Bonding/Multi-Link Agent 185.

In another example, the vehicular Bonding/Multi-Link Agent 185 may request from wireless or cellular transceivers, that are located outside of (or externally to) the vehicle 110, to participate in contributing bandwidth to the bonded communication channel that is generated and managed by the vehicular Bonding/Multi-Link Agent 185. For example, when or if the vehicle 110 stops for 30 seconds at a red light, the vehicular Bonding/Multi-Link Agent 185 may temporarily add to the bonded communicating channel, a free Wi-Fi connection of a nearby Starbucks store (or other establishment or entity that offers free Wi-Fi or open-to-the-public Wi-Fi), such that the store's Wi-Fi connection may be used for receiving a part of the data-packets that are needed to enable smooth HD streaming on the vehicular multimedia system, or the traffic-light IoT connectivity when the vehicle and the traffic light communicate with each other via V2X/DSRC communication networks, or the vehicle tethers with or towards the traffic light (or vice versa).

In another example, the vehicular Bonding/Multi-Link Agent 185 may request from transceivers or from end-user devices of persons that are located outside of the vehicle 110 to participate in (or to contribute bandwidth to) the vehicular bonded communication channel; for example, requesting a smartphone of a pedestrian (e.g., when the vehicle is parked in parking lot or is stopped at a red light), requesting a vehicular transceiver of another vehicle (e.g., parked or moving or travelling in sufficient proximity to the subject vehicle 110 to enable, for example, a Wi-Fi link between the two vehicles), or the like.

In some embodiments, the vehicular Bonding/Multi-Link Agent 185 may allocate or may allot bandwidth for consumption by one or more applications of the vehicle 110 and/or of the various end-user or other devices 111-114; based on pre-defined criteria or conditions, and/or based on priority rankings that may be associated with particular devices and/or applications and/or types-of-applications.

In a first example, the vehicular Bonding/Multi-Link Agent 185 may be configured to prioritize bandwidth consumption such that the vehicular self-driving or autonomous driving unit 161 or specific applications of it or upon specific events or triggers or configured or self-learnt preemptive actions and occasions, would have higher priority than the vehicular mapping/navigation unit 164, which in turn would have higher priority relative to the vehicular multimedia system 165.

In a second example, the vehicular Bonding/Multi-Link Agent 185 may be configured to prioritize bandwidth consumption such built-in vehicular units (e.g., the vehicular multimedia system 165) would have higher priority than the priority of the driver smartphone 111, which in turn would have a higher priority relative to the passenger devices (112, 113, 114).

In a third example, the vehicular Bonding/Multi-Link Agent 185 may be configured to prioritize bandwidth consumption such that a first particular type of applications (e.g., streaming video applications) would have a higher priority than a second particular type of applications (e.g., mapping/navigation applications).

In a fourth example, the vehicular Bonding/Multi-Link Agent 185 may be configured to prioritize bandwidth consumption such that a first particular application (e.g., Netflix streaming video applications, or a vehicular safety related application) would have a higher priority than a second particular application (e.g., YouTube streaming video application). Other types or conditions or criteria of priority may be configured, managed, modified and/or enforced, by the vehicular Bonding/Multi-Link Agent 185 and/or by other suitable units.

The "higher priority" mechanism may also be used for preemptive purposes, such that when a need arises for communications with or by a critical priority application, such as safety related (e.g., notifying a remote location about severe vehicular failure or about an accident), an already ongoing session may be interrupted by the bonding management element or by the bonding agent, and the packets of the critical application(s) are transmitted from or to the vehicle on one or more of the available links, including replications, whereas the (non-crucial) application (e.g., streaming video) that was operating is stopped or paused or is deferred. Such preemptive action, or any differential prioritization policy at any point in time and for any suitable purpose, may result in the Multi-Link Agent 185 determining or deciding on a specific combination of links to be associated with each such priority level, or with a specific application, or with a specific session or connection, or with a specific duration or location, or with a specific sensor or vehicle processor, or with their combination.

In a demonstrative example, the multi-link agent 185 may decide that the vehicle's front LIDAR may receive the highest priority when the vehicle safety processor commands so, and therefore, at that time-point or time-slot, associated transmission of the LIDAR sensing related traffic from the vehicle to a remote location (e.g., a remote assisting driving center or server), is allocated to utilize the highest reliable set of modems or transceivers, cellular and/or V2X 802.11p DSRC or satellite or others, for that duration which the vehicle safety processor instructed. When there is a change in the real-time or actual performance of any of these modems or transceivers or links, the Multi-link Agent 185 may decide determine to change the combination of connections or links or modems or transceivers. For example, it may add another modem or transceiver, it may remove one of the modems (or transceivers) or may reduce the payload or traffic sent over a modem (or a transceiver) it in part or completely, or it may determine to send more FEC in order to have an overall more-reliable communication without retransmissions even at the expense of transmitting less other-type of data from the vehicle (e.g., less lower-priority data traffic), or it may determine to compress the LIDAR traffic data more significantly or by using other compression parameters even if potentially there may be a greater loss of data because of such different compression but also because at that point in time there may be less goodput available from the relevant set of connections or modems or transceivers, wherein "relevant" means that sufficient goodptut is sensed by the Bonding Agent and the remote server side that falls within the other relevant requirements such as the relevant intended (or desired, or tolerated) latency for receiving that transmission end-to-end or end-to-interim node. The multi-link agent 185 may modify the compression method or parameters of this LIDAR, or camera, or sensor, or multiple such high-throughput sensors. The Multi-link Agent 185 may operate to increase the reliability and assurance that the data traffic arrives on time to its destination (e.g., remote server). The Multi-Link Agent 185 may determine to interleave or multi-plex or overlay or compress or encode or correlate or synchronize any other form of combining multiple such data streams from several such sensors into a single transmitted stream or multiple sub-streams, whether separately compressed or compressed in any combined way. This may be done, for example, in order to reduce the transmitted bandwidth and thus increasing reliability and decreasing latency, or in order to do on-vehicle processing that may otherwise be a resource constraint on the delivery networks or on the end-node processors (e.g., by performing or initiating Mobile Computing at the Edge or Mobile Edge Computing, MEC), or to create a coherent, time and geo-location accurate and synchronized image (or video, or map, or other multimedia reflection of what the relevant sensors sense of the inside or outside reality or events) from all relevant sensors thus overcoming time or geo-location synchronization issues that many time results from un-synchronized transmission and delivery end-to-end.

In some embodiments, such combining of multiple sensors may be dynamically changed over time and location. according to real-time decisions based on the sensors' output and their intelligent relevancy and contribution to the overall reality picture or even to the immersive perception of the vehicle's vicinity or internal status, the available computing resources, the momentary available networks or connections goodput, or other dynamic parameters. Thus the Multi-link Agent 185, or any associated unit or device, may decide how to adapt the combining of the multiple sensors streams at each point in time or geo-location; and the Multi-link Agent 185 may decide on any combination of such or other dynamic actions, either in the used or available connections or in the manipulation or adaptation or modification of the content to be transmitted so that it results in another format or bandwidth, so that the dynamic actions would result in optimizing or maximizing or attempting to do so either with regard to the delivery reliability, or to lower the delivery latency, or to increase the delivery bandwidth or throughput, for any specific sensor or application or device, or for any combination of sensors and/or applications, for transmission into and/or from the vehicle, for any period of time and/or geo-location en-route, according to real time measurements of one or more of the available connections, or predictions, or estimated, or historical data, or data received from other vehicles or from the transportation or telecom infrastructure.

In some embodiments, the sensors' real time information such as the LIDAR and outward-looking camera or cameras in high resolution, all generating or requiring high bandwidth even when compressed by the Multi-link Agent 185 or by other unit, may be used by a remote server for remote assisted driving. In such case, the server center may have an immersive perspective of the vehicle's vicinity or surrounding, created from these data streams, whether generated in the vehicle processor or at the remote server. This data or perception may then be used by humans and/or by a computerized system, to send back into the vehicle over the highly reliable and lowest latency route created by the Multi-link Agent 185, including replicated or otherwise delivered as decided, commands which are then received, processed by the Multi-Link Agent if needed, and delivered or distributed internally within the vehicle to the relevant controllers or processors controlling the vehicle or assisting to control the vehicle. Such controllers may be multiple or single, for example a vehicle remote driving processor or the brakes or the wheel or other processors. In such case, the remote commands may be encrypted, digitally-signed, authorized, encoded, and/or otherwise protected to minimize the potential of remote take-over of the vehicle.

In some embodiments, the vehicle may comprise a Light Detection and Ranging (LIDAR) sensor or radar, which may be implemented as or may comprise a three-dimensional or a four-dimensional radar or sensor that may include Doppler dimension or Doppler sensor or Doppler radar, or other such devices. In some embodiments, such LIDAR sensor or radar sensor may be configured or modified to have a higher priority value or priority level in order to ensure reliable outgoing transmission of the data captured or sensed by such LIDAR sensor or radar, relative to the priority of data-transmissions from the outwardly-looking cameras of the vehicle or relative to other camera(s) that capture other part of the view. In some embodiments, the data compression of such LIDAR or radar sensors may be non-lossy, for example, in contrast to the video encoding and compression of other cameras which may be lossy. In some embodiments, the Multi link Agent 185 may apply different compression schemes, may apply or may utilize different Forward Error Correction (FEC) parameters or schemes, may selectively use or may configure or may regulate or may associate or may otherwise control different sub-sets of modems or transceivers or connections or links such that the more reliable one(s) are utilized to deliver the LiDAR and/or radar data-stream(s) first or at a higher priority (e.g., relative to other data-streams that are uploaded from the vehicle and that have lower priority, for example, a camera feed upload, a Facebook live-feed upload), may selectively cooperate or engage with the relevant networks such as with the 5G network slicing functions in defining and setting up a more reliable connection form the selection of the modem subset through the path or route or resources that are currently available or that are estimated to be available in the network.

Some embodiments of the present invention may selectively associate, between one item of Group (A) and one item of Group (B); wherein Group A comprises: (A1) a particular data-stream of a single particular application; (A2) two (or more) particular data-streams of a single particular application; (A3) a first data-stream of a first application, and also a second data-stream of a second application; (A4) one or more data-streams of a first application, and also one or more data-streams of a second application; (A5) a particular subset of packets that are generated by or intended to a particular application; (A6) multiple sets or subsets of packets, that are generated by or are intended to, two or more different applications; wherein Group B comprises: one particular, or a particular subset of, or a selected subset of, modem(s) and/or transceiver(s) and/or wireless connection(s) and/or cellular connection(s) and/or IP recipient(s) and/or wireless network(s) and/or cellular network(s) and/or communication links.

In some embodiments, such association may be performed, for example, at Layer 1 or Layer 2 of the communication (e.g., in a seven-layer communication model), or in other suitable layer(s) of communication; by allocating a data-stream or a packet or an application to a modem or transceiver or link, or vice versa; and/or, in some embodiments, without the application being aware of (or being able to find out) which transceiver or modem or connection is utilized to transport or download or upload its data-stream(s), and/or such that the application itself may be agnostic to such allocation and need not necessarily know about the allocation. In other embodiments, the allocation or association may be notified to the relevant application(s), for example, optionally, in order to trigger and/or to command the application to modify its operational parameters, its encoding or compression scheme or parameters, or the like. In some embodiments, the association or allocation may be performed dynamically, and may be re-performed at pre-defined time intervals (e.g., every 5 or 10 or 30 or 60 or N seconds), or at pre-defined geographic distances or locations (e.g., every 100 or 200 or 500 meters that the vehicle traveled), and/or based on (or taking into account) the momentary or current or most-recent or average performance parameters (e.g., bandwidth, good-put, through-put, latency, error rate, link strength, link reliability, number of disconnections, or the like) of one or more of the modems, transceivers and/or links that are available.

Additionally or alternatively, two or more data streams that originate from the same vehicular sensor or vehicular unit, may be associated with two (or more) different priorities (or priority levels, or priority values) or encoding profiles or compression profiles and/or transmission profiles. For example, a radar generating maps for close range and for longer range may differentiate between the two functionalities, such that the shorter range functionality or module has a higher-priority profile in the encoding or compression or transmission, and therefore it would use the most (or the more) reliable and./or sufficient bandwidth subset of connections or modems or transceivers; whereas the data representing the more remote radar map or view may still be encoded or compressed or transmitted at a lower level of priority or at a lower level of reliability or bandwidth, using the same or different subset of IP connections or modems or transceivers or operators or networks.

In some embodiments, the vehicle, or a bonding unit or a multi-link agent unit of the vehicle, or other unit(s) or module(s) in the vehicle and/or of the system, may comprise or may be associated with, for example, an encoder unit or module, a compression unit or module, and a compression/encoding controller able to dynamically control, regulate, configure and modify such compression and/or encoding units. For example, the vehicle and/or the system may detect or may sense that the vehicle is not operating adequately, or that the vehicle is involved in a car accident (e.g., the air bag is engaged), or that the vehicle is in a dangerous condition or situation (e.g., the brakes are locked; the vehicle is skidding or slipping on a wet road), or in an unknown situation or an ambiguous situation (e.g., one or more particular sensors of the vehicle are not operating adequately and the system lacks certain information with regard to the vehicle's current condition or surroundings), or the vehicle may receive an external notification from a remote source indicating that the vehicle is located in a location-of-interest (e.g., near an accident scene of another vehicle). In response, the data-stream that is captured by or generated by or uploaded by certain sensor(s) of that vehicle, may automatically and/or automatically receive higher or highest priority for upload transmission to a remote recipient or remote server; and such crucial data-streams may be routed by the bonding unit or the multi-link agent of the vehicle to be uploaded through one or more particular modem(s) and/or transceiver(s) and/or network(s) that exhibit (e.g., currently, or momentarily, on in a most-recent time-slot) a higher or the highest bandwidth or through-put or good-put, or reduced latency or the smallest latency, or the least error, or the least error rate; whereas, at the same time or concurrently, other less-crucial data-streams or lower-importance data-streams (e.g., an upload of a Facebook live feed; or a download of a streaming video from Netflix) are transported via less efficient modem(s) and/or transceiver(s) and/or link(s) and/or network(s). Additionally or alternatively, the operational settings of the encoding/compression unit(s) or module(s) may be accordingly modified or configured, by the encoding/compression controller or modifier unit or module; for example, to enable a more lossy compression or encoding of non-crucial (low priority) data, and/or to enable a greater-quality compression or encoding of crucial (high priority) data, to enable high-quality real-time transport (and particularly in the upstream direction).

In some embodiments, for security purposes, the Multi-Link Agent 185 or the server-side agent 450 may also use bonding or multilink transmission, in order to ensure that the commands are split and reassembled at the recipient vehicle, so that they cannot be injected over any specific link, or so that they are more difficult to be tampered with. The server-side Agent 450 may dynamically and adaptively select the best combination of connections, separately and independently for the uplink and the downlink or in correlation so to best and optimally meet the lowest latency needed for such remote assisted driving, as well as highest reliability of both the uplink of the high throughput sensors streams (either pre-processed, compressed, combined, overplayed, time and geo location synchronized between them, or not).

The feedback about the performance of the bonded or replicated or switched or any other decision may be fed as GUI and/or as API into the remote driving human or machine or algorithm, so that they can best fine-tune or modify the vehicle driving and parameters accordingly. For example, latencies of above certain thresholds may force a particular maximum vehicle speed accordingly, to allow the remote assisted driving the necessary timely feedback and safety levels. When the latency is smaller than a pre-defined threshold, higher driving speed may be selected or may be allowed, so that the vehicle is moved from an emergency and danger zone (to itself and/or to the vicinity) more quickly.

Similarly, if the quality of the information is lower than a threshold level due to lower bandwidth availability, and/or the reliability of the connectivity in the uplink or the downlink (commands) is lower or below certain absolute or percentage levels or threshold level, the human or machine remote driving may analyze these parameters and may decide about the best driving commands accordingly.

In some embodiments, safety systems in the vehicle itself may also consider these parameters delivered to them from the remote or server-side Agent 450, and may set or modify their own limitations on the vehicle control and movement. For example, even if the remote command instructs the vehicle to drive at or below a certain speed, the vehicle safety system, made aware by the server-side Agent 450 that the uplink network is relatively or absolutely too slow to allow the remote driver (human or machine) to drive the vehicle safely enough at this speed, may set an updated limitation and may drive the vehicle at a lower speed in order to allow the imagery perspective from the LIDAR and cameras or other sensors to arrive at the remote driving center and allow proper and timely and safe control of the vehicle.

In some embodiments, the synchronization of multiple real time streams may be done for example by generating or utilizing time-stamps, geo-location indicators, ID numbers or strings, or other signs or indicators, or any combination of them. It may include shortening or truncating these IDs of synchronization or similar indicators according to a cyclic maximal size per transmission, or for all transmissions, or in a hash-based manner or by any other algorithm, transmit the streams of IDs reliably over some of the connections such as over the most reliable ones but not necessarily the quickest ones, optionally duplicated or split between or among several links or on a single such link; stamping the data streams such as the compressed video stream or the compressed LIDAR data, after the compression is done, such that the stamping is kept outside the compression, yet when the input of the two or more streams is still maintained as arriving into the system from before the compression (e.g., since the compression may add different latencies to different streams) A short form or truncated version of these IDs may be used for the stamping to keep the transmission overload to a minimum.

In some embodiments, alternatively, the packets may be stamped with synchronization IDs or indicators or time-stamps even before the compression is done, so the stamps are thus also compressed; or alternatively not compressed if the compressor or encoder is ordered to do so and these stamps are identified to it as such via a protocol or via specific fields. In such cases, after the compression, if multiple compressed packets are associated and encapsulated together, the stamping of each one of them is maintained either compressed or not compressed as explained above. An encapsulator module or unit, or other unit, may then identify duplicate stamps within the same encapsulated bigger packet, and may then remove it in order to save and reduce transmission bandwidth. Alternatively, each packet may still be encapsulated with its relevant stamp not removed. In some cases, the receiving side de-capsulates the received data or data-item(s), identifies packets of different data streams (such as, from the LIDAR, from camera C1, from camera C2, from camera C4, from microphone M1, from sensors S1 and S2), and associates them with one another, or may stream them out with the relevant association or relevant meta-data synchronization stamps if such protocols are used.

In other embodiments, when multiple data-streams are combined to a single data-stream at the vehicle processor, such as by the Multi-link Agent or an encoder or decoder or another processor, as explained to ensure synchronized transmission or to reduce transmitted bandwidth or to perform local computing over the sensors data stream combined or to extract data and correlate on-board vehicle processing such as classification or other video processing or image processing or Artificial Intelligence (AI) or other form of computing, then the combined packets may be overlayed such as with Scalable Video Coded (SVC) paradigms or similar or others. Synchronization between the sensors data streams coming into or ingested by the processors is maintained either inherently by the overlaying or combining of data streams, and/or by stamping the combined or the separated sensors packets with synchronization stamps (timestamp, geo-location, IDs).

The encapsulated packets of each of the sensors, synchronized by the stamps, or of the multiple sensors in one encapsulation or even one compressed packet stream as processed and overlayed by the vehicle Multi-link Agent, may be transmitted over the most suitable connection(s) at any point in time. For example, the synchronization stream of IDs alone may be protected with a certain FEC pattern that matches the reliability of the connection it is to be transmitted on as decided by the Multi-link Agent, and may then be transmitted on this connection such as on the most reliable modem at one point in time, then its continuation on another modem as this second modem becomes more reliable as measured by the Multi-Link Agent and/or by the receiving side, the data streams compressed with their short (or truncated) or maintained length synchronization IDs transmitted over one or more of the links or connections including or excluding the connection on which the synchronization data is transmitted and according to the priority of the sensors data, their encapsulated packet priority and the momentary conditions and performance of each of the available connections. In some embodiments, alternatively, when the synchronization stamps stream is not separated from the encapsulated sensors streams, a separate stream of synchronization stamps may not be required and may not be transmitted.

The present invention allows moving or switching seamlessly between or among all modes of utilization of multiple links (multi-link) communication; such that the same end device (e.g., a vehicular unit; or a passenger unit; or a driver unit) uses multiple links for its communications, and those multiple links include (for example) at least one wireless link that is not served via another unit or by another end-user device or by another vehicular unit. One or more multi-link modes of operations may be used, by each one of the relevant transceivers or units or modems or modules or agents; for example: (1) "Replicate Mode"—deliver the same content duplicated on all the links; (2) "Switching Mode"—send the content on one link and then switch between links in a fail-over mechanism or due to other pre-defined reasons or conditions; (3) "Load Balancing Mode"—balance the transfer of the content between all or some of the available links such that each data flow, or IP destination, or application, uses one of the links, not necessarily mutually-exclusively relative to other devices or applications; (4) "Bonding Mode"—treat all available links as a single virtual broadband, and split or divide the content (e.g., the packets to be transferred) between or among all available links dynamically (e.g., and not necessarily equally; or, in an inequitable manner) at each moment (or during pre-defined time-slots) according to the current and/or historic and/or momentary and/or actual and/or estimated performance of each of the links and the total available goodput or throughput or bandwidth.

The bonding/multi-link element(s) or agent(s), either at the end-node and/or or the infrastructure, may determine how to use the multiple links available in the vehicle at each point in time, or during a particular time-slot or time-period or while being in a particular route-segment or road-segment or region. For example, it may determine that some applications, such as low bandwidth/low reliability/non-crucial web surfing, may utilize specific links with sufficiently good momentary or predicted performance; whereas streaming applications, either into the end device or upstream from it, may utilize a bonded multilink of N modems (or transceivers) and IP connections. In some embodiments, such streaming applications may optionally include vehicle and passengers safety applications or data-traffic, such as vehicle LIDAR sensors or outwardly-looking cameras needed for remote assisted driving or consultation at very low latency and high resolution even when the Multi-link Agent 185 determines to compress them in part or in full; or other safety-related or health-related applications that may require streaming or data transfer such as in-vehicle high throughput sensors, or passenger related data and sensors such as tele-health imaging devices (e.g., MRI or UltraSound data transmitted from an ambulance) or others. Such determination may be based on prior knowledge of the IP links, networks, operators, locations (on the move or along the driving route), time of day, or other pre-known parameters or currently-measured parameters or estimated parameters, or based on parameters provided or obtained in real time or near-real-time form the infrastructure, from the network, from other vehicles, from proxies (e.g., external to the vehicle), from the end node, from the user himself, or from the service manager.

Optionally, some applications that may be less susceptible to disconnections may automatically or autonomously re-establish connection, rather than maintain it, via VPN or IPSEC or via another means. This way, the new connection (e.g., per client request from a remote server when surfing the web) may even be moved from one modem and IP link (and IP network provider and network) to another. For example, one client HTTPS request may be made over the cellular modem of the vehicle, while a next HTTPS request from the same client may be routed by the bonding element or agent via a passenger's mobile device; whereas, the client web request itself is running on the passenger's smartphone or on another passenger's smartphone or on the vehicular media processor or any other processing device of the vehicle or in the vehicle.

The bonding or multi-link element or agent may optionally comprise or utilize or perform any other suitable networking function, such as router, repeater, relay unit, wired or wireless tethering, switch, hub, bridge, NAT, DHCP, VPN or IPSec client or server, or the like. The routing of the IP packets may require or may utilize routing or re-routing via another IP address or another IP network mechanism, rather than direct IP delivery to its final destination.

In some embodiments, performing of the "replicate" or "load balancing" or "switching" or "bonding" functionalities or modes, may be fully performed locally (e.g., within the vehicle), without necessarily requiring a remote server or remote gateway or remote proxy; for example, by a local Replication Module 225 or Links Bonding Module 224 or Switching Module 226 or Load Balancer 227, which may be implemented for example as part of (or may be associated with) one or more of the Bonding/Multi-Link Agent(s) of the vehicle and/or of end-user device(s). In some embodiments, packets transferred on each link are sent or received without a middle multilink proxy or networking element.

Some embodiments may use any combination of these methods on any combination of some or all of the available links. For example, link number 1, such as the vehicle cellular modem and SIM, may be used for some packets or applications or connections as a load-balance or a switch-to link (e.g., all packets for that specific connection will be transferred via that specific modem or transceiver for a specific connectivity duration and using its IP address), and at the same time (or later, in a different time-slot) it can be part of a bonded or aggregated link (or part of a virtual broadband link) together with a passenger smartphone such that packets of a downlink stream into the vehicle are split or divided over or across the two connections (and their two distinct IP addresses and routes); and another passenger device such as a tablet may be used solely for a vehicle-related application, for example because this particular link has a low latency at that time period which may be important for that specific vehicle-related application. The three devices, or modems, or their managing or associated software or modules or controllers, may be connected and commanded by the multilink element according to their registration with it, momentary requests or cost constraints, and momentary performances.

In another demonstrative example, the vehicular multi-media system is associated with the vehicular cellular transceiver, which is capable of receiving an incoming video stream over a 4G connection; and a Passenger tablet has a 5G transceiver; and a Driver smartphone has a 4G-LTE transceiver. The bonding/multi-link agent(s) of these devices and/or of the vehicle, may operate in coordination to enable smooth HD viewing of a streaming video from Netflix on the multimedia system of the vehicle; for example, allocating to the vehicular transceiver to download the packets of the first 20 seconds of the video; allocating to the passenger tablet to download the packets of the next 5 seconds of the video and to transfer them over Bluetooth to the vehicular multimedia system (e.g., this may be performed and completed by the passenger tablet during those first 20 seconds of the video); allocating to the driver smartphone to download the packets of the next 7 seconds of the video and to transfer them over Wi-Fi to the vehicular multimedia system (e.g., this may be performed and completed by driver smartphone during the first 25 seconds of the video); and then allocating to the vehicular transceiver to download the packets of the next 15 seconds of the video, while the smartphone and tablet are allocated different batches or amounts of packets to download in parallel and then to transmit to the vehicular multimedia system; and so forth.

Figure 4:
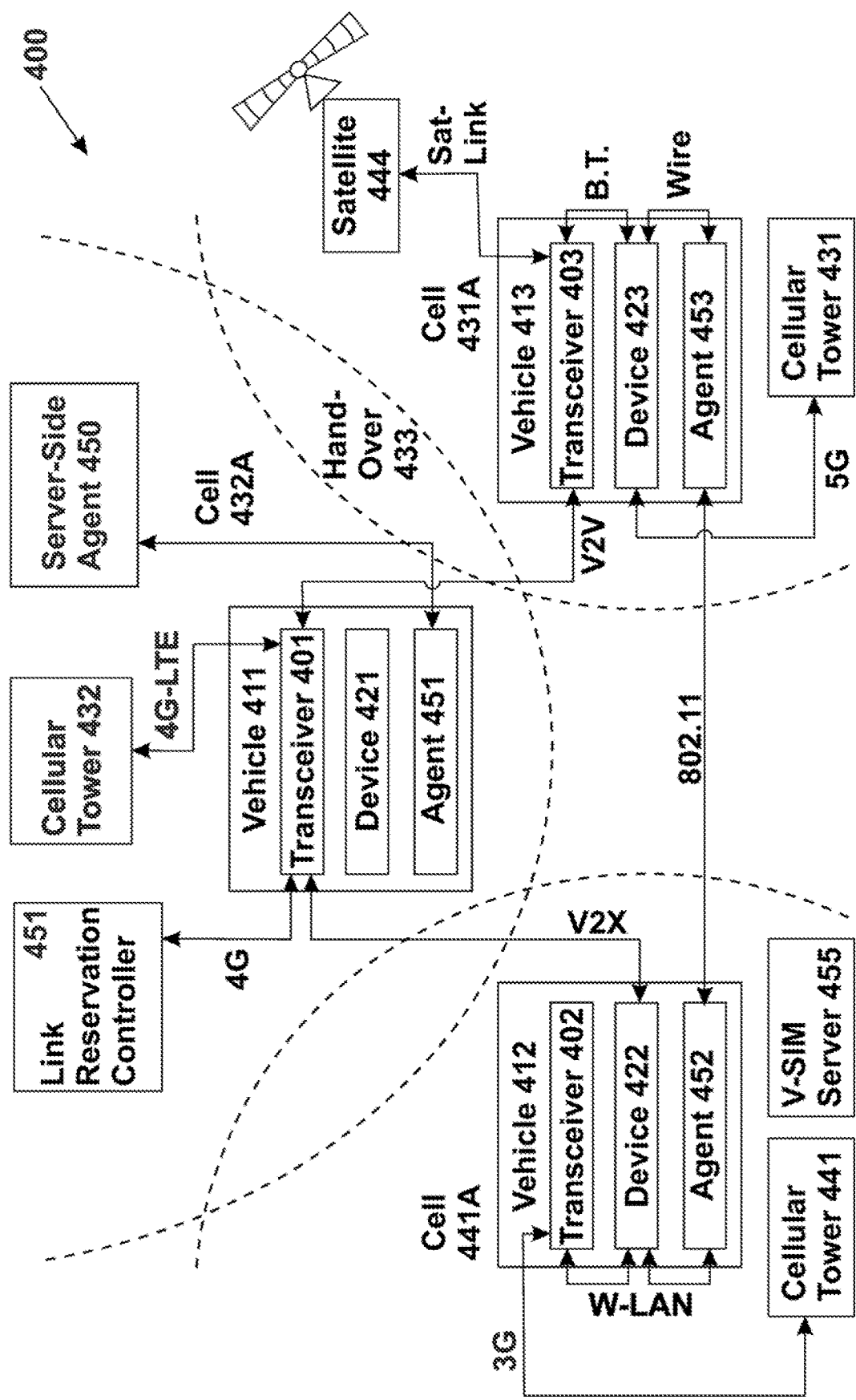
FIG. 4 is a schematic illustration of a system, in accordance with some demonstrative embodiments of the present invention.

Reference is made to FIG. 4, which is a schematic illustration of a system 400 in accordance with some demonstrative embodiments of the present invention. For demonstrative purposes, there are shown: three vehicles 411-413; each vehicle having a vehicular transceiver (401-403, respectively); each vehicle having one in-vehicle end-user device (421-423, respectively; such as smartphone, tablet, smart-watch).

A first cellular provider may operate a 4G LTE cellular network; for example, utilizing a cellular tower 431 associated with cell 431A, and utilizing a cellular tower 432 associated with cell 432A, and further showing a hand-over region 433. Similarly, a second cellular provider may operate a 3G cellular network; for example, utilizing a cellular tower 441 associated with cell 441A. Also shown is a satellite 444, enabling one or more of the vehicles or transceivers of system 400 to communicate with a satellite-based communication network.

A provider-side link reservation controller 451 may be utilized by the first cellular operator, to enable vehicle 411 to reserve a link or a minimum bandwidth link A Virtual SIM (VSIM) server 455 may enable vehicle 412, or may enable an end-user device within vehicle 412, to purchase and/or to configure ad-hoc credentials of a Virtual SIM that may enable vehicle 412 or an end-user device within it to be serviced by the second cellular network, for example, on a temporary or ad hoc manner, for a pre-defined period of time (e.g., one hour), and/or within a pre-defined road segment or geographical region, and/or for a pre-defined amount of packets or data (e.g., up to 1.5 gigabytes of downstream data).

In some embodiments, a V-SIM may be passed directly between vehicles using the vehicle-to-vehicle or other means of communication, without necessarily passing through the remote VSIM server 455, or where an instance or subset of the full such server 455 (or an equivalent VSIM allocation unit) resides within one or more vehicles to perform said action. This may reduce and shorten the latency or time in obtaining a VSIM, and may create new business models wherein the VSIM is exchanged or transacted between consumers or multiple vendors, and may be particularly relevant as the vehicle coming from the opposite direction may be aware of the most-efficient or the more-efficient VSIM or the most-efficient or the more-efficient cellular operator to be used by the transaction-partner vehicle according to its designated route; as the vehicle coming from the opposite direction may, in some situations, have more up-to-date or real-time information about the QoS, compared to a remotely-located VSIM server.

Optionally, vehicle-to-vehicle communications may be performed among vehicles 411-413, enabling vehicle 411 to transmit to vehicle 413 data indicating the current or previously-measured bandwidth or throughput or other QoS or QoE parameters that vehicle 411 (or an end-user device within it) had experienced during a certain time-slot (e.g., the most recent 120 seconds) and/or within a particular road-segment (e.g., along the 750 meters between Point A and Point B along highway I-95 Southbound); and/or other suitable information which may be actually measured by vehicle 411, or may be estimated or predicted by vehicle 411, or which may be received at vehicle 411 from vehicle 412; and/or exchanging resources such as VSIM or cellular networks credentials, or communications data or maps, or transmission rights or priorities from the networks if such are used.

For demonstrative purposes, also shown is a server-side Bonding/Multi-Link Agent 450, which may be cloud-based or may be part of a cellular gateway or cellular infrastructure, or may be part of a server of a content provider (e.g., Netflix server of streaming video), and which may divide packets that are intended for consumption at the vehicular media system of vehicle 411, across multiple links, such as (for example) a 4G cellular link of a tablet within vehicle 411 and a 5G cellular link of a smartphone within vehicle 411 and a 3G cellular (or satellite based) link of the vehicular cellular transceiver of vehicle 411 itself; and optionally utilizing also (or bonding also) transceivers that are located in vehicles 412 and/or 413 (or, transceivers or end-user devices that are located within vehicles 412 and/or 413) for the purpose of transporting packets of data into vehicle 411 or from vehicle 411. For this purpose, each one of vehicles 411-413 (and/or each one of the end-user devices that are within those vehicles), may comprise its own Bonding/Multi-Link Agent, such as Bonding/Multi-Link Agents 451-453.

Further demonstrated are various possible communication links that may operably connect between vehicles, or between a vehicular transceiver and an in-vehicle passenger device of the same vehicle, or between a vehicular transceiver and an in-vehicle passenger device of another vehicle, or between end-user (passenger) devices of passengers in two different vehicles; or between two vehicular Bonding/Multi-Link Agents, or between a vehicular Bonding/Multi-Link Agent and a passenger device's Bonding/Multi-Link Agent, or between a vehicular Bonding/Multi-Link Agent and a server-side Bonding/Multi-Link Agent, or between a passenger device's Bonding/Multi-Link Agent and a server-side Bonding/Multi-Link Agent, or the like. For demonstrative purposes, various such links are shown, such as 5G, 4G, 3G, 4G-LTE, 802.11p or other Dedicated Short-Range Communication (DSRC), satellite links, a local W-LAN within a vehicle, a wired link (e.g., between a passenger device and a vehicular system), a satellite link, or the like; other suitable communication links may be used, among these and/or other components of system 400.

Figure 2:
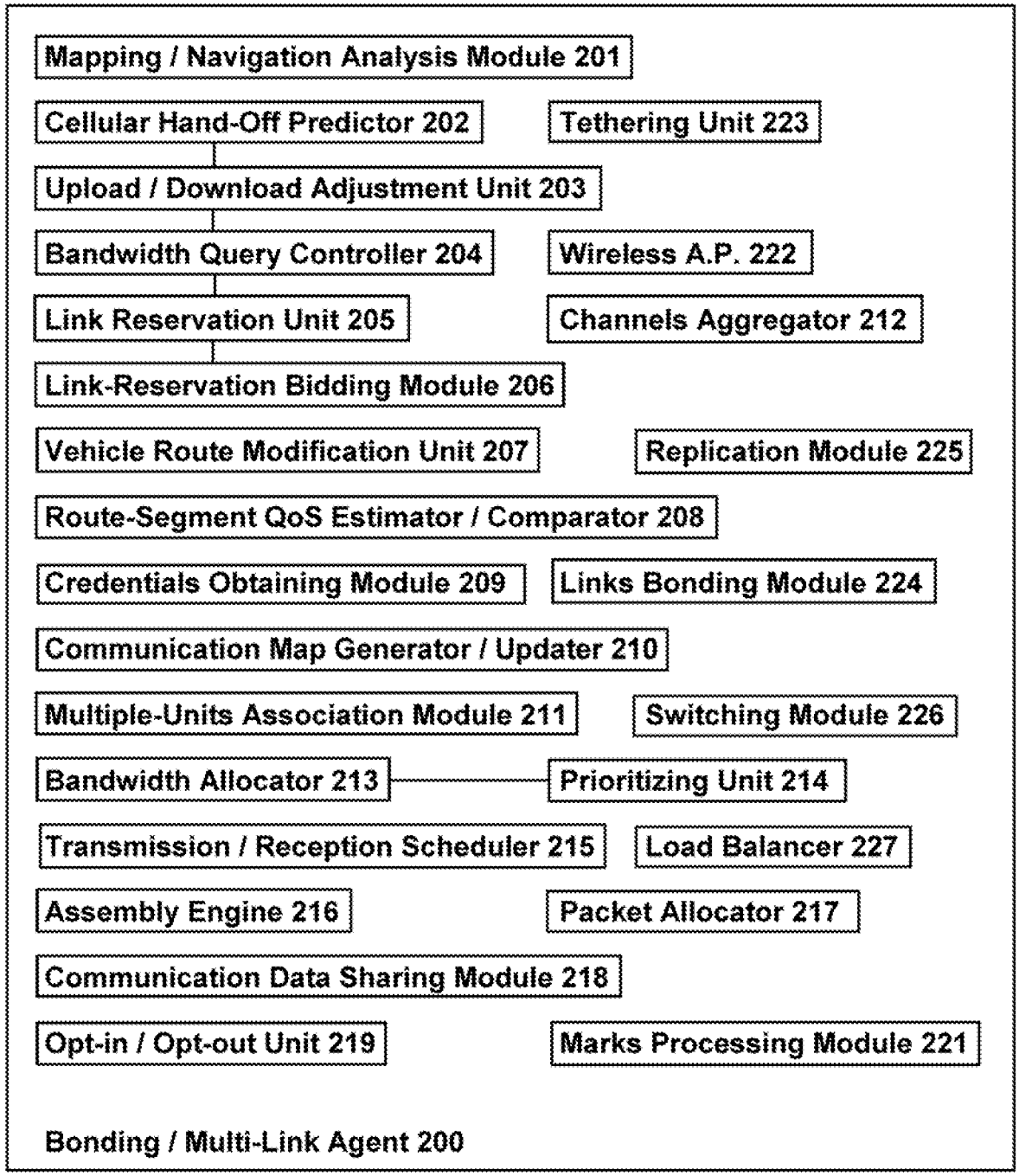
FIG. 2 is a schematic block-diagram illustration of a Bonding/Multi-Link Agent, in accordance with some demonstrative embodiments of the present invention.

Reference is made to FIG. 2, which is a schematic block-diagram illustration of a Bonding/Multi-Link Agent 200, in accordance with some demonstrative embodiments of the present invention. Bonding/Multi-Link Agent 200 may be a demonstrative implementation of, for example, Bonding/Multi-Link Agent 171, or Bonding/Multi-Link Agent 172, or Bonding/Multi-Link Agent 173, or Bonding/Multi-Link Agent 174, or Bonding/Multi-Link Agent 175, and/or other Bonding/Multi-Link Agent(s) that may be comprised in vehicle 110 itself and/or in any of the device(s) that are utilized by one or more of the occupant(s) of vehicle 110.

The Bonding/Multi-Link Agent 200 may comprise one or more units or modules able to perform, control, regulate, start, stop, pause, modify and/or implement the operations that were described above and/or that are described herein. For example, a Links Bonding Module 224 or similar unit may be responsible for, or may trigger or regulate, the operations that perform bonding or aggregation of multiple communication links and/or multiple transceivers in order to serve a particular application or a particular vehicular device or a particular in-vehicle device; for example, commanding a first device to utilize its transceiver in order to download packets that are then transferred or transmitted (e.g., short range) to another device in the same vehicle. Optionally, one or more functionalities may be implemented as a vehicular or mobile Wireless Access Point 222, or as a vehicular or mobile Tethering Unit 223 (e.g., wired tethering, or wireless tethering), or by other units or modules which may be suitable for utilization of multiple wireless links in aggregate by a particular application or device.

In some embodiments, Bonding/Multi-Link Agent 200 or other bonding layer (or a wireless bonding unit or a wireless bonding module or bonding circuitry, or wireless multi-link agent or unit or module or circuitry) may receive navigation or route information from navigation applications or processing engines or from the mapping/navigation system of the vehicle; for example, indicating which route this vehicle has chosen and/or is taking and/or is expected to ride. For example, a mapping/navigation analysis module 201 of Bonding/Multi-Link Agent 200, may receive or collect such data from the vehicular mapping/navigation unit; and may analyze and process the data, to determine that the vehicle is expected to drive from Albany to Boston in the next 180 minutes. The mapping/navigation analysis module 201 may then query with cellular network providers and/or with a pre-stored (local or remote) lookup table or database, and a Cellular Hand-Off Predictor 202 may predict or estimate or determine that a hand-off event (or hand-over event, from a first cellular cell, to a second and adjacent cellular cell, is expected to occur in approximately 90 seconds as the vehicle is expected to reach a particular mile-stone along the planned route. This may be updated in real time along the route, per information received by bonding device or the vehicle communication system over a V2V or V2X or cellular or any other communication network related or unrelated to the one being mapped, or dedicated by the vehicle or bonding processor according to real time data from the vehicle sensors and systems and from other means such as data received over the air from the networks or cellular towers or communicating devices along the route, or a third party service provider.

In some embodiments, for example, Bonding/Multi-Link Agent 200 or other bonding layer (or a wireless bonding unit or a wireless bonding module or bonding circuitry) may communicate its communication needs, current or predicted or future, and/or known or predicted or expected or estimated link(s) performance information, to the vehicle or passenger navigation or route information from navigation applications or processing engines or to the mapping/navigation system of the vehicle or the passenger(s). These systems or devices may optionally display the information, or use it as a parameter in their navigation and routing decision, for example choosing particular roads or routes or specific route segments with better overall/bonded or single-link or specific communications parameters in these segments in correlation with the known or expected communication needs. Display of the communication routes may be done in various ways; for example, by displaying the expected uplink/downlink goodput and/or delay/latency and/or any other QoS or performance or cost related parameters, for a particular route-segment and/or time-slot (interchangeably referred to herein also as time period or time-window or time duration). This may be done visually with different color categories or color coding, per route segments, per time slot, per link, and/or per the aggregated bonded links in aggregation. Communication congestion related to any of the specific links or the total, per route segment or per time slot, may be visually displayed in a distinguishable way, including audio alerts or on-screen pop-up messages or windows. Such information, received from the network or networks elements or from the multilink element or from any other source (or, estimated locally buy the end-user device or by the vehicular processor), may further impact the vehicle route selection, if the user so prefers or automatically, for example if it falls under certain QoS thresholds defined by the vendor or service provider or the user or default parameters. Such route selections may apply not only to communication congestion conditions, but also to any other communication state or status; for example, under normal, not congested communications, it may be predicted that in a certain vehicle route segment (e.g., the next 6 minutes of driving), the aggregated downlink bandwidth is estimated to be less than 1 mbps, or the lowest latency at a certain reliability level is estimated to be too high (e.g., above 2 seconds of latency at 90% reliability or certainty for all aggregated links or for any specific link); while on another route segment which may be taken to reach the destination, the communication QoS or parameters are predicted or evaluated or estimated to be better or higher at a certain level or percentage or absolutely or relatively; such that the driver (human driver, or robotic/machine-based driver) may select which vehicle route to take, optionally also in view of traditional vehicle route data such as distance and duration or road traffic congestion, or such selection may be performed automatically by the vehicle, according to predefined thresholds and conditions or according to machine-learnt patterns of the driver or passenger preferences and/or the used application patterns as also may be shared from other users over time and/or at these or similar vehicle or communication route conditions. Communication congestion may pertain to any QoS or communication delivery parameter, such as uplink or downlink goodput, throughput, bandwidth, latency, error rate, jittery behavior of any such parameter, number or percentage of lost packets or defective packets or erroneous packets or missing packets or re-transmitted packets, or the like.

Optionally, the Bonding/Multi-Link Agent 201 may communicate and synchronize with one or more known cellular tower or antenna or base-station (BTS) or base transceiver stations or eNodeB or Access Points or other infrastructure elements along this road or route or otherwise within its range, and may estimate or predict exactly or approximately when (or where) a handoff is going to be initiated and/or performed and/or when (and where) it is going to end, or when and where a certain state of communication congestion or lower performance or low performance is about to start and/or end; and may thus minimize or reduce the data packets sent over the communication link that is associated with that operator during such handover, and may re-load or resume or increase the amount of packets after such handoff is initiated or performed or completed; and/or may request to buffer in advance additional incoming/downloaded packets in order to ensure smooth playback of streaming media during the cellular hand-off event; or the like.

In some embodiments, the cellular hand-off predictor unit, operates (i) to estimate in advance an upcoming cellular hand-off in one or more available cellular connections, and (ii) to selectively and intentionally modify the performance parameters such as to reduce the amount of data-traffic that is generated and/or transferred over one or more available cellular connections during the estimated upcoming cellular hand-off. The reduction in the amount of data (e.g., data packets) that are transferred during the hand-off period, is an intentional reduction and/or selective reduction that is pre-scheduled in advance by the system and is intentionally performed, for example, in layer 1 or layer 2 of the seven-layer communication model; such that the application itself (e.g., in layers 3-7, or in layer 3 and above) does not necessarily know or is not necessarily aware of such pre-scheduled reduction. The advance knowledge or the advance estimate of the present invention, with regard to an upcoming or predicted hand-off event, enables the modem or transceiver, as well as its driver or managing-application, to know advance or to be aware in advance regarding such hand-off, and to selectively pre-plan the data transport, to pre-plan the amount of data to be transported and/or queued for later and/or obtained earlier, to modify one or more encoding/compression parameters of a data-stream to be transported (e.g., in order to reduce the number of packets), or the like.

Such operations of adjustment or modification or regulation of the uploading/downloading of data packets, may be performed or controlled by an Upload/Download Adjustment Unit 203 of the Bonding/Multi-Link Agent 200; and may be based on one or more pre-defined conditions or criteria, and/or based on dynamically-changing conditions or criteria (e.g., the current performance of each transceiver in the vehicle; the current upload speed and download speed of each transceiver in the vehicle; the applications that are currently running and/or that are expected to run during, before and/or after the predicted cellular hand-off; the consumption of data of such applications; weather conditions; vehicle location and velocity; the error rate or QoS indicators that are associated with each transceiver in the vehicle; or the like).

Furthermore, even partial information, such as when a handoff is going to be initiated, or end, or even approximated or estimated partial information, such as when approximately a handoff is about to be initiated, or end, either in absolute or relational terms, may be used by the Bonding device. The bonding layer or multi-link layer may prepare its transmission split or distribution of packets in advance, prior to the expected or estimated event. It can either stop, or start, or reduce, or increase, or modify the number or specific packets to be transferred, or change the structure of specific parameters according to other parameters (e.g., change such as size of packets or type of packets or due time of arrival or priority or FEC or other parameters) in relation to the expected event. It may also learn from the correlation between the expected estimated or precise event to the actual measured performance, so that it can optimize or modify its own behavior and algorithm for future similar events. Such later events may be identified either by similar notifications from the same or other network element as in the experienced event, or from the deduction of the patterns experienced even without such explicit notification. Further, the experienced or learnt or identified patterns (e.g., a pattern of gradual degradation of bandwidth as at the vehicle is progressing along a particular road-segment) may be shared with other vehicles, bonding/multi-link agents or devices, service providers, networks elements, or any other entity of interest, within the vehicle and/or externally to the vehicle. The same may apply to any other single or multiple wireless technologies, networks or service providers besides cellular and as listed above or herein. The same may further apply to any other communication-affecting event or occurrence besides a handoff (or hand-over), of which the wireless node or element may provide information to the vehicle communication system or bonding device; for example, automatic identification of a pattern of degrading bandwidth due to entering a road-segment that is located between two mountains, or within a valley, or in a certain weather condition, or the like.

The Bonding/Multi-Link Agent 200 may optionally further synchronize by signaling with or to the cellular or other infrastructure along the route; for example, by using a Bandwidth Query Controller 204 dynamically to query or request to reserve in advance (e.g., before the vehicle is on route; or during the vehicle's trip in real time) for bandwidth allocation according to the route, and/or to query about or request to reserve the bandwidth or goodput or throughput or performance or cost that it has or that it will have from its other communication links. This information may be used by the Upload/Download Adjustment Unit 203 of the Bonding/Multi-Link Agent 200, in order to optimize or modify its distribution of packets across the multiple different modems, transceivers, channels, links, technologies, networks and/or operators, that are associate with any one or more of the transceivers in the vehicle, while the vehicle is moving and/or in advance according to the selected route or planned route or estimate route. Bandwidth Query Controller 204 may be implemented as a central or distributed function, anywhere including in the cloud and/or the network edge devices, as long as it has communication with the relevant network elements associated with resource allocation. Communicating with this Bandwidth Query Controller 204 may be done over the existing network or operator, or via a proxy. Such proxy may be or may utilize, for example, a connection link over a different cellular operator, or via a V2X link, or via vehicles moving in the same direction or the opposite direction and used as relays of the communications for that specific vehicle (and/or others) with that Bandwidth Query Controller 204. In this last example, of other vehicles used as relays of such information, the requests may be transferred to the Bandwidth Query Controller204, yet its positive, or negative or informative response fails to reach back to the conveying vehicle or network element, or fails to be properly returned to the requesting device in the requesting vehicle; but still, the query or request may be used by the network element in order to allocate in advance some or all of the resources, even if only partial communications exist with one or more of the vehicles, and/or even if a particular vehicle failed to properly transmit a particular response.

Such queries and/or requests to reserve resources may be used by the wireless network infrastructure, or entities or function or management to plan ahead or in advance its resource allocation, in full or partially, both or the requesting device and/or for all others served or to be served by it in the predicted period (start and/or end and/or duration). For example, it may predict, even if only queried, that at a certain range of time in the future (e.g., a forward time interval, or a future time slot) a certain traffic load is expected, either in the downlink into the vehicle modems or in the uplink from it. This estimated or certain traffic may be predicted in general parameters such as goodput, or in parameters such as goodput for a specific QoS or service or even application, or priority.

The operations of the Upload/Download Adjustment Unit 203 of the Bonding/Multi-Link Agent 200 may be based on one or more criteria or conditions or goals that may be pre-defined or may be modified by the user; for example, a goal of reducing monetary cost, a goal of obtaining the highest possible through-put for the longest possible time, a goal of maintaining at least a threshold value of throughput for at least N seconds of travel or for at least M miles of travel, or a goal of maintaining a certain battery level (or minimal usage) of a certain handheld or other specific device, or the like.

Optionally, the Bonding/Multi-Link Agent 200 may operate in advance to reserve requested capacity on the infrastructure, to negotiate with the infrastructure for capacity, and/or with other vehicles in the vicinity so that they may give up some of their used bandwidth so that this vehicle can use it for example in case of safety emergency that requires a lot of safety related streaming to be transmitted such as LIDAR and cameras for remote assisted driving in case of emergency, or collaboratively with such other vehicles in an ad-hoc local manner decide or transact how to split or use the available resources by each of the participating vehicles and their respective Multi-link Agents so that the needs of each vehicle and passengers are optimally met considering the current available networks and connection performances or costs, and/or to optimize the actual resources being reserved according to this negotiating with one or more operators or networks. In some embodiments, a Link Reservation Unit 205 may operate to reserve or to obtain, in advance or in real-time during the trip, a dedicated or a shared communication link or multiple communication links, that will be utilized by one or more transceivers within the vehicle, and that will have a minimum through-put guaranteed either in the uplink or downlink or both, or a specific latency, or any other QoS parameter, or as close as possible to such parameter, or reserved for it or for them. For example, if a particular cellular network has reduced capacity or less capacity on a certain tower or Base Transceiver Station (BTS) or in a certain area, or predicts or estimates to have less capacity there at the requested time (e.g., based on past performance, for example, based on the fact that during "rush hour" this cellular tower is congested), then other network elements (e.g., of the same operator, or of other networks or other providers or other operators) may be able to provide the required capacity in that coverage area, such that the bonding layer may plan ahead to split the bandwidth differently than initially envisioned or defined.

Since there may be various alternatives or combinations of how to split or allocate or distribute the desired traffic amongst multiple links or operators or networks, such dynamic allocation or in-advance requests and reservation can be optimized versus the conventional case of having just one single link or one single modem or one single operator that has to serve the entirety of the vehicle's applications and therefore having no conventional options to split or divide the traffic or bandwidth among several resources or networks or providers, and thus having very little room for optimizations or decision making in a conventional traditional system.

In some embodiments, negotiating with external communications networks or infrastructures, or network elements or network nodes, may also take the form of bidding or real-time bidding or in-advance bidding between them or among them, either for the entire performance, or for part of the performance, that is needed for all or some of the applications, or for lower cost, or a combination of these or other conditions or criteria; and such operations may be performed by a Link-Reservation Bidding Module 206 of the Bonding/Multi-Link Agent 200.

For example, the Bonding/Multi-Link Agent 200 may request a reliable HD streaming-video downlink, of at least 10 megabits per second downstream (incoming to the vehicle), for the route-segment between Boston and Springfield, for the future time period of 2:15 PM until 2:55 PM; and two or more cellular providers or other providers may bid on providing such connectivity, and the bonding layer may select the bidder based on lower-cost, based on higher-guaranteed-bandwidth, lowest latency, lowest estimated consumption needed from the battery of the passenger smartphone or other criteria. Such bidding may be performed in advance, prior to the time-slot being used and while the vehicle is not within the route-segment; or, such bidding may be performed in real time, while the vehicle is within that time-slot and/or within that route-segment.

When part of the communication performance is obtained from such an external element or network element or network node, the Bonding/Multi-Link Agent 200 may ensure that it is utilized up to that agreed (or pre-negotiated, or pre-purchased, or pre-reserved) performance threshold or bandwidth threshold, and the Bonding/Multi-Link Agent 200 may utilize other communication links to fulfill any remaining requirements for bandwidth or throughput.

Optionally, the Bonding/Multi-Link Agent 200 optimizes the bonding algorithm so that it does not try to utilize the negotiated or purchased or reserved link or links beyond the reserved capacity, as it knows in advance the negotiated performance and it prevents an attempt to exceed it (e.g., by one or more of the vehicular applications). The Applicants have realized that trying to load or to over-load or to utilize as much throughput until performance breaks down, may in some cases or networks be a problematic practice in conventional systems in which the actual performance characteristics are not known in advance and/or are not reserved in advance, and might result in performance changes, performance quality fluctuation, loss of reliability, loss of packets, packet retransmissions, increased error rate, reduced effective throughput, or other problems. In accordance with the present invention, a "load-up-to-a-mark" process of utilization may be performed by the systems of the present invention, such as when the bonding performance of at least one of the communication links is deduced from other vehicles that are commuting in similar routes, or when other vehicles inform the present vehicle of the performance characteristics that they experienced when coming from relevant routes or directions, or the like.

The Bonding/Multi-Link Agent 200 or other suitable bonding device or bonding infrastructure or bonding architecture or bonding unit or bonding module, or other network infrastructure or network element in accordance with the present invention, may also affect or modify the selected route of the vehicle's navigation towards its destination according to the communications demands, performance, current performance, past performance, and/or predictions. For example, a passenger is watching 4K video or HD video in the vehicle, having a long video duration (e.g., 90 minutes). The vehicle is intended to drive along a first route which is the shortest geographical route to its destination. However, the Bonding/Multi-Link Agent determines or estimates or predicts, that the performance of a single communication link or of a combined bonding link (made of an aggregate combination of any combination of multiple communication links) is below a pre-defined threshold (or, its monetary cost to a minimum through-put or bandwidth is above a pre-defined threshold or latency is above such threshold or current or predicted desired level or similarly cost or battery consumption from/by any of the participating communication devices or any other QoS or other parameter), or that it may not satisfy the communications traffic or bandwidth consumption demand in too many geo-locations or route-segments along the planned route or on average or for too long during the commute. Based on such determination or estimation or prediction or evaluation, of a reduced video quality or increased artifacts or lower bitrate communication or increased delays or increased latency or excessive buffering delays or other Quality of Experience injuries, a different travel route segment may be chosen or recommended or selected by a Vehicle Route Modification Unit 207 (or by a Route Segment Selector module) of the Bonding/Multi-Link Agent 200 (or of the vehicular mapping/navigation system, or associated therewith), or a modified travel route or a replacement travel route may be automatically generated and suggested to the driver, in which a better or more-satisfactory communications allows the passenger or passengers in that vehicle to satisfy their and the applications' communication needs.

In some embodiments, route modification or adjustment or replacement, may present to the driver or operator of the vehicle a message indicating a suggestion to modify or adjust or replace the route, and the reason for such suggestion (e.g., to ensure high-quality HD video streaming); and may actuate such modification only if the driver or operator signals his consent or approval, In other embodiments, the system may be pre-configured to automatically or autonomously perform such route adjustments, without the need to request driver consent on a case-by-case basis; for example, based on pre-defined conditions or criteria; such as, an advance general permission to modify the route, if the route modification is expected to increase the through-put of communications by at least N percent (e.g., by at least 25 percent, or by at least 40 percent, or the like), and at the same time the route modification is expected to increase the travel time by no more than M minutes, or by no more than P percent, or is expected to increase the travel distance by no more than K kilometers, or no more than P percent. or automatically according to default preferences of the passenger and the system or to thresholds; for example, such as if the shortest commuting time has "very bad" or non-satisfying connectivity for the expected connectivity needs in above a certain percentage or absolute duration of the drive and the connectivity-satisfying route is expected to be longer in commute time by less than another absolute or relative value, then automatically prefer the better connectivity-driven route.

In some embodiments, the driver may indicate in advance that route modification is allowed only in order to achieve a first particular goal (e.g., to ensure high-quality streaming audio), and not in order to achieve a second particular goal (e.g., to ensure high-quality streaming of HD video or most safe route for potential remote driving intervention that may require high throughput LIDAR and multiple camera streamed transmissions). Other suitable conditions or criteria may be used.

In some embodiments, the method and system may comprise, for example: (a) determining that a user, that may be a human user or passenger or a non-human autonomous car processor or remote or local travel manager element, wishes to travel or command or plan a travel, or is travelling/commanding to, or intends to travel/command to, from its current point or current location (or, from an origin point or original location), to a destination point or a destination location; (b) determining that there exist at least two routes to travel to said destination point, for example, Route 1 and Route 2; then, (c) collecting data and/or receiving data and/or analyzing data pertaining to the QoS of the wireless connectivity along Route 1, or communication performance, or IP connection performance, and generating a metric or an estimate QoS score or parameters set or vector indicating the QoS of the wireless connectivity along Route 1, or receiving such analyzed data from a remote server, or contributing data for such analysis by another device or by a remote server; and, (d) performing similarly data collection or data analysis for Route 2; and then, (e) selecting to guide the user to travel via Route 2 and not via Route 1, based on, for example, a determination that the QoS metric of Route 2 is greater or otherwise better suited or have a better matching in one or more performance parameter(s) to the user (or users) communication needs, current or forecasted or predicted or typical or average communication needs, than that of Route 1; or alternatively, based on a determination that the QoS metric of Route 2 is greater or otherwise better than a pre-defined threshold value, or based upon a determination that the QoS metric of Route 2 is greater or otherwise better by at least K percent (e.g., by at least 20 or 25 percent) than that of Route 1. One or more of these operations may optionally be implemented by a Route-Segment QoS Estimator/Comparator 208 of the Bonding/Multi-Link Agent 200.

Such determinations may be performed even though, for example, Route 1 is shorter in length and/or shorter in travel-time or is less traffic-congested, relative to Route 2. Such determinations may be performed, for example, if the system already knows, or predicts, that the user intends to consume large amount of wireless data along the route, or would require to have a reliable high-speed wireless connection along the way; e.g., based on detecting that the user has already commenced playback of a streaming high-definition (HD) or 3D or AR/VR immersive video, or based on analysis of prior trips of that particular user (e.g., to that particular destination, or to other destinations) in which the user has consumed large amount of wireless data during the trip (e.g., larger than a pre-defined threshold value), or based on a user request to select the route that has a better, faster and/or more reliable wireless connection or connections or above certain QoS or other communications or applications QoE thresholds or levels or ranges, or based on knowledge that Route 1 has, in general or currently (for example due to some infrastructure failure) poor IP communication performance that are typically inferior to the IP communication performance matrix required by sufficiently most, or deducing such knowledge from similar previous analysis of same or similar travelling routes or road-segments and/or communication or QoS statuses or requirements, or sufficiently similar, other users.

In some embodiments, the determinations may optionally include: discarding a particular travel route that has at least one route-segment in which wireless connectivity is not available at all, for at least K seconds (e.g., for at least 20 seconds) and/or for at least N meters (e.g., for at least 400 meters), or too low to enable proper Quality of Service (QoS) or Quality of Experience (QoE) as desired by one or more applications needed or requested by the user. Other suitable determinations may be used.

The decisions or recommendations made may take into consideration other or additional, non-communication, route-related parameters, such as target time to arrive at the destination, speed, road segments' physical conditions, geographic length or routes, traffic jams, traffic accidents, current or predicted weather in each route, and/or other parameters; and may make an all-inclusive weighted decision or recommendation.

The decisions or recommendations may be made by the Bonding/Multi-Link Agent 200 or by other circuitry, or by a function of the Bonding/Multi-Link Agent 200, or by another processor which may be local or internal to the vehicle or may be external or remote to the vehicle; which may utilize this data from the local Bonding/Multi-Link Agent or from remote Bonding/Multi-Link Agent(s) which may be implemented on one or more remote servers or gateways or databases and/or on other vehicles travelling the same route or in different routes. For example, an application running on one of the vehicle processors, or on the driver's smartphone, may receive information about the expected communication map or parameters or performance of the connectivity along the route, and may display it to the user on a touchscreen or another interactive display on a graphical 2D or 3D geo-location based map as a graphical map-based overlay or layer, or in an Augmented Reality (AR) way or in another way, and may perform a decision or a recommendation algorithm based on this data and/or on other data such as being received from the vehicle sensors, from the smartphone sensors, from the road infrastructure, from remote servers, from a remote bonding server that performs handshake with the vehicle's bonding circuitry, from databases, etc. The information may be received from any part of the Bonding/Multi-Link Agent functions or processors, by either push or pull mechanisms, over wired or wireless interfaces, synchronized between them or not in terms of arrival and/or in terms of inter-relevancy between them.

In other embodiments, the decision or recommendation being implemented may be to request, or to receive from a remote server (e.g., if the decision is taken by a remote processor), a set of credentials for connecting at least one of the wireless modems or transceivers to a new or replacement or ad-hoc network or operator or provider; and this may be performed by a Credentials Obtaining Module 209 of the Bonding/Multi-Link Agent 200. For example, due to the communication map and expected bonded communication performance and the specific performance per each available network operator, a decision may be taken by the Bonding/Multi-Link Agent 200 to request a remote server for a temporary set of credentials (e.g., username and password) to associate at least one of the bonding modems or transceivers, such as the vehicle's own cellular modem, with another cellular operator; optionally, for a temporary period of time or for a particular pre-defined geographical area or coverage area or travel distance or travel time or up to a pre-defined number of packets or data capacity (e.g., up to 450 megabytes of downloaded data within the next 60 minutes). For example, the Bonding/Multi-Link Agent 200 may request, obtain or receive a new virtual SIM card (V-SIM or VSIM) or electronic SIM card (eSIM), or a virtual or electronic Universal Integrated Circuit Card (eUICC) of any industry or standard body standard or practice, or other set of credentials may be obtained to allow ad-hoc or temporary connectivity of a transceiver in the vehicle with a particular wireless/cellular network or provider. Additionally or alternatively, the Bonding/Multi-Link Agent 200 may request a remote server or remote database of such network operator, to update its record and to reflect authorization for particular transceiver(s) of (or within) the vehicle, for example based on MAC address(es) or based on other unique identifier(s), to temporarily connect to (and be serviced and served by) such network or provider.

Once received, and at the appropriate timing according to the measured performance of each of the bonded links and of the communication map and movement route and movement parameters such as speed, the Bonding/Multi-Link Agent 200 may load or inject the new set of credentials into one (or more) of the cellular modems or wireless transceivers of the vehicle or within the vehicle; such that those wireless or cellular transceivers would start using cellular operator/network B instead (or in addition to) cellular network/operator A.

Optionally, the additional or ad-hoc credentials may be locally stored by the Bonding/Multi-Link Agent 200 or may be associated with it, such that there is no need to request or to receive packets and/or credentials from a remote server but rather the Bonding/Multi-Link Agent may load or transfer into one of the wireless modems or transceivers such credentials from a local storage. In some embodiments, a set of such credentials may optionally be pre-installed or pre-downloaded into the Bonding/Multi-Link Agent, for example, by a manufacturer or vendor; or may be later downloaded or replenished by the Bonding/Multi-Link Agent by obtaining them from a remote server.

Optionally, the credentials may be sent or received via a completely different network or link or channel or networking technology or modem or transceiver, such as an IoT modem, a V2X modem, or Satellite modem or WiFi modem or other suitable means. Additional commands for management or control or monitoring of the credential-related or associated usage may be done over this different link or channel.

The decision or recommendation to command a particular wireless modem or transceiver, to use a different network or operator in the bonded communication, may be part of an overall decision of which travel route to recommend for the vehicle, such that instead of changing a travel route of a vehicle, if using a different operator or network is possible and may result in better or sufficiently good communication link(s) or communication matrix (e.g., beyond a pre-defined threshold value of QoS or QoE), then the overall recommendation may be to keep using the shortest route travel route (in time and/or in distance) while in parallel to switch one or more of the transceivers in the vehicle from utilizing cellular network A to utilizing cellular network B (in addition to, or instead of, cellular network A). This may optionally include cases in which changing the operator or network may result in increased communication costs, which may be factored and weighted into the decision making of the vehicle route matrix; for example, based on a vehicle owner's decision or definition that enables the Bonding/Multi-Link Agent to autonomously make or to suggest such network changes if their cost is not more than a pre-defined threshold value of monetary cost per trip or per mile traveled or per minute traveled (e.g., allowing in advance the Bonding/Multi-Link Agent to perform such changes autonomously during the trip, if the cumulative changes result in a total additional cost of up to 5 Dollars per 30 miles of travel, or up to 6 dollars per 45 minutes of travel).

Some embodiments may utilize one or more buffers, as well as one or more rate controllers or rate regulators or rate modifiers, which may be associated with a video decoder or a video player or a video trans-coder or a video converter, which may be included in the Bonding/Multi-Link Agent or in bonding circuitry or in the user devices connected to it in the vehicle or in the vehicular system. When the expected bonded performance is foreseen to go below the demand, such as for goodput or throughput in a certain timeframe of a video being watched in the vehicle, then the buffer may ask for or may request, or may obtain or receive or get by push operations, more packets from the remote server or streaming source, such that it may expand its buffer size (if needed) and/or store them or buffer them. Later, when the bonded communication decreases so that insufficient number of packets are received (or are properly received) from the remote source or server, then the stored or buffered packets may be released via the rate controller or other rate regulator to the video player.

In some embodiments, advance storage of such packets may be a better option than expanding the receiving buffer, as it does not change the buffer itself. In this case when the buffer does not have packets to transmit or to output, or when its fill percentage goes below a certain threshold, or when the Bonding/Multi-Link Agent considers asking the remote bonding server to resend data or packets instead of missing ones in its buffer, then the Bonding/Multi-Link Agent in the vehicle would first look in the local storage of already-received packets. If the required packets are in the local storage then it moves them or transports them to the consuming application (e.g., the vehicular media player), together with sufficiently-close packets.

In some embodiments a processor or module may display the bonded communication map, correlated or synchronized to geo-location coordinates or to communication infrastructure identifiers or elements, or independently, including experienced data, current data, estimated or predicted data, historical data, or other data. This map can also be displayed as an Augmented Reality (AR) data layer over another map or as a Virtual Reality (VR) or 3D layer or video (e.g., of the route) or LIDAR image or video or hyperspectral image or video or other. The map may present to a user in the vehicle, or to remote user(s) in other location(s), the performance of the bonded communication of all the transceivers of or in the vehicle, of each one of the communication links, of a potential combination of some of the existing or other communication links (for example, if the SIM or eUSIM/VSIM and operator of some of the links would be changed to another network or operator, simulation or emulation of the newly bonded communication may be generated and displayed).

The display may represent the current time, future time, or past time in relation to the corresponding communication levels. For example, the communication map can show the predicted communication levels, in color-based graphical legend, over potential travelling routes from geo-location to geo-destination, using selected combinations of links, modems, transceivers, operators and networks, in M minutes from the polling time (e.g., in the next 40 minutes) because this may be the time the user asked for or this may be the time-frame that is known or expected to be the travel time or commute (e.g., based on historical data; or based on data from the vehicular mapping/navigation system that indicates 40 minutes remaining until arrival to destination point).

Optionally, the map—which may be generated by a Communication Map Generator/Updater 210 of the Bonding/Multi-Link Agent 200—may also show the calculated or estimated or predicted or determined metrics, the matching of the performance or QoS or QoE or cost or battery consumption or other parameter types correlation to specific or types of applications (such as: "The communication in Route Segment 1 would be adequate for HD streaming video", or "The communication in Route Segment 2 would be inadequate for high-quality streaming audio but would be adequate for Voice Over IP communications", or "The communication in Route Segment 3 is expected to be unreliable or spotty and may be sufficient for performing a Google search or for cursory Twitter posting but not for consuming Facebook streaming videos", or "The communication in Route Segment 4 is expected to not be reliable or sufficient enough for safe remote-assisted driving option or support if needed" or the like), the different levels of service that are expected in different route segments or in an entire route, expected communication congestion periods and expected congested route segments when using bonded communications or when using each or any combination of the potential cellular or other networks and operators or links in the devices' modems or transceivers, or in another form.

The user may use this display and interfaces to select the route, to select a combination of networks and operators, or for any other command option of the Bonding/Multi-Link Agent 200, or to command a remote bonding circuitry or remote server, or to command or modify the applications or Bonding/Multi-Link Agents of his own mobile device(s) and/or vehicular device(s).

The generated map (which may be dynamically updated and modified by the system in real time) may provide to the user application-level quality or QoS or Quality Indicators, as well as quantitative view of the bonded communication, rather than presenting a physical level or MAC level, or rather than merely presenting Received Signal Strength Indicator (RSSI) or signal strength or signal level or cellular reception (e.g., indicated in "bars") which are general and are not at an application level. Conventional RSSI data may be useless, or at best may server merely as indirect or vague indication, to the specific or actual or potential performance of a particular modem or link or transceiver at a particular route-segment and/or at a particular time-slot. The map generated by the present invention provides application level communication data (e.g., predicted, estimated, historical), or IP performance level view of such data, that allows the user to understand what types of communication(s) the user and his various application can expect now or soon or in the future or were experienced in the past, in the vehicular route or route-segment or in other potential routes or modified routes or in replacement routes), when using this bonded communications link or another one or a modified one, as well as its expected Quality of Experience (QoE) and quality of ride in terms of passing the time by the driver and/or occupants of the vehicle.

Figure 3:
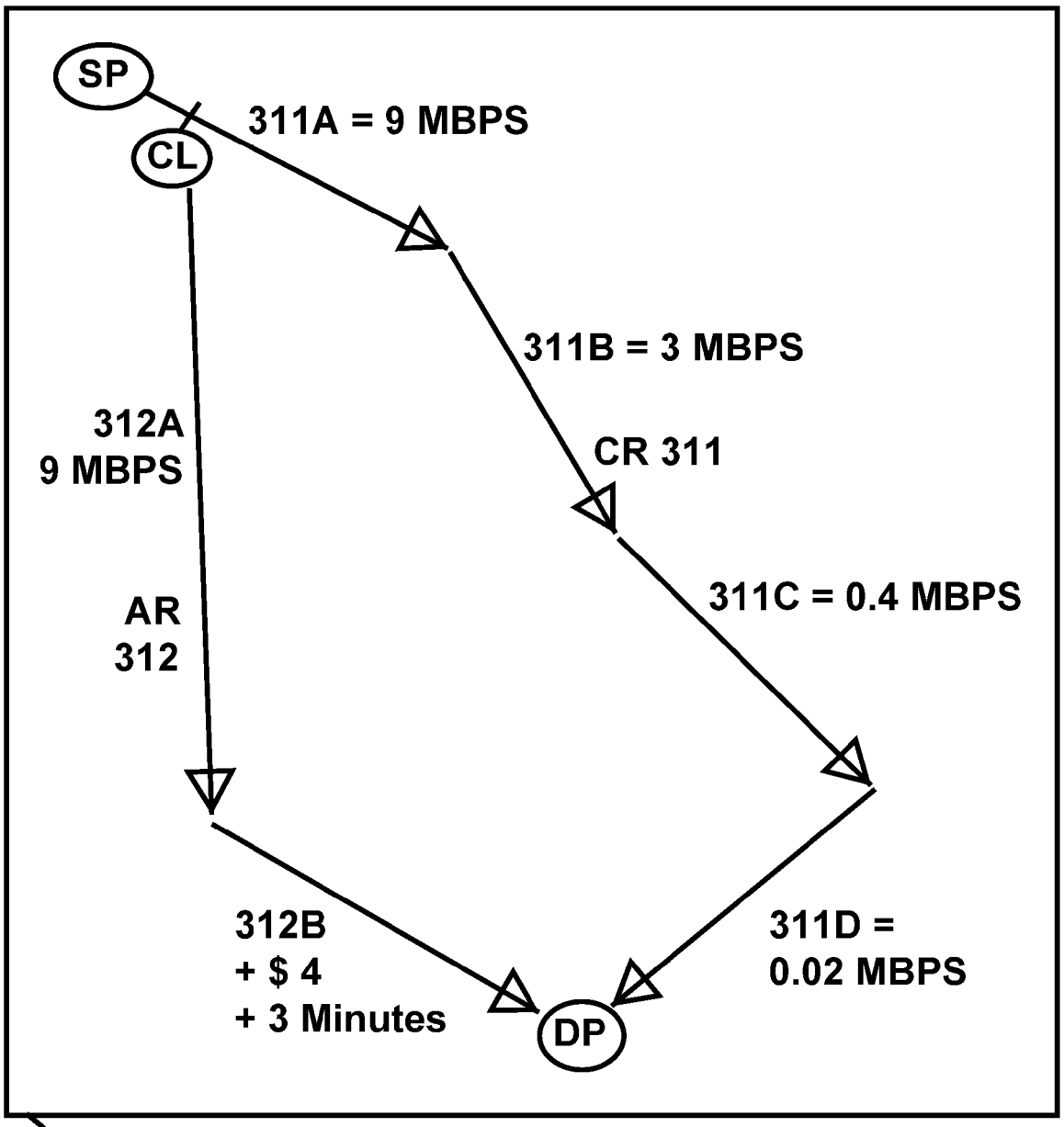
FIG. 3 is a schematic illustration of a communication map generated by some demonstrative embodiments of the present invention.

Reference is made to FIG. 3, which is a schematic illustration of a communication map 300 generated by some demonstrative embodiments of the present invention. Communication Map 300 may be associated with or based on predicted data pertaining to a future time interval (e.g., during the next hour from now), or may be associated with a past or historical time interval (e.g., yesterday at 3 PM, or during yesterday's trip on the shown route).

In a demonstrative implementation, Communication Map 300 depicts a starting point (SP) 301 and a destination point (DP), and further indicates the vehicle's current location (CL) 303 as well as various points-of-interest (e.g., names of cities, towns, rivers, establishments or the like). Communication Map 300 shows a current route (CR) 311 that is being travelled by the vehicle; and also shown a possible alternate route (AR) 312 that may be taken in order to reach the destination, optionally indicating also the difference in travel-time and/or in travel-distance if the alternate route is taken instead of the current route.

Along the current route 311, the Communication Map 300 indicates multiple travelling route segments, for example: a route segment 311A, which may be shown in Green color, or with other legend or indicator or comment to indicate to the user that in that route segment there is expected to be superb bandwidth of the combined or bonded communication links (e.g., 9 MBPS) in a manner that allows the multimedia system of the vehicle to smoothly stream an HD streaming video; a route segment 311B, which may be shown in Yellow color, or with other legend or indicator or comment to indicate to the user that in that route segment there is expected to be mediocre bandwidth (e.g., 3 MBPS) of the combined or bonded communication links in a manner that does not allow the multimedia system of the vehicle to smoothly stream an HD streaming video but that allows the multimedia system of the vehicle to smoothly stream stereo audio music; a route segment 311C, which may be shown in Red color, or with other legend or indicator or comment to indicate to the user that in that route segment there is expected to be poor bandwidth of the combined or bonded communication links (e.g., 0.4 MBPS) in a manner that does not allows the multimedia system of the vehicle to smoothly stream an HD streaming video or even stereo music but does allow the navigation system of the vehicle to rapidly communicate with a remote navigation/mapping server; and a route segment 311D, which may be shown in Black color, or with other legend or indicator or comment to indicate to the user that in that route segment there is expected to be zero or near-zero or almost negligible bandwidth of the combined or bonded communication links (e.g., 0.02 MBPS) or a high latency end-to-end or end-to-interim node (e.g, above 200 milisecs) or other in a manner that is expected to effectively put offline all (or some of, such as the safety or any particular) the vehicular system's (including the vehicular mapping/navigation system) for a certain duration of travel or for a certain travel distance.

In some embodiments, instead of (or in addition to) utilization of a color scheme, width of lines may be used to indicate the predicted or estimated bandwidth in a route segment. For example, a route segment shown at an increased width, indicates an increased or greater bandwidth that is predicted along that route segment; whereas, a route segment shown at a reduced width, indicates a reduced or smaller bandwidth that is predicted along that route segment.

In some embodiments, optionally, names or graphical representations or indicators of particular applications (e.g., YouTube, Netflix, Skype, Facebook) or of particular types of applications (e.g., Streaming Video; Streaming Audio; VoIP; Mapping, video uplink streaming, etc.) may be shown at or near each route segment in the generated map, indicating which application(s) and/or which type(s) of application(s) are expected to have sufficient bandwidth in that route segment.

It is noted that even though a major portion of the United States and other western or other countries have cellular reception, Applicants have realized that there still exist many various areas or regions of no coverage or no cellular reception, for example, in dessert areas or in mountains area or in rural areas; and the Communication Map 300 generated by the present invention may be not only a tool for improving the driving experience or the riding experience, but also a crucial tool that can save human lives or can otherwise prevent or mitigate situations in which a driver is stranded or stuck in an area that has no or poor or insufficient cellular reception. For example, the driver may utilize the Communication Map 300 to avoid taking a route that has a Black route-segment; or to take a route that has only "yellow or better" route segments (and to avoid either Black or Red route segments), or an autonomous vehicle or autonomous travel management system may select travel route segments that provide continuous communications at any point in time or with minimal predefined allowed communication breaks or low performance, or the like.

As autonomous driving and self-driving vehicles become a reality, the predictions of travel duration, time, arrival at various geographical points and locations and regions, may become more synchronized and predictable due to several reasons. Therefore, predictions or evaluations or estimates of the IP communication map, communications performance, QoS and QoE and their correlation to geo-location and time, may become more accurate as the correlations become more tight or coupled. The multilink or network or vehicle travel management elements in accordance with the present invention may provide a map of the IP communication and application level QoS and QoE correlated closely to the geo-location and other physical travel routes, optionally also correlated with a particular time-slot or time-interval (e.g., the next 5 or 30 minutes); making the manual or automatic selection between different physical geo-travel routes based on such mapping more accurate and more useful, enabling larger scaling of the system, allowing more in-advance planning, tight resource allocation and reservations and requests from or by the communication networks or service providers, reduce overhead, reduce switching between communication links in the multi-link communication, and/or other benefits or advantages.

The Communication Map 300 may further indicate to the user that in the alternate route 312, there are predicted to be multiple route segments such as, for example: alternate route segment 312A which is Green similar to route segment 311A and is similarly expected to have an estimated total bonded bandwidth of 9 MBPS; and also, alternate route segment 312B which is expected to be Green (e.g., estimated total bonded bandwidth of 9 MBPS) but would require payment of 4 Dollars in order to connect the vehicle or its transceiver(s) to a particular alternate cellular network that will provide enhanced communications in that particular alternate route segment 312B, and that would require additional 3 minutes of travel time. The driver may select to switch to the alternate route; or the driver or other management element may command the system in advance to autonomously or automatically make such switch or modification of the route if certain user-defined conditions hold true.

In some embodiments, data about link, network, operator, geo-location, time-of-day, dates, areas, towers antenna, base stations, base transceiver station, access points, network elements, IoT infrastructure, VSIM operators or similar data may be collected from (or by) the Bonding/Multi-Link Agent and/or by other units (e.g., a remote server, or a consuming device such as smartphone or tablet or vehicular unit). The data may be used to construct a "profile" or a map or a "bonded communication map" of the available communications performance in two dimensions, or in three dimensions (e.g., indicating also mountains and valleys in a three-dimensional manner), or in four dimensions (e.g., indicating also the passage of time), with regard to of each or all of the networks and operators and providers and towers according to the usage, utilization and measured performance of a single device being used and aggregated statistics of multiple of such bonding devices, being in the area at the same time or at different times.

Such profile or data may be used for subsequent bonding, or by other communication devices to predict or evaluate the performance that they will experience (e.g., in a four dimensional manner) when moving through this mapped area, to predict or to estimate to what level or mark of performance to try and utilize for each one of its communication links that may have appeared in the map, or to update existing maps used by other vehicles. Such prediction of the load on each link, or network, or operator (including several modems or links using simultaneously the same network or operator and bonding its performance from one infrastructure element such as BTS or antenna or sector, or several of such), may reduce the number of lost or erroneous packets, may reduce the incidents of increased latency due to such failures, may reduce upstream and/or downstream loading retries, and may otherwise assist in optimizing or increasing an otherwise under-optimized or non-optimized set of communication links and their performance.

In other embodiments, the Bonding/Multi-Link Agent or circuitry is associated with the vehicle communications device, which may contain a SIM card and/or cellular modem and/or cellular transceiver, and/or other means to communicate wirelessly with remote server(s) and/or with Internet destinations; which may connect with and communicate over a cellular network and/or other networks (such as, for example, Vehicle to Vehicle (V2V) or Vehicle to Infrastructure (V2I) or Vehicle to Anything (V2X) or other suitable networks). The present invention may add to such vehicular device or transceiver, a Multiple-Units Association Module 211 or other suitable means to associate between (or among) the vehicular unit and other wired and/or wireless communication devices in the vehicle, such as one or more cellular devices or smartphones or tablets or smart-watches of the driver and/or of passengers, as well as other mobile or portable devices, other communication devices installed in or on the vehicle such as satellite communication devices, or other suitable devices. Such means to communicate or to improve or enhance the communication, or the bandwidth or through-put or good-put, may include a Wi-Fi or 802.11X/DSRC or other hotspot or access point or transceiver or ad-hoc network or link, communication cables, cradle to place a mobile device in, ad-hoc network communications, Bluetooth hub, USB hub, wireless USB, or others. In this way, the vehicular device(s) having the Bonding/Multi-Link Agent(s) or similar bonding layers, may connect with the other communication devices, ask them or have them sign in or sign out for being part of the bonded communications system, and use them in part or in full, continuously or momentarily or for a pre-defined time-slot or while the vehicle is travelling a long a particular route segment, as part of a broadband "super modem" or "aggregated transceivers" access connection that it establishes with the one or more external networks or operators or providers, by aggregating the capacity and/or bandwidth and/or throughput from one or more of these devices and/or transceivers with the vehicular wireless device(s) and combining them together; thereby offering an improved or enlarged total bandwidth or aggregated capacity or enhanced performance to one or more applications running on the vehicular device(s), connected vehicle processors, or other participating/contributing devices processors or transceivers, or any other processor running an application or software and requesting capacity or bandwidth in or around the vehicle. In some embodiments, the aggregate communication link may be combined out of two or more other links, or may be generated by regulating and/or controlling and/or associating the operations of two or more transceivers of the vehicle and/or in the vehicle, by the suitable Bonding/Multi-Link Agent (e.g., of the vehicle, or of one or more of the end-user devices), or optionally by a Channels Aggregator 212 or other suitable module which may be implemented as part of the Bonding/Multi-Link Agent or may be associated with it.

The bandwidth or goodput or throughput or capacity allocation between (or among) multiple applications and/or or multiple devices and/or multiple users and/or multiple transceivers, some of which may be contributing to the total aggregated bandwidth or through-put, or load balancing or otherwise splitting (or dividing, or allocating) applications or connections or packets between the links, or switching between or among them, or using one or more of the modems or transceivers or connections by one or more of the said multilink methods, may be performed by a Bandwidth Allocator 213; and optionally, may be prioritized by a Prioritizing Unit 214 or may be ranked or dynamically adapted or modified correlated with one or more conditions or parameters, the contribution each one makes to the overall ad-hoc "community" of aggregated users or applications or transceivers, or otherwise allocated or prioritized. In some embodiments, a particular physical device and/or software application may be allocated increased (or superior) priority over other devices; for example, a self-driving module of the vehicle. In other embodiments, particular devices and/or applications may be associated with a priority parameter, ranking their relative priority for uploading and/or downloading data; for example, a self-driving module having greater priority than a vehicular navigation system, which in turn may have greater priority than a vehicular voice-over-IP telephony system, which in turn may have greater priority than streaming audio reception, which in turn may have greater priority than streaming audio/video reception. Other priority rankings and conditions may be used.

In other embodiments the Bonding/Multi-Link Agent or a dedicated bonding device may reside externally to the vehicle communication device; or it may be a plug-in or an accessory that may connect to a vehicle, or to a vehicular dash-board, or to a vehicle communication bus or to a vehicle's other bus or socket or port or mechanical means or circuitry; or may be an integral part or an integrated part of a vehicle, or of a vehicular dashboard, or a vehicular entertainment system or vehicular media player or navigation or mapping system. It may then communicate with the vehicle communication device and use it as part of the aggregated combined bandwidth or super modem link. It may optionally connect to the vehicle device via a wired network or wirelessly, such as serving as a hotspot or Access Point or ad-hoc access point or creating an ad-hoc wireless network. Optionally, it may receive power from the vehicle's battery and/or electric system. It may also have a rechargeable battery, optionally able to be charged from the vehicle, so that it can provide bonded communication when the vehicle is not powered on. It may be allocated or implemented anywhere in the device or outside of the passenger cabin, such as on the roof or in the trunk of the vehicle or under the hood or below the chassis of the vehicle, for example, in order to increase the RF performance with (or relative to) the environment, particularly if modems or transceivers are combined or aggregated and integrated into such bonding device. It may be associated with several modems or transceivers, such as cellular modems or transceivers, or with only the RF parts or circuits of such modem of transceiver (such as antenna and/or amplifier or combiner), which may optionally be external to the bonding circuitry enclosure itself. These RF components may be distributed over several parts or regions of the vehicle. For example, one antenna may be placed on or attached to the front of the vehicle roof; whereas another antenna may be placed at the back of the vehicle roof, or below the chassis, or may be otherwise attached to the vehicle in a fixed manner or in a user-modifiable manner (e.g., may be removably attached or remove-ably attached from one vehicular location to a different vehicular location, via magnets, via a screw or other connection mechanism or the like).

Each antenna may operate or may work with several cellular or other operators or networks or providers, and may be connected to one or more cellular or other relevant modems or transceivers. In some embodiments, two or more different types of wireless/cellular antennas, may be mounted or installed at two (or more, respective) different parts or regions of the same vehicle, in order to minimize or reduce interference among different types of wireless signals and/or in order to improve or increase the general or aggregated or bonded connectivity, either in capacity, goodput, throughput, decreased latency, lower error rate, increased stability or other parameters. In some embodiments, one or more of such wireless antennas may be movable or dynamically-moving antennas, which may dynamically move relative to the chassis or the roof of the vehicle; for example, even a slight movement (e.g., of K centimeters, where K is for example, 5 or 10 or 20 or 25) of an antenna, may improve wireless reception of that antenna in its new location, or may reduce interferences at the new location.

Optionally, each antenna may be associated with a motor, and/or with rails, or other movement mechanism, as well as a controller or regulator that controls the location and/or movement of each antenna, to improve or increase wireless connectivity and/or to reduce interference(s) among multiple signals and/or from sources of noise and/or among transceivers. Such antennas may include cellular, satellite, Wi-Fi, V2X, and/or any other wireless network or spectrum antenna(s), and/or other RF related modules such as amplifiers, gain units, Low-Noise Block (LNB) units or downconverters, combiners, repeaters, or others. In such cases, the Bonding/Multi-Link Agent or circuitry may use multiple physical modems or transceivers, and the one or more antenna(s) may be connected to one or more modems or transceivers, not necessarily for being a physical RF signal level or MAC level processing such as MIMO, rather, for providing to each such modem or transceiver the antenna and RF circuitry to use for its communications with its own network and operator or provider; thereby resulting in multi-modem or multi-transceiver diversity, multi-operators diversity, multi-networks diversity; and when using two or more modems or transceivers over the same network or operator—even multiple-modems-single-network diversity which may be enhanced further due to the different locations of the two or more antennas connected to the two or more modems (or transceivers) that utilize the same operator or network or provider.

The modems or the wireless transceivers themselves may reside near the antenna(s), in the Bonding/Multi-Link Agent or circuitry enclosure or housing, or anywhere in the signaling and/or data path in between. Each modem or transceiver may be associated with a single SIM card, or loaded and use credentials or eSIM or eUICC or Virtual SIM (VSIM) from remote or from local storage of credentials. Optionally, a modem or transceiver may be associated with dual-SIM or triple-SIM or other multiple-SIM architecture, enabling such transceiver to operate via one particular SIM out of the multiple SIMs, and subsequently to switch from using the first SIM to a second SIM of the multiple-SIMs batch. Each transceiver or modem may connect to a network and an operator and use them for its communication. This way, a single antenna may receive and transmit cellular (or other wireless) signals of several operators and/or networks, may send them over cables (or wirelessly, via Wi-Fi or Bluetooth or Zigbee or the like) to one or more or to multiple other transceivers or cellular modems (or transceivers) each working with a separate cellular network or operator or provider depending on the current credentials it uses to authorize and authenticate in any specific network, and may communicate with remote destination(s) over this particular operator or network, when some of the packets of the data streams are sent or received via this modem (or transceiver) in synch, or in concert, or in relation, or as part of, the transmissions performed by other modems or transceivers and other networks and operators.

Optionally, several modems or transceivers may use credentials and communicate with a remote server or side or destination, using the same network or operator or provider. Thus the total bandwidth or goodput or throughput utilized by the Bonding/Multi-Link Agent or circuitry from any single operator or provider or network, may be increased. Further, this also provides diversity from the same operator or network, as the RF conditions between the two differently-placed antennas provide different RF conditions with may result in one of them getting more (or less) packet-level traffic or communications for transmission or for reception. This unique architecture is different from a conventional MIMO, because in a conventional MIMO system the signals coming to the multiple antennas are summed or similarly combined by the same modem and do not carry completely different IP packet level communications; whereas, in the systems of the present invention, there is no such RF-level or PHY-level or MAC-level signals combining or processing, and the signals arrive and are received at different physical modems (or transceivers), each of the modems (or transceivers) and signals process its own communication of different IP-level packets and/or above level packets.

The Bonding/Multi-Link Agent or circuitry may connect over the vehicle internal communication network with any of the multiplicity of the vehicle processors. It may serve remote management systems to download or to transmit software, updates, upgrades, commands and/or data towards or into any of these vehicle processors, in a fraction of the time required when using a single network or a single link or a single operator or a single modem, since it may use more than a single modem or link or transceiver in accordance with the present invention. The scheduling of the download (or upload) may be performed by a Transmission/Reception Scheduler 215 (or a "Tx/Rx Scheduler") which may take into account synchronization with the bonding performance, momentarily or temporarily or predicted, their cost, and/or the passengers (or occupants) or the applications' communication needs; so that at the little time gap when utilization of the overall bonded multiple links is partial, the download occurs quickly. In other embodiments, the software download may be done at lower priority in parallel to the applications or passengers communications, which may be allocated higher priority over the multiplicity of bonded links.

In other embodiments, the Bonding/Multi-Link Agent or the bonding layers and/or a bonding unit or module or circuitry or processor, may reside in the passenger's mobile device(s) such as smartphone or tablet or smart-watch or a portable gaming device or other device, or may be a plug-in or extension or accessory that can be connected to or paired with such end-user device. It may then communicate with other passengers devices and/or with the vehicle communication device and/or with any other communication device in (or associated with) the vehicle, may construct (or may participate with; or may contribute to) an ad-hoc network with all or some of such additional devices or transceivers or may be part of other bonding layer implementations, and may use some or all of such other transceivers or modems to transmit outgoing data split (or divided, or allocated, or distributed) over some or all of such other transceivers or modems and/or may receive incoming packets split (or divided, or allocated, or distributed) over some or all of such other transceivers or modems.

In some embodiments, for example, a vehicle may be equipped with a vehicular entertainment system having a single or a multiplicity of screens to display high definition (HD) movies or standard-definition (SD) movies or Ultra-HD or 4K movies or Augmented Reality (AR) or 3D video, and may further comprise one or more wireless transceivers and/or cellular transceivers and/or satellite transceivers to receive audio/video packets from a remote server (e.g., a streaming service such as Netflix or Hulu or YouTube). In order to improve and/or increase the available bandwidth or the actual throughput, the system of the present invention may comprise a packet allocator module or sub-system, which may utilize the smartphone of the driver of the vehicle, as well as the smartphone or Passenger 1 in the vehicle, as well as the tablet of Passenger 2 in the vehicle, such that all these devices (namely, their respective transceivers) would receive packets of the streaming audio/video transmission, where the remote server or a remote bonding server or circuitry along the IP path splits or distributes or otherwise allocates the encoded video stream to different recipients in the same vehicle, and sends part of the packets via network or operator or modem or link A while also sending other packets via another IP path B to another transceiver of the bonding system or bonding circuitry in the vehicle.

An assembly engine 216 may operate in the vehicle or may be part of one or more of the Bonding/Multi-Link Agent(s) or may be associated with one or more of the Bonding/Multi-Link Agent(s), and may assemble the audio/video stream from the packets received, separately, by each such end-user device or modem or transceiver. For example, the smartphone of the driver may receive packets number 1 through 100; and concurrently or at the same time or during an at least partially overlapping time slot, the smartphone of Passenger 1 may receive packets number 101 to 150 of the same audio/video stream; and concurrently, the tablet of Passenger 2 may receive packets numbers 151 to 180 of the same audio-video stream; and each end-user device (or transceiver or modem) may transfer or transmit or relay or repeat or otherwise convey the received packets to the assembly engine (e.g., optionally using Bluetooth or Zigbee or V2X or a short-distance wireless communication protocol, and/or over a wired link or a cable); and the assembly engine of the vehicular entertainment system operates to re-construct the set of packets 1 through 180 that were received by three different transceivers (or receivers) within the vehicle and may playback the audio/video smoothly from those incoming packets.

In some embodiments, the packets are be transmitted in such a "clean" orderly manner as demonstrated above; but rather, in a mixed way in which smartphone 1 will be sent packets number 1, 2, 6, 8-10 or other such interleaved sequence of packets, optionally also as a result of the momentary IP connection performance that the transceiver of Smartphone 1 has in the downlink direction; whereas Smartphone 2 will be sent packets number 3, 5 and 7; whereas Tablet 3 receives packets number 4, 11 and 12, and so forth in non-ordered or non-serial sequence. Neither do the packets arrive in order or in serial order, sometimes not even in order at the same receiving modem or transceiver. Mechanisms to rebuild the stream from these received or incoming non-ordered packets, may request for retransmission of missing packets or may skip one or more missing packets.

A packet allocator 217 or other controller or distributor module or regulator may define and enforce the transmission scheme that inequitably distributes data packets for transmission in parallel or in concert (or in parallel, or concurrently, or in series) to multiple different transceivers in the vehicle (e.g., of the vehicle itself, and/or of occupants of the vehicle); optionally indicating to each end-user device or transceivers which portions of the streaming segment to receive (or, to request or to download from the remote server), to ensure utilization of multiple such transceivers and to enable the correct re-assembly of the data-stream by the assembly engine in the vehicle or of the vehicle.

In some embodiments, the packet allocator and/or the assembly engine may take into account, for example, current reception conditions of each transceiver or modem or each end-user device, current QoS metric of each transceiver or modem or each end-user device, past performance or historical data about reception by each such transceiver or modem or end-user device, and/or data about the travel route ahead and/or the estimated QoS of future route-segments (e.g., estimating in advance, that the vehicle is expected to enter a travel route-segment or road-segment in which Smartphone 1 will have no reception due to no network coverage for Smartphone 1 there, whereas Smartphone 2 will have reception due to reliable network coverage by its different provider). Other suitable parameters may be used for allocation or distribution of data packets among different transceivers.

In some embodiments vehicles moving a little earlier in the same or close to the same physical route as another vehicle intends to go, either in the same direction or in the opposite or crossing the route, may update in real time the vehicle (or a remote server) about the actual communication conditions that they encounter, either of a single link or if they have a bonding circuitry then of a multiplicity of links that are bonded together. The Bonding/Multi-Link Agent or device in such other vehicle may use this real time or near real time data to plan in advance its usage of one or more of the multiplicity of links or networks or operators that it is associated with, to pre-plan the allocation or performance or resources or bandwidth over each such link or transceiver, to switch between or among them, to selectively and/or temporarily load more (or less) data transmission or data reception onto some of them, to inform the applications and/or users associated with it or using it about the predicted communication performance of one or more or all of the links so that they can modify or fine-tune their communication needs, to inform remote servers sending information towards users or applications or processors in the vehicle, to trigger the selective and/or automatic turning-on or the turning-off of one or more features of an end-user device or of an application, or the like. The exchange of communication status data among different vehicles, or between a vehicle and a central remote server, may be performed by a Communication Data Sharing Module 218, which may be part of the Bonding/Multi-Link Agent or may be associated with it, and which may operate to send out communication status data to other vehicles and/or to a remote server, and/or to receive such status updates from other vehicles (directly or through the remote server), and/or to analyze such received updates in order to modify or update its own communications map or communication reliability estimations or predictions.

In other embodiments, the bonding circuitry may communicate with out-of-vehicle communication devices to opt them in or out of being part of a bonded communication session or channel. For example, a bonding circuitry in a certain vehicle, being stuck in a traffic jam, or moving along in a traffic lane in slow traffic, can communicate with close-by or near-by or proximate other cellular or mobile devices of passengers in other near-by vehicles, and/or with the cellular or bonding devices in the other vehicles themselves, and get them to opt-in, or opt-out of, a bonding communication that it establishes or intends to establish or already had established. This may be done over V2V or V2X communications, or 4G or 5G (LTE) IoT ad-hoc networks for the command or session management control, and/or for the split or division data to be transmitted or received over the other devices; and may be performed by an Opt-in/Opt-out Unit 219 which may be part of the Bonding/Multi-Link Agent. In such case, the bonding circuitry will transmit part of the packets it has over the V2V or ad-hoc Wi-Fi or similar network to the device in the other car or to multiple devices in multiple other cars, which will then transmit it onwards or relay it forward using their own cellular or other type of connectivity or link. Similarly, it may receive packets being split or divided and transmitted to it, over or via the multiple other devices in the multiple other vehicles, over or via the local ad-hoc wireless network, and may then re-assemble the whole data stream from these multiple packets that were transported using multiple different paths, and may serve its applications with this re-assembled data stream or data streams.

In some embodiments, multiple different vehicles, operated by different users (drivers, passengers, autonomous/self-driving modules) that may not even know each other, may be utilized by the system to construct an ad hoc, dynamically moving, peer-to-peer (P2P) network, which may enable a first vehicle to transmit packets to a second vehicle, while the two vehicles are in proximity to each other (e.g., standing at the same red light or the same parking lot, or driving in parallel to each other, or driving one behind the other such as in a practically synchronized or correlated autonomous travel), thereby increasing the available connectivity of a particular vehicle by utilizing end-user devices and/or vehicular transceivers of other vehicles, as well as the various transceivers of end-user devices of other drivers and/or other passengers.

In some embodiments, end-user devices of consenting pedestrians, or the infrastructure such as the municipal or commercial local area Access Network or LAN or WAN in that vicinity, may also be utilized by the system, for receiving and/or relaying packets that a vehicular receiver intends to download, thereby further increasing the available connectivity options of the vehicle; particularly, for example, if the vehicle is stopped (e.g., at a red light, or in a parking garage) and is in constant proximity to multiple such passengers that are equipped with multiple such end-user devices. For example, a free, wireless or Wi-Fi access point or hot-spot of a Starbucks, which serves its customers within the store, may also serve driving-by vehicles that happen to stop for two minutes at the red light located immediately next to the store, thereby contributing bandwidth to the communications of that stopped vehicle for a two-minute time-slot while the vehicle is located in close proximity to the store.

In some embodiments, data or control data about the momentary or expected performance of any or all of the current and potential connections, or links, may be exchanged by the Bonding/Multi-Link Agent or circuitry and other Bonding/Multi-Link Agents or circuitries, as well as with other applications and software applications or modules, or with communication infrastructure elements or a remote server or network elements (e.g., a cellular tower, a cellular base station, or the like). For example, the Bonding/Multi-Link Agent or circuitry may inform a video streaming service that the expected performance of a specific communication link, such as of a specific cellular operator, may be at a certain level of goodput or throughput, or error rate or jittery behavior or similar parameters in the following or upcoming N milliseconds or starting at a specific point in time. This information, which may be actual (e.g., calculated, determined) or may be estimated or predicted, may be used by the streaming service, such as YouTube or Netflix or such as operated by an OTT or content provider, for various purposes such as, to adapt or modify the overall stream to this level of availability, to route the split packets away from that particular operator if the expected performance is low, to route the distributed packets towards this particular operator if its expected or measured performance is high, to modify an encoding or trans-coding parameter of audio and/or video that is encoded and/or transcoded and/or served, to serve a first version of a content item (e.g., a high-definition version of a movie) instead of serving a second version of the content item (e.g., a standard-definition or low-definition version of that movie), or the like. The performance data, measured or forecasted, may be shared with the streaming video service or with any other external service from the central communication mapping element, which may collect the data from the multiplicity of connections and/or from the multiplicity of bonding devices over time. This collection center may share with the other services raw information or processed information; for example, data that was analyzed and matched to time and date criteria, to performance or other indicators or levels or measurements or statistics from other networks or other connections, accumulated and analyzed over time, matched with a geographic location or geo-spatial location, matched with both time and place, matched with a particular type of content being consumed, matched with a particular current or measured or predicted weather condition (e.g., rain), matched with vehicular traffic (e.g., traffic jam, traffic congestion, slow-moving traffic, standing traffic), matched with time-of-day or day-of-week, matched with the number of users and/or vehicles that currently consume the same content item or a similar type of content item, or the like.

In other embodiments, the bonding or multi-link process creates a broadband access channel from an aggregation of multiple wireless devices (or transceivers) used simultaneously with the packets split or distributed over them in upload (upstream) and/or download (downstream) direction, and may serve additional applications that may need the reliable, stable, broadband connectivity: for example, software upgrade to various autonomous car processors and software modules, relatively massive or small data upload from the multiplicity of the autonomous car sensors—both in real time and otherwise, video streams including in very high quality and resolution such as 4K or 360 degrees or Virtual Reality (VR) or Augmented Reality (AR) or three-dimensional (3D) movies or immersive content, or holographic content, or mapping content or route guidance content or navigation content that may include rich media content or enhanced components (e.g., navigation data that also includes photos and a video clip of the destination point), and including from multiplicity of cameras simultaneously both from the car and to the car, or other types of applications.

In some embodiments, the bonding or multi-link process creates a broadband access channel from an aggregation of multiple wireless devices (or transceivers) used simultaneously with the packets split or distributed over them in upload (upstream) and/or download (downstream) direction, and may serve additional applications that may need the reliable, stable, broadband connectivity: for example, Mobile Edge Computing (MEC) or communication relaying by the devices in the vehicle. In these applications the computing power in/of the vehicle is harnessed for other purposes, not necessarily directly related to the benefits or operation of the vehicle itself or its occupants. For example, the computing power of the vehicle, processors, memory, storage or others, may be offered or used by remote applications or users. They may be rented or leased or sold or any other business model to any application, user or service provider. These vehicle computing elements may be used as a cloud extension, cloudlets, ad-hoc extension, computer-for-lease, application running platforms, distributed computing systems. A remote cloud may use these vehicle elements when it needs more resources, when it prefers to use computing elements at the edge because they are physically closer, or IP-routed closer, to a specific source or destination or node, or less costly in terms of monetized cost or in terms of performance-related cost, or due to other reasons. In such cases the bonded communication link, of high bandwidth or goodput and/or of high reliability, may be required to download software or data into the vehicle elements, to upload the results of products or processed output from the vehicle computing elements back to the IP source or destination or node that requires them, whether one time or multiplicity of times. For example, the vehicle processing elements may be used to perform some video processing such as transcoding or overlaying or others over video data that is downloaded to it, and then return the processed video back to the cloud that ordered it. Such services can be done voluntarily or sold. In other examples, the remote element such as an application running in the cloud, may ask the vehicle processing elements to perform certain processing tasks on downloaded data and then when the vehicle arrives at a different location, or locations, to upload to other IP nodes. This may save delivery costs as the upload may be done closer to the destination, using the fact that the vehicle is moving, including to long distances such as drones or ships or trains or trucks do. It may also use knowledge of the vehicle itinerary, or schedule, or habits of driving, to plan such processing and delivery. The bonded or multilink may also be pre-coordinated according to the map of communication build by the bonding elements over time as described elsewhere in this invention or other information. In other examples, processing elements in the vehicle may be used as relays to other vehicles, or pedestrians or other processing elements in the wireless range of the vehicle movement. For example, several video streams may be downloaded into the vehicle using the bonded or multi-link link, thus be done quickly over high goodput and reliably, at one point in time and location or in several scheduled or ad-hoc points in time and location. The vehicle processing elements may then broadcast or multicast these video streams, such as using ad-hoc 5G eMBMS or other on-board broadcasting method and devices. Thus it may become part of the cellular, or other, service provider network for temporary or permanent mobile usage. The bonded link may facilitate the communication from these vehicle relays or mobile elements back and forth with the network elements or the service provider elements in a shorter duration, more reliably, thus in a more mobile way, in higher efficiency, at lower cost than for example satellite link (which is hardly mobile and certainly not operating everywhere such as not in tunnels or in underground areas), with more data exchanged over shorter time periods and in more reliability when using more than single technology or operator or even when using several links of the same cellular operator because they may provide more diversity and overall more broadband and goodput than a single connection via that operator.

The Bonding/Multi-Link Agent or circuitry or application on a mobile device, may prompt the user whether to participate in a bonding transmission in this vehicle or in other transmissions requested from other vehicles. The Bonding/Multi-Link Agent or circuitry or application on mobile devices may make available, or use, part of the bandwidth or goodput or throughput available from any of the participating devices. For example, prioritization may be implemented so that, for example, first the vehicle's own cellular device bandwidth is used; and only then, if not enough, then the passenger cellular phone(s) are be used in conjunction as part of the bonding broadband connection or channel; and only then, if still not enough, a request to use external communication devices such as may be available from other vehicles in the area, is sent to them or broadcasted to any such device that may opt in (e.g., a nearby store or shop that offers free Wi-Fi to consumers or to the general public).

In some embodiments, marks or tags or signs or visible indicators on vehicles may be used to identify them for such inter-vehicle request to take part in multiple-vehicular bonding communications or in a wireless vehicle-to-vehicle communication network or in a wireless ad hoc network or in a hybrid wireless/cellular communication network or in an ad hoc peer-to-peer communication network. Such marks or tags may be part of their license plates, or a QR code or barcode or any other indicator. Such marks may be identified by the vehicle sensors, such as a camera or imager or scanner or barcode reader or barcode scanner or QR code reader or QR code scanner, and may be passed to a Marks Processing Module 220 of the Bonding/Multi-Link Agent or circuitry, which may then contact the identified vehicle cellular device using such identifying mark or tag, either directly or via an arbitrator or proxy or remote server, and may ask for it to opt-in for a bonded, or shared, communication channel, either for free or in exchange to a benefit such as payment or future benefit, or in exchange for "credits" or credit points that may later be utilized by a bandwidth-contributing vehicle to request similar bandwidth contributions from other vehicles.

Once a participating member in the bonded communication stops participating, for example a passenger leaving the vehicle or another vehicle getting out of the ad-hoc communication network or range, then the Bonding/Multi-Link Agent or circuitry may automatically adapt or modify the transmission and/or the reception of the data over the remaining participating links or connections or modems or transceivers or networks or operators; for example, by modifying the prioritization among the applications that consume the combined (bonded) communication channel, by changing a QoS parameter of one or more applications, by modifying the manner in which data packets are inequitably distributed to various transceivers or modem for transmission, or the like.

In some embodiments, a vehicle may include an owner or driver accompanied by passengers (e.g., spouse, children), having their identified end-user devices or running an authorized ID and software; and the Bonding/Multi-Link Agent or circuitry may be configured on their end-user devices and/or on the vehicle Bonding/Multi-Link Agent or circuitry to take place and start automatically without further user interaction, once the identified end-user device is within range. In other cases, where there is an unidentified mobile or end-user device, it may register with the vehicular Bonding/Multi-Link Agent circuitry, or in a cloud computing based Bonding/Multi-Link Agent, as an opt-in candidate for participating in the bonding communication; or a notification to that user may request his consent to start ad hoc utilization of its wireless transceiver or its cellular transceiver for the purpose of the bonding system of the vehicle (or of another occupant of the vehicle). The Bonding/Multi-Link Agent or circuitry, or a bonding service or a remote service, may accept and instruct the Bonding/Multi-Link Agent or circuitry in the vehicle to start using this opt-in device(s), or may be refused by devices that did not opt-in or that actively opted-out. An opt-in request may be performed in exchange for some benefit(s), such as requesting or offering a certain monetary payment, including pay-per-use schemes, or giving or receiving "usage credits" that later allow an end-user device to participate in other bonded communication channels as a consuming device. In some embodiments, the opt-in/opt-out mechanism of the Bonding/Multi-Link Agent(s) may ensure if Adam drives in his car and Bob drives in his truck, and both of them stop next to each other for ten seconds at the same red light of "stop" sign, then Adam's smartphone does not automatically joins a bonded communication channel managed by Bob's truck, unless Adam actively agrees to such enrollment.

In some embodiments, when there is a single wireless gateway or Access Point or Hotspot such as being part of the vehicle or an aftermarket installation in it, and a driver's or passenger's mobile/wireless device becomes a part of the bonded communication channel, then the vehicle wireless access point may utilize the Bonding/Multi-Link Agent or circuitry, and may use the vehicular modem or transceiver (such as a vehicular cellular modem or transceiver, or is otherwise associated with it) as one of the bonded paths or links, may establish an ad-hoc local wired or wireless network or direct link with the passenger(s)/driver mobile device(s), and may send and receive at least some of the data packets to be transmitted or to be received via or over the passenger(s)/driver end-user device(s). The vehicular ad-hoc network may be or may use, for example, Wi-Fi, Bluetooth, Zigbee, or similar wireless networks, and/or a wired link may be used such as USB or similar connector or wire or cable or socket or port, or a combination of wireless and wired links may be used.

In some embodiments, for example, a passenger end-user device may turn itself into, or may be configured to operate as, a wireless or Wi-Fi Access Point or hotspot, so that the vehicular transceiver or vehicular modem (and/or transceivers or other end-user devices in the same vehicle) is granted access to it and is authorized to use its cellular or satellite or other external modem or transceiver as a second or secondary link in the bonded communication channel, for receiving data packets from a remote IP address or source (e.g., where a bonding or splitting server or data distributing server or engine performs the splitting or the inequitable distribution of the packets to be transmitted into several IP links) into the vehicle over the multiple communication links that it has (e.g., two or more cellular IP connections or paths or links), and/or for transmitting data packets to a remote IP address where a re-assembly server or engines operates to re-assemble the packets that were transported over two or more different paths and to provide them or to streams them to the Internet or to their other or final destination.

In some embodiments, the passenger (or driver) may run the Bonding/Multi-Link Agent or circuitry, or the "leading" Bonding/Multi-Link Agent that initiates or requests to create a combined or bonded communication channel; and the roles are reversed between the vehicle wireless access point and the passenger (or driver) mobile device. In any case, the Bonding/Multi-Link Agent or circuitry asks for, or is offered, or otherwise gains access to another wireless link that is not permanently associated with its own (e.g., internal) transceiver or modem, and that utilizes a transceiver or modem located externally to itself; and starts using it as part of the multiple-link bonded communication over an ad-hoc network.

In some embodiments, when multiple wireless devices are expected to become part of the bonded communication channel for a limited time or time-slot, such as when multiple passengers have cellular smartphones or tablets and they are willing to opt-in and take part and contribute their IP link(s) over their cellular operator(s) as part of the bonded communication for a particular time slot (e.g., for a shared ride of 30 minutes), in partial capacity or in their full capacity, a bonding management unit or layer of the Bonding/Multi-Link Agent may manage or control or regulate the multiplicity of wireless ad-hoc access points, each having and sharing its cellular or other wireless IP link via its operator or service provider. In such case, the communication between the Bonding/Multi-Link Agent or circuitry residing on one of the devices (including the vehicle's own wireless access point, or an end-user device), may be done by utilizing one or more cables or wires or ports or links (e.g., via a USB hub in a star configuration with the bonding circuitry as the center), or via a wireless ad-hoc network or a wireless short-range network. For example, each one of the participating devices has cellular (or satellite, or other) external IP connection over its own operator or network or service provider or SIM or credentials or connectivity means, and each one of the participating devices may share its communication resources, in whole or in part, with the vehicular communication system and/or with other end-user devices in that vehicle via the Bonding/Multi-Link Agent(s) or circuitry, it may act similarly to a WiFi Access Point, overlaying the physical link with an IP transport layer or higher layer or even application layer. The management layer manages the multiplicity of ad-hoc access points, allocating spectrum or channels between them; or may operate in a particular frequency or frequency-band or frequency-range or spectrum-segment or in a special mode where each transceiver is allocated resources according to the determination of the Bonding/Multi-Link Agent(s) or circuitry in view of the available aggregate resources and the required consumption by various applications of various devices; so that each such device operates not necessarily as an Access Point but rather as a Wi-Fi modem or transceiver towards a particular Access Point which is associated with or connected to the vehicular Bonding/Multi-Link Agent or circuitry.

In some embodiments, each participating device except the one associated with the bonding circuitry as the internal or the main Access Point, acts not necessarily as an Access Point in such ad-hoc network, but rather as a Wi-Fi or other modem in the ad-hoc network established by the Access Point directly associated with the vehicular Bonding/Multi-Link Agent or circuitry, and keeps or maintains its regular function as a cellular or other wireless IP link towards the cellular or other external wireless network and operator.

In some embodiments, one or more of the vehicular wireless (or cellular) modems or wireless (or cellular) transceivers, and/or one or more of the driver/passenger end-user device's wireless or cellular modem or transceiver, may be configured by the Bonding/Multi-Link Agent(s) to operate as an IP packets repeater or re-transmitter or router or switch or bridge or hub or relay unit or relay node, which may be connected or may operate over an ad-hoc wireless network to re-convey or re-transmit packets towards the vehicular Bonding/Multi-Link Agent or circuitry and may also operate in parallel as a regular wireless (or cellular) modem or transceiver towards the operator's network. However, such "repeater" operation or function, in accordance with the present invention, does not repeat or re-broadcast at the RF level the RF signal that was received wirelessly; but rather, it "repeats" only by performing a transport of the received data-packets, at the packet level; it performs "digital repeating" of transporting already-received data packets at the packet level, rather than "analog repeating" of re-transmitting or repeating an incoming RF signal at the RF level. For example, the "repeating" transceiver or Bonding/Multi-Link Agent receives (e.g., by pull or push operations) packets from the Bonding/Multi-Link Agent or circuitry over the ad-hoc vehicular local network, and transmits such packets per the link availability and performance over or via its wireless operator and network and modem/transceiver and link to their intended IP destination. In the other direction, the downlink, it receives packets from their IP source over its wireless operator and network and modem and IP link and delivers them (e.g., by pull or push mechanisms) to the Bonding/Multi-Link Agent or circuitry or system over the vehicular ad-hoc network. Such functionality is absent in conventional end-user devices, particularly especially for consumer devices such as smartphones or tables or vehicle cellular devices and similar; which typically operate as a single isolated wireless device or, at most, as a Wi-Fi Hot-Spot or Access Point for another device, but do not operate as an IP packet-level bridge or repeater bridging between a vehicular local Wi-Fi network and the consumer device's cellular-to-Internet or Internet-to-Cellular connection or path or link. In accordance with the present invention, a Bonding/Multi-Link Agent or a software module running on such devices, as part of the operating system, or as part of the Bonding/Multi-Link Agent or circuitry, or as part of a bonding application or an extension or add-on or plug-in, enables such unique mode and functionality; for example, operating at the end-user device's IP stack level which is internal to the device Operating System, or at the device's application level where it receives and sends packets upstream and downstream along the device's IP stack using different or various directions, connections, addresses, ports, and communication protocols.

In some embodiments, some of the Bonding/Multi-Link Agent or bonding circuitry functionality may be passed to (or implemented by) an ad-hoc bridge unit or module. Such bonding functionality may include buffers or buffering operations, encapsulation in a bonding protocol of packets or bits for to-be-transmitted packets or for packets intended for transmission, de-encapsulation of received packets, interleaving or de-interleaving or packets or bits, communicating with a remote gateway with regard to the performance of the system or its components, performing "Acking" or ACK related operations (namely, sending an "ACK" or acknowledgement signal or packet, or a Negative ACK or NACK signal or indicator) towards a wireless operator or network or towards an IP source or other entities; transmitting and/or receiving and/or processing commands or control information, such as a request to join a bonded communication channel or an opt-in to join or an opt-out or refusal to join; or the like.

In some embodiments, the coordinating and/or managing of the distribution of some of the functions of the Bonding/Multi-Link Agent or circuitry functionality may be done by utilizing one or more Bonding/Multi-Link Agents or other bonding circuitry or module. For example, a first Bonding/Multi-Link Agent (e.g., vehicular) may communicate with a Bonding/Multi-Link Agent or bonding client on other device(s) such as passenger/driver smartphone or tablet, via an ad-hoc network; and may coordinate with such other devices which functionality is distributed to which device(s), with which parameters, how and when the distribution of functionality (and not only the distribution of data) starts or ends or operates, as well as other coordination operations or control operation as needed to ensure that multiple transceivers that are located in multiple different devices operate together or in concert in order to create and maintain a high-bandwidth or increased-bandwidth communication channel that one or more applications may utilize for improved communication.

In another embodiment, the coordination or the distribution of the functionalities of the Bonding/Multi-Link Agent(s) or circuitry may be done or commanded or controlled or managed via (or by) a remote server or a central server, with which all the distributed bonding elements and/or modules and/or transceivers are able to communicate. Such server may allocate and/or register these distributed functionalities or modalities or modules, may ensure their common association, may coordinate or modify or manipulate the distribution of the relevant bonding functionality between or among them, may inform each relevant one of them about which functionalities are currently allocated to it and/or to other devices, or may otherwise act as an arbitrator, facilitator or proxy element in the distribution of the bonding functionalities and re-distribution or un-distribution when needed.

The Applicants have realized that communication protocols and methods can be evolved and improved to utilize multiple communications links together, more or less at the same time ("simultaneously" or "near simultaneously"), so that the combined or aggregated bandwidth of such multiplicity of links is bonded into a total, greater, bandwidth of the bonded communication channel. The data to be passed from one node to one or more other nodes may be split or distributed or divided or allocated between or among the multiplicity of communications or data links or paths or modems or transceivers or connections or sessions. The data is sent in packets, accumulated or not accumulated, using dedicated or proprietary protocols such as those described in U.S. Pat. No. 7,948,933, and/or by using other or standardized protocols, such as by using Multi-Path-TCP (MPTCP, or IETF RFC 6824, or others).

Some embodiments of the present invention may utilize, or may comprise, or may operate in conjunction with, one or more devices or systems or methods that are described in U.S. Pat. No. 7,948,933 which is hereby incorporated by reference in its entirety; and/or in U.S. Pat. No. 9,369,921 which is hereby incorporated by reference in its entirety; and/or in U.S. patent application Ser. No. 15/151,049 which is hereby incorporated by reference; and/or in U.S. Pat. No. 9,712,267, which is hereby incorporated by reference; and/or in U.S. Pat. No. 9,154,247 which is hereby incorporated by reference; and or in U.S. patent application Ser. No. 14/970,305 (published as United States patent application publication number US 2017/0134787) which is hereby incorporated by reference; and/or in U.S. Pat. No. 9,756,468 which is hereby incorporated by reference; and/or with other suitable mechanisms for network assisted bonding, remote management of Quality of Service (QoS) between or among multiple bonding transmission devices, or other methods or units.

The behavior or the momentary performance of the communication links or paths, of each one of them or of several of them or all of them combined, may dynamically change based on various conditions; at very short period of times (several microseconds, several milliseconds) or at longer periods of time (tens of milliseconds, hundreds of milliseconds, seconds, and even minutes or longer). Such changes in behavior or performance of links or transceivers or modems may be described in terms of bandwidth, good-put, throughput, error rate, packet loss rate, latency or delay, jittery behavior, or patterns or trends of each such parameter, or other suitable parameters. Therefore, often yet not necessarily always, the splitting or division or allocation or distributing of data packets (or bits, or encapsulated data items) over or via the multiplicity of links or paths or transceivers, may dynamically change and may be dynamically adapted (e.g., in a non-equitable manner) to the available or actual total bandwidth and/or the actual or available bandwidth of each such communication link or IP connection or transceiver or modem. The distribution of data or packets may be inequitable or non-equitable, such that a first modem or transceiver (e.g., cellular transceiver of Passenger 1) is allocated to transmit (or to receive) 45 data-packets, while in parallel or concurrently a second modem or transceiver (e.g., tablet 4G transceiver of Passenger 2) is allocated to transmit (or to receive) only 31 data-packets.

In a demonstrative example, at one point in time or in a particular time-slot: 40 percent of a combined (bonded) total bandwidth of 10 megabits per second (mbps) total is passed or is transported through a first link (e.g., 4 mbps, transported via cellular 4G transceiver of a smartphone of the vehicular driver); whereas another 36 percent of the bonded channel is passed or transported through a second link (e.g., 3.6 mbps, transported via a 3G transceiver of a cellular phone of Passenger 1); whereas another 24 percent of the bonded channel is passed or transported through a third link (e.g., 2.4 mbps, transported via an LTE transceiver of a smartphone of Passenger 2). Other suitable ratios or values may be used.

Such split or distribution or division or multiplexing or allocation of communication resources, may continue for a particular duration, e.g., for N milliseconds or seconds or minutes or more; for example, as long as the communication links are generally stable in their performance or behavior. However, at a later time, the second link may suffer from a performance loss, in one or more of its relevant parameters that are described above (e.g., reduced actual throughput; increased error rate; or the like); and the packet distribution system or the multiplexing system (e.g., implemented via one or more Bonding/Multi-Link Agent(s) or circuitry) may respond by in reducing the total of transmitted packets to fit, or may accommodate or may match the new total of relevantly good (or useful, or reliable) bandwidth, and/or by changing the split or distribution of the data or data-packets between or among the relevant links or paths or transceivers or modems. For example, the first connection or link may now increase its load (e.g., if it has that margin to increase its load) and may now carry or transport 5 mbps (instead of 4 mbps); the third connection or link may maintain its 2.4 mbps (e.g., because it might not have a margin to increase); and the second connection may drop or reduce its load from 3.6 mbps to 2.6 mbps; and optionally, the transmission generator or controller (e.g., the relevant Bonding/Multi-Link Agent) may adjust or modify or reduce the overall transmission rate to the total (e.g., which may be the same, or lower, or greater than pre-modification). The above non-limiting examples of numbers and ratios may fluctuate; and hysteresis and stabilization algorithms may be applied to them.

In some embodiments, an apparatus is provided for cooperating with (or for controlling or managing or regulating) a mobile device or an end-user device having an embedded transceiver. The terms "mobile device" or "portable device" or "wireless device" or "end-user device" as used herein may refer to any suitable device that is able or configured to communicate with a wireless network or cellular network, including, but not limited to, a smartphone, tablet, smartwatch, VR gear or equipment or helmet or glasses or headset, AR gear or equipment or helmet or glasses or headset, a mobile communication station, a gaming device or gaming console, an audio/video player or multimedia player, a user equipment (UE), a personal digital assistant (PDA), a laptop computer, a notebook computer, a public safety Land Mobile Radio (LMR) terminal, an e-Readers or electronic reader, a mobile projector, dedicated terminals, and any other device that enables mobile data communication.

The terms "transceiver" or "modem" as used herein may include to any suitable unit capable of transmitting and/or receiving signals in or via or from or to a wireless network; for example, a transceiver may communicate with or through or via or over a cellular network, mobile telephony network, IP network, Wi-Fi network, satellite, Wi-Max, Bluetooth, Zigbee, near field communication (NFC), and/or with mesh devices or peer-to-peer devices or networks or ad-hoc networks.

While the invention is not limited to any particular transceiver or communications protocol, some embodiments of the invention may utilize or comprise a transceiver or transmitter or receiver or network that uses one or more of the following exemplary communication standards: GSM, GPRS, HSPA, Edge, LTE, LTE Advanced, 2G, 4G, 4G-LTE, 5G, 5G-LTE, V2V, V2X, HSPA, CDMA, CDMA Rev A, CDMA Rev B, Wi-Max, Wi-Fi, Bluetooth, Zigbee, COFDM, Wibro, Satellite BGAN, satellite VSAT, or the like. Some embodiments of the invention may utilize other transceivers that may utilize other known or future wireless and/or cellular communication protocols or standards or schemes.

In some embodiments, a data stream (e.g., a video stream, or an audio stream, or an audio-video stream) originating from a cloud or on premise or edge or another server may be transmitted to the mobile device by at least two transceivers (or transmitters). For example, some of the data packets or bits may be streamed to the mobile device over a first wireless network such as a first cellular network, using the cellular network infrastructure, paths, routes and means; and a second other part of the data packets or bits may be transported to the mobile device via a second wireless network or path or link, such as Wi-Fi or Bluetooth utilizing local network means. The mobile device (or, a vehicular unit) may then re-assemble the video stream from the received packets over the two (or more) communication links or paths or modems or transceivers or networks, which may utilize the same network technology (or a single network provider) or multiplicity of different types of networks or providers.

In some embodiments, when measured or monitored conditions change, at any level—such as at the RF level or at the network infrastructure level or parameters, or the IP stack level parameters or the application level or session level parameters and experience—then the split or distribution or division or multiplexing or allocating of data-packets among all the connections participating at that time-point may be dynamically changed. The decision whether or not to change or modify, or whether or not to maintain the previous or most-recent or current packet-distribution pattern or scheme, and how or to what extent to modify it, may be done or initiated by the mobile device (or the vehicular device) and/or by the remote server (e.g., the "splitting" or distributing server that allocates data-packets to different paths) or by other processor along the path(s) or may be based on monitoring the service and the connections performance and/or the user experience and/or the QoS provided by the bonded communication channel to one or more applications or modules.

For demonstrative purposes, a module of unit or device in accordance with the present invention may be referred to as a bonding server or bonding unit or bonding module or Bonding/Multi-Link Agent. It may differ for each type of session, or for each type of application (e.g., may operate differently when streaming video from YouTube, relative to streaming video from Facebook or Netflix; and relative to file transfer from an enterprise cloud). It may reside on any suitable unit in the system, or across multiple units. It may be implemented as a single module or unit, or as a distributed system, may utilize client/server architecture, may utilize peer-to-peer architecture or network(s), may utilize ad hoc network(s) or links or connections, or may utilize multiple servers or units which may be even spread globally. It may be co-located and co-working with a single server or with multiplicity of pre-processing server or servers, or may be separated from them. In some embodiments, the term "pre-processing" may be used interchangeably with "bonding pre-processing", or "multi-link pre-processing", unless otherwise specifically referred to another type of pre-processing. The term "pre-processing" may be interchangeably used with "preparing".

Although portions of the description herein may refer to a "car" or "vehicle" or to "vehicular" units or systems, the present invention may be utilized with, or in, or in conjunction with, other types of means of transportation; for example, a boat, a ship, a yacht, an airplane, a helicopter, a motorcycle (e.g., such that an entertainment system of the motorcycle cooperates with a smartphone of the motorcycle driver, and optionally also with another passenger that rides behind the driver), a bicycle, manned or un-manned aircraft, a self-driving car or vehicle or automobile, a self-driving or self-sailing or self-flying ship or boat or aircraft or drone, or the like.

A "user" described in this disclosure may be a human user, such as a passenger or a driver or other, or it may be a non-human such as one or more components or units of an autonomous car or self-driving car (or plane or ship or train or any other), processors, or a robot, or similar controller device or processor or system.

The present invention may enable a vehicle to meet mobile communications requirements for smart transportation, mainly consumer vehicles, in terms of bandwidth, rate, reliability, availability, latency, delay. QoS, QoE, or other parameters; for various use cases such as infotainment, safety, self-driving purposes, autonomous driving, and other purposes. These needs may be satisfied using a multilink technology of "bonding"—using multiple communication links/operators/devices combined together.

The applicants have identified the following inconvenient scenarios: (a) user is watching a video on his tablet on the train, the video is suddenly buffered, and then it stops; (b) a family travels together in the car with everything quiet on the back seat, the children happily playing network games on their tablet or watching an HD video, yet things get interesting when all of a sudden their connectivity is lost. These scenarios are estimated to get worse, with more video being shared, virtual reality and augmented reality experiences, and future applications based on reliable broadband connectivity.

The present invention simultaneously uses multiple IP connections, links, devices, operators and/or networks in a seamless transparent way called "bonding", to provide reliable mobile broadband connectivity to passengers and moving vehicles.

The Applicants have realized that the auto industry is set to generate significant growth opportunities by adding broadband connectivity and services to new car models and mass transportation. New digital services, such as integrated entertainment, car and ride sharing, security and navigation, are becoming increasingly popular, and part of the growing trend towards Smart Mobility Services.

The Applicants have realized that with auto computing being outsourced to the cloud, and with advanced data processing requirements, reliable bandwidth connectivity becomes critical, in order to ensure uninterrupted and high-quality service (Internet connection) even when moving between cell nodes or cell towers or cellular coverage areas. Even with Advanced-LTE availability, current mobile wireless networks are challenged, on the one hand by the exponential demand for reliable bandwidth, and on the other hand by significant environmental and design issues such as vehicular congestion, due to multiple simultaneous users, cell tower handoffs, fading signal strength, environmental interferences and coverage areas, resulting in fluctuating data signals.

In order to manage efficiently and reliably new digital services such as Augmented Reality (AR) and Ultra HD or 4K mobile entertainment, cellular-bonding or "multi-link" data technology may provide high bandwidth, mobility, low latency and the necessary reliability for broadband connectivity even in the most challenging environments. Multiple cellular devices, for example the car's cellular IoT device and the driver's cellular smartphone, may be bonded together for a reliable broadband connectivity. Multiple cellular modems may offload costly satellite connectivity for trains and ships, providing broadband coverage even in tunnels, and using satellite only when needed as just another underlying IP connection. Reliable broadband connectivity via multiple wireless IP links bonded together may thus assist the connected and automated transport world.

Various applications of the Connected Car may benefit from the present invention; for example, safety applications, infotainment applications, passenger-centric applications, vehicle-centric applications, environmental-centric applications, user interests, vehicle vendor interests, service provider interests are municipalities and other authorities interest, private vehicle applications, commercial vehicle applications, public transportation applications, and more.

In order to respond to the need to connect the car, or the truck, or the train, or the drone, a targeted approach may be taken, looking from one of the multiple and sometimes conflicting perspectives. In the next sections of this article we'll discuss a few such perspectives in the form of relevant use cases. However, the present invention provides a different approach, an architecture that can support as many of these applications as possible, seamlessly and agnostically; an architecture in which policies for communication utilization and compliance with different application requirements can be developed and evolved over time. The Applicants have realized that the Connected Car is a bandwidth-demanding system, requiring high bandwidth, continuity, and low latency.

The Applicants have realized that the communication needs of smart transportation of consumer vehicles (be them terrestrial or low flying drones), can be analyzed using several methodologies; such as, to look at all the various applications that may run in the vehicle, summarize all their specific needs, aggregate all of them and come up with several service grades accordingly. Yet the lower limit of these communication requirements is the sum of the needs of all passengers commuting in this vehicle, and then some more for the vehicle needs itself. This means that if we want to provide proper infotainment to the passengers, we can look at the "standard" usage of communications multiplied by the number of passengers in the vehicle.

Communication needs may be divided into several application-level categories. For example, it may be desired to have a car that is "Always Connected", the highest possible communications availability. A variety of applications may need "heterogeneous connectivity", such as Connected Infotainment, real time navigation, always-on telematics, augmented reality, immersive multimedia and more. Various lists of applications, services and connectivity demands, spread across these or other categories, may be used in a vehicle or by a vehicle; many services related to the vehicle itself, to the passengers, to the load, to the service providers, to the car owners (in some forecasts or scenarios it is not the driver), to third parties, or the like.

The Applicants have realized that a relevant split or categorization of the applications may come from an approach that splits the applications in the connected car not only by type but also by the connectivity device. This distinction is important because it covers not only the different requirements of the applications, but also suggests taking into account the business or monetary perspective, such as, who is paying for the connectivity and also which connectivity there is actually onboard. This approach also differentiates between the "Embedded Connection", offered by the vehicle's own cellular device, SIM card, operator and service provider, and the smartphone(s) or tablet(s) or smartwatch(es) of the driver or passenger or passengers.

The Applicants have realized that demanding applications may include those of high quality, reliable video streaming which may require relatively a lot of bandwidth, continuously. For example, as video resolution increase, 4K video may require 16-20 mbps even with advanced codecs. There are highly communication-demanding applications forecasted for the vehicular environment. In terms of low latency, these are mostly safety related applications of connectivity by the automatic/autonomous or self-driving vehicle systems, with or towards the systems or units of other vehicle(s) or of the road infrastructures (e.g., a smart/IoT traffic light). These are mostly ad-hoc and even point-to-point, rather than having to go through the service provider infrastructure in the middle. For the rest of the applications, these "not safety" ones mostly require high bandwidth and high continuity. For example, video watching or uploading (including live video from the vehicle); for the passengers' infotainment; many times more than a single passenger; especially demanding are 360 degrees video, Augmented Reality (AR) and Virtual Reality (VR) video. For high-quality immersive experience, a very low latency is desired; latency below 50 ms to the Telco cloud, and latency below 100 ms to the public cloud is desired. The screens used in vehicles range from the small smartphones through tablets size and up to larger and higher definition screens, even in consumer vehicles. Video and data stream from the vehicle sensors, including cameras, LIDAR or others, in cases of emergency, accidents, etc., may similarly require high bandwidth and/or low latency. High volume software download such as updating vehicle processors (Firmware OTA—over the air updates to Firmware), may similarly require high bandwidth, but typically they may be postponed by a few minutes or a few hours. For example, in 6DoF multimedia or video or AR/VR with 6 Degrees of Freedom, the very high variability for this video format ranges between 100 Mbps at the lowest (very small devices and low latency) to 600 Mbps for larger screens and higher latency allowed. Some non-VR 4K streams require a connection of at least 25 Mbps; and some VR video stream in 4K resolution may need a 500 Mbps connection to run fluidly.

The Applicants have realized that the industry should prepare towards these very high bandwidth demands. The Applicants have realized that 5G may not suffice, even in its fully allocated spectrum, complete capacity, and ideal deployment scenarios and usage patterns. Furthermore, ideal utilization of 5G may not be easy to achieve or cannot be achieved at all in certain situations, with many hundreds of cars (or even thousands of cars) per each Cellular cell tower, each car concurrently consuming or requiring many MBPS of data. It is thus expected that 5G connectivity by itself would not suffice to adequately server hundred or thousands of Connected Vehicles located in proximity to each other.

The Applicants have realized that on the demand side, video streaming at good enough resolutions (full HD going up to 4K UHD, 360 degrees and/or Augmented Reality), require a significant bandwidth in a reliable continuous way; whereas on the supply side, it is doubtful that in real deployments these performance requirements will be met by 5G operators for moving vehicles or other transport means.

The Applicants have realized that a traditional way to increase cellular performance has been to increase the technological performance of the networks. The networks technology and deployments have evolved over time, providing increased and more stable performance. However, the Applicants have realized that this is not enough; even if the peak performance can be reached and may be sometimes suitable, fluctuations due to dynamic consumption, RF and propagation issues (even more so with the higher GHz spectrum), and vehicular mobility may cause uncontrollable and hugely spread service and performance variations. In fact, the higher the possible peak, the higher the possible fluctuation; particularly as we go out of the lab and into the real mass-market world. For applications that need continuous performance with high QoS or high QoE, the 5G network is non-comforting and not sufficient; such fluctuations are inherent to this wireless unguaranteed connection and its quantitatively forecast even in 5G networks.

In accordance with the present invention, a new approach in wireless connectivity may provide a solution, utilizing diversity with multi-link, multi-connectivity; by adding a diversity dimension to mitigate these risks and ongoing momentary performance changes, while also adding or augmenting overall performance Using multiple connections or links, that are available, in conjunction or in coordination in an aggregated or "bonded" manner, provides more bandwidth and more stability.

The multi-link solution of the present invention means that the same end device uses multiple links for its communications. A demonstrative categorization of the various multi-link options may be: (1) "Replicate": Deliver the same content duplicated on all the links; (2) "Switching": Sending the content on one link and then switching between links in a fail-over mechanism or due to other reasons; (3) "Load balancing": balance the content between all links so that each data flow, or IP destination, or application, use one of the links, not necessarily mutually-exclusively; (4) "Bonding": Treat all available links as a single virtual broadband connection (or channel, or link), and split or divide or distribute the content (e.g., the packets to be transferred) between all available links dynamically at each moment according to the performance of each of the links and the total available goodput or throughput.

Some systems may use dual networks "hybrid" communications system, for example, for video streaming. However, they utilize alternatives of #1, #2 or #3 above. For example a hybrid communication approach may be based on 4G/LTE and the IEEE 802.11p/DSRC technologies to support a V2X video streaming application. That approach is about selecting the best RAT, whereas bonding is about using all available RATs, in a "proper" manner, so that not only we achieve reliability and fall back as in the first approaches, but also the highest possible throughput and service continuity for all applications.

Multi-link Bonding is not carrier aggregation, which is done at the PHY/MAC layer. Bonding is a transport/application layer technology. It means using multiple links, connections, modems, transceivers, operators, and/or technologies simultaneously together. Data is transported via or by splitting it (distributing it, dividing it) over the multiplicity of links according to their momentary performance and the momentary requirements of each application and of the total. The momentary performance may be derived indirectly from low layers parameters such as RF related (Ec/Io, Tx power, RSSI etc), or directly—using various techniques to measure transport and even application level parameters such as end-to-end latency, error rates, bandwidth etc. The direct measurements are much more respective of and in correlation with the experienced application(s) QoS. At the receiving end, which is an IP address, the packets are reassembled, re-ordered as needed, and then forwarded to their destination (or otherwise consumed or processed, such as by a vehicular media system). Packet losses over the links may be overcome at this transport/application level using mechanisms such as dynamic FEC or retransmissions of lost/missing/erroneous packets.

In a demonstrative embodiment of the present invention, steps in the bonding IP layer are: (1) Real time continuous evaluation of the changing performance at the application level of each of the links; (2) Evaluation of the total performance (mainly total "goodput" or throughput) at each point in time; (3) Dynamic splitting of and transmit/receive the stream of content-to-be-delivered on all available links according to the performance of each of them; (4) For live video it is possible to add an integrated video encoder which outputs a live encoded video stream that adaptively matches the momentary "total performance" (i.e., the aggregate performance of the multiplicity of the bonded links).

In a demonstrative embodiment, a data-consuming device (e.g., a vehicular media system, a passenger tablet or smartphone, or the like) is connected (e.g., wireless and/or via a wire or cable) to, or comprises, a multi-link/bonding unit or module; which in turn is able to receive packets from (or transmit packets to) multiple transceivers, of that device and/or of other devices, such links may be of different types (e.g., Wi-Fi, cellular, satellite) or may be of different operators (e.g., cellular network A, cellular network B, cellular network B) or may be of different quality or bandwidth (e.g., cellular 3G, cellular 4G, cellular 4G-LTE, cellular 5G); which in turn may receive packets from (or transmit packets to) a server-side data bridge gateway which may be able to support or server numerous end-units (e.g., 100 or 500 end-units supported by each such server-side gateway). The bonding unit or module at the viewing user side communicates with the bonding Gateway which is on the core network or even remotely, at the service provider, Telco or the cloud. These two entities exchange information about the performance of each of the links. The content transmitted from the Gateway down to the device in the vehicle is split over all (or some) of the available links, operators, technologies or IP routes according to their momentary performance. The content is then re-assembled at (or near) the data-consuming device, for playback or other consumption or processing.

Splitting the data over a multiplicity of links is a form of diversity that brings advantages such as: bandwidth—the sum of all links; reliability—overcoming failures (e.g. coverage, deployments, congestion, RF and interferences issues, limited capacity, etc.; and mobility—reliability even when on the move. These benefits are especially important to the most demanding applications, those that are also very important to both users and operators—such as high-quality streaming video delivery. These applications need consistent and reliable performance over a relatively long period of time ("continuity") and at high bandwidth. Bonding of multiple links can satisfy these requirements. For the passengers in the connected car, or personal drone, let alone when several passengers travel in the same vehicle or in high volume traffic conditions or in mass transportation, enjoying 3D video, AR/VR multimedia items, 4K streaming video, and also uploading such content, even more so live or in real time, the bonding may be a key enabler and differentiator that turns a potentially low QoS/QoE service into a high-quality reality.

The system may be constructed to take into account the various requirements of its components; utilization of multiple SIMs/subscribers/data packages, and payment for them; optionally using a dedicated device that contains multiple modems or transceivers, of one or more technology types; the optional Gateway in the core or cloud that performs the server side operations of the multi-link connectivity, reassembly/disassembly of data stream into packets and routing or re-routing to (or through) the public Internet network.

Commuting in cars offer a unique opportunity to enjoy the benefits of multi-link bonding while not loading the user with any additional SIM costs. Some cars are already equipped with a cellular modem and a SIM card/data package, and even more so in the future as connectivity becomes more important for the car functionality and the service provider operations than its current main function as a benefit for the driver, and since the passenger or passengers have their own cellular devices, then bonding all of these devices virtually together becomes attractive and efficient. The vehicle need not be limited to utilization of its own cellular SIM card or 802.11p connection; particularly if there is no coverage or a low-quality connection, or if the bandwidth is lower than the need for its functionality. The passenger can make use of the car's cellular connection in order to add coverage, bandwidth, reliability and consistency to the passenger's own device when he wants to watch a movie or upload video.

Bonding the cellular device of the car and of the passenger, or passengers, as well as any other IP-based connection, may be implemented by a software tethering layer in the vehicle device or as an aftermarket cellular device, or a USB cable or port or docking station. Tethering can be done where the Access Point is either one of any of the devices, or where the bonding layer runs, or on another unit or layer that may act as a hub. For example, the vehicle processor can be the Access Point to which the passenger or passengers smartphones are tethered. Alternatively, one of the passengers smartphones may run the bonding software and be the Access Point to which the vehicle modem or modems are tethered, or otherwise connected. In some markets, if they remain or adequately evolve, such as the Recreational Vehicle (RV) markets in North America (homes-on-wheels used to travel the continent) which have satellite connectivity, bonding can also aggregate these links, with cost-related utilization policies.

A bonding software in the vehicle device can aggregate any opt-in other IP link, be it a passenger smartphone, a child's tablet, an aftermarket cellular access point, a satellite modem, a 802.11p/DSRC connection, or any other. It can then implement and enforce various policy-based bonding of using the most appropriate combination of these links, and dividing the IP load over them as best fits the users' needs, the application needs, the overall networks capabilities and needs, and the service provider needs, as well as other criteria (e.g., the cost per transmitting a megabyte of data over each of the available links) In some embodiments, no additional data cost occurs, as the bonding agent may selectively utilize cheaper links from the available pool of links, or links that are associated with unlimited quota of data transfer, or links that are below N percent of their quota of free data transfer. On the contrary, usage costs may even be reduced or avoided, if excess transport of data (downstream and/or upstream) is cleverly diverted by the bonding/multi-link agent(s) to other cost-efficient connections or links Optionally, a bonding software or module in the vehicular device, or in any other device such as the passenger handheld device, may aggregate any opted-in links.

Policies used by the bonding software or devices may be based on performance of each link, and/or the total performance, and/or the requirements of each application, and/or the costs of using each link and/or other preferences such as of the user or of the owner of the vehicle or of the service provider. The information and real time or near real time data about each link and/or the whole network or a multiplicity of links may be monitored by the bonding software or device, and/or may be reported in real time or near real time by a relevant network element or software interface such as the modem software or the core network interface over dedicated or broadcast channel or any other network element, and/or may be reported by any proxy such as from another vehicle coming from the destination or opposite direction which has just monitored and measured the performance of any relevant (or irrelevant) link in the area it is coming from, or may be relayed from other vehicles that were in that area, and is now sharing this information with on-going traffic or any other traffic so that a real time or near real time map of communications links performances is created and shared. Sharing the data can be done over or using a wireless link different than the one belonging to the network or operator or technology being reported on; such as used for closer range, for example, 802.11/DSRC V2X or V2V or others, and/or such information and data may be known in advance to the bonding software or device either from its own previous experiences or from others reported or downloaded to it.

The Applicants have realized that with the increased demand for reliable and consistent data streams in vehicular and other transport applications, both for user-centric applications and for vehicular ones, even the 5G cellular connection performance may prove unsatisfactory. Bonding all the IP connections and devices in the car—the car's own cellular modem and SIM, the passenger(s) devices and SIMs using wireless tethering and/or wired tethering, the car 802.11p connection or its satellite connection—may deliver the best of all worlds, generating reliable, top-coverage, high bandwidth consistent performance basis for various applications that include immersive video, multi-sensorial machine and user experiences, and other applications. It may not require adding expensive infrastructure, towers, spectrum, or other sunk investments; and the end-user need not pay extra for additional data packages to get the best experience possible by smart, optimal combination of all existing resources.

The terms "vehicular unit" or "vehicular element" or "vehicular data-consumption unit" as used herein may comprise, for example, one or more of: a vehicular processor; a vehicular Central Processing Unit (CPU); a vehicular Graphics Processing Unit (GPU); a vehicular Digital Signal Processor (DSP); a vehicular controller; a vehicular Integrated Circuit (IC); a vehicular Application-Specific Integrated Circuit (ASIC); a device or module that is an integral part of a vehicle or of a smart-vehicle or of a connected-vehicle, or that is an add-on to such vehicle; a vehicular transceiver; a vehicular transmitter; a vehicular receiver; a vehicular modem; a vehicular SIM-based communication module; a vehicular communication unit; a vehicular module that receives power from a power source of the vehicle; a vehicular sensor; a vehicular LIDAR; a vehicular camera; a vehicular microphone; a vehicular detector; a vehicular self-driving module or unit; a vehicular assisted-driving unit or module; a vehicular multimedia player; a vehicular multimedia system; a vehicular audio/video player; a vehicular audio-video system; and/or other types of units or modules that are described and/or depicted above or herein and that are located within a vehicle or that are part of a vehicle or that are coupled to a vehicle or that are installed in a vehicle or that are connected to a vehicle or that are connected to any of the vehicle's electronic or mechanical systems or that are operable in conjunction with a vehicle.

In accordance with the present invention, the bonded set of communication links may be utilized in a variety of ways; for example: (1) a single application (e.g., Netflix streaming video) of or in the vehicle, is utilizing two or more different communication links that are bonded, to download into the vehicle packets of a single data-stream of that single application (e.g., a streaming download of a single audio-and-video MP4 data-stream); (2) a single application (e.g., Facebook live-video sharing) of or in the vehicle, is utilizing two or more different communication links that are bonded, to upload from the vehicle packets of a single data-stream of that single application (e.g., a single audio-and-video MP4 data-stream that is uploaded); (3) a single vehicular unit or vehicular module (e.g., an assisted-driving module) of or in the vehicle, is utilizing two or more different communication links that are bonded, to download into the vehicle packets of a single data-stream (e.g., having streaming data that is utilized for assisted driving, and/or having remote commands that are utilized for assisted driving); (4) a single vehicular module or unit (e.g., a LIDAR sensor; or a camera) of or in the vehicle, is utilizing two or more different communication links that are bonded, to upload from the vehicle packets of a single data-stream of that single vehicular unit or module (e.g., a single data-stream of data that is uploaded to a remote recipient or to a remote server); (5) two data-streams, of two different applications and/or of two different vehicular units (e.g., a Netflix stream video application, and an assisted-driving unit) are utilizing the bonded communication connection over multiple transceivers, such that packets of a first data-stream and also packets of the second data-stream are mixed with each other and are distributed or divided or split over the multiple available links for downloading (e.g., some packets of the Netflix stream and some packets of the Assisted-Driving stream are downloaded into the vehicle over a first transceiver; and similarly, some other packets of each stream are downloaded into the vehicle over a second transceiver); (6) similarly, two data-streams, of two different applications and/or vehicular units, are uploaded from the vehicle over multiple transceivers such that packets of a first data-stream and packets of the second data-stream are mixed with each other and are distributed or divided or split over the multiple available links for uploading; and/or other suitable combinations or schemes in which packets of multiple data-streams are distributed, in an unequitable manner, for download and/or for upload, over multiple links or transceivers. (7) Similarly, whereas concurrently, or more or less at the same time, at least one data-stream is downloaded into the vehicle's bonding unit using at least two modems or transceivers or connections that bonded together, and another data-stream is uploaded to a remote IP address or recipient or server using and split over the same (or other) two or more modems or transceivers or IP connections bonded together.

In some embodiments, a system comprises: a vehicular communication bonding unit, to create a bonded wireless communication connection that transports data-packets of a single source data-stream from a remote server to a wireless communication device in the vehicle, by transporting said data-packets that are split over at least two wireless communication links simultaneously; wherein the vehicular communication bonding unit utilizes a vehicular transceiver, that is configured to provide communication services to one or more vehicular units, to receive a first batch of said data-packets of a particular data-stream, over a first cellular communication link that connects between said vehicular cellular transceiver and the remote server that transmits said particular data-stream; wherein the vehicular communication bonding unit utilizes at least one mobile end-user device of an occupant of a vehicle, to receive a second batch of said data-packets of said particular data-stream, over a second cellular communication link that connects between said mobile end-user device and said remote server.

In some embodiments, the vehicular communication bonding unit utilizes a vehicular satellite transceiver to receive a first batch of said data-packets of a particular data-stream, over a satellite communication link that connects between said vehicular satellite transceiver and the remote server that transmits said particular data-stream; wherein the vehicular communication bonding unit utilizes at least one mobile end-user device of an occupant of a vehicle, to receive a second batch of said data-packets of said particular data-stream, over a cellular communication link that connects between said mobile end-user device and said remote server.

In some embodiments, the vehicular communication bonding unit is associated with a vehicular multimedia player that plays an incoming streaming video, wherein the incoming streaming video is re-assembled at the vehicular bonding unit by an assembly engine that receives packets from at least: (i) a first wireless transceiver that wirelessly receives a first batch of said packets of said incoming streaming video, and (ii) a second wireless transceiver that wirelessly receives a second batch of said packets of said incoming streaming video, wherein the first and second wireless transceivers receive said batches of packets concurrently.

In some embodiments, the vehicular communication bonding unit is to allocate to a vehicular wireless transceiver to download a first amount of packets of an incoming transmission; wherein the vehicular communication bonding unit is to allocate to a wireless transceiver of an end-user device within the vehicle to concurrently download a second amount of packets of said incoming transmission, wherein the vehicular communication bonding unit is to re-assemble a single data-stream, that belongs to a single application, from said first amount of packets and said second amount of packets.

In some embodiments, the vehicular communication bonding unit is to inequitably allocate packets of an incoming data-stream to be downloaded by a set of wireless transceivers that comprise at least: (i) a vehicular transceiver, and (ii) a transceiver of a mobile device of a passenger of the vehicle.

In some embodiments, a vehicular data-consumption unit receives packets, of an incoming data stream, from both: (i) a vehicular wireless transceiver, and (ii) a cellular transceiver of a mobile electronic device of an occupant of the vehicle; wherein the mobile electronic device of the occupant of the vehicle receives said packets from a remote server over a cellular communication link, and transmits said packets to said vehicular data-consumption unit over a short-range wireless communication link.

In some embodiments, the system further comprises: a cellular hand-off predictor unit, (i) to estimate in advance an upcoming cellular hand-off in one or more available cellular connections, and (ii) to trigger via said vehicular communication bonding unit an excess download of packets prior to said upcoming cellular hand-off, wherein said packets are intended for consumption during said cellular hand-off.

In some embodiments, the system further comprises: a cellular hand-off predictor unit, (i) to estimate in advance an upcoming cellular hand-off in one or more available cellular connections, and (ii) to selectively reduce the amount of data-traffic that is transferred over said one or more available cellular connections during the estimated upcoming cellular hand-off.

In some embodiments, the system further comprises: an upload/download adjustment unit, (I) to adjust a packet transport rate of a vehicular transceiver based on measured performance characteristics of said vehicular transceiver, and also (II) to adjust a packet transport rate of a transceiver of a mobile device of an occupant of the vehicle, based on measured performance characteristics of said transceiver of said mobile device of said occupant of the vehicle.

In some embodiments, the system further comprises: an upload/download adjustment unit, (I) to adjust a packet transport rate of a vehicular transceiver based on predicted performance characteristics of said vehicular transceiver, and also (II) to adjust a packet transport rate of a transceiver of a mobile device of an occupant of the vehicle, based on predicted performance characteristics of said transceiver of said mobile device of said occupant of the vehicle.

In some embodiments, the system further comprises: a bandwidth query controller to query with a cellular network element about available or expected bandwidth for data transport for at least one cellular transceiver of said vehicle, and to receive a response indicating the available bandwidth.

In some embodiments, based on said response, a link reservation unit is to reserve a wireless communication link that guarantees at least a pre-defined throughput for said vehicle during a pre-defined time-slot or while being within a pre-defined geographical area.

In some embodiments, the system further comprises: a link-reservation bidding module to select said wireless communication link out of one or more candidate providers that perform a bidding process to provide said link to said vehicle.

In some embodiments, the system further comprises: a communication map generator to generate a representation of a geographical map indicating available bandwidth at various route-segments.

In some embodiments, the system further comprises: a communication map generator to generate a representation of a geographical map indicating available bandwidth at various route-segments, and indicating for at least one route-segment a total available bandwidth that is estimated to be available to a particular vehicle that utilizes a bonded set of multiple communication links.

In some embodiments, the system further comprises: a communication map generator to generate a representation of a geographical map indicating at least one of: (i) available bandwidth, (ii) reliability, (iii) latency, that characterizes various route-segments, with regard to one or more wireless communication networks that have coverage in at least one of said various route-segments.

In some embodiments, the system further comprises: a communication map generator to generate a representation of a geographical map indicating, for at least one route-segment, for at least one of down-stream communication and up-stream communication, at least one of: (i) an estimated total bandwidth that is estimated to be available by utilizing a particular bonded set of wireless communication links, (ii) an estimated maximum latency that is measured or that is derived from measured data, (iii) an estimated minimum latency that is measured or that is derived from measured data, (iv) an estimated maximum error rate that is measured or that is derived from measured data, (v) an estimated minimum error rate that is measured or that is derived from measured data.

In some embodiments, the system further comprises: a communication map generator to generate a map indicating bandwidth that is available for a particular application at various route-segments during one or more time-slots.

In some embodiments, the system further comprises: a communication map generator to generate a map which indicates, (i) that at a first route-segment a particular application is expected to have sufficient bandwidth, and (ii) that at a second route-segment said particular application is expected to have insufficient bandwidth.

In some embodiments, the system further comprises: a vehicle route modification unit, to modify a suggested route of motion of said vehicle, based on the estimated bandwidth that is estimated to be available to said vehicle at various route-segments.

In some embodiments, the system further comprises: a vehicle route modification unit, to modify a suggested route of motion of said vehicle towards a destination point, by replacing (I) a first route-segment that is estimated to provide to said vehicle a first bandwidth, with (II) a second route-segment, which is longer than the first route-segment, but which is expected to provide to said vehicle a second bandwidth that is greater than said first bandwidth.

In some embodiments, the system further comprises: a Virtual SIM credentials obtainer module, to obtain from a remote server a set of Virtual SIM credentials that enables a transceiver within said vehicle to be serviced ad hoc by a cellular network that did not previously service said transceiver.

In some embodiments, the system further comprises: a vehicular prioritizing unit, to enforce an order of priority of servicing two or more vehicular applications that consume bandwidth, by allocating to each one of said vehicular applications, a portion of a total available from that is available through an aggregated virtual multi-link communication connection that is used by said vehicle communication system.

In some embodiments, the system further comprises: an opt-in module to selectively add to a virtual broadband connection of said vehicle, only mobile end-user devices that opt-in to participate in and to contribute at least one of uplink bandwidth and downlink bandwidth to said virtual broadband connection of said vehicle.

In some embodiments, the system further comprises: a vehicular cellular receiver, to receive a first batch of data packets over a first cellular link; an occupant device having a cellular receiver, to receive a second batch of data packets over a second cellular link; a data consumption unit, located within said vehicle, to receive said first batch of data packets from said vehicular cellular receiver, and also to receive said second batch of data packets from the occupant device over a local intra-vehicle short-range wireless link.

In some embodiments, the system further comprises: a vehicular cellular receiver, to receive a first batch of data packets over a first cellular link; an occupant device having a cellular receiver, to receive a second batch of data packets over a second cellular link; a data consumption unit, located within said vehicle, to receive said first batch of data packets from said vehicular cellular receiver, and also to receive said second batch of data packets from the occupant device over a local intra-vehicle Bluetooth link.

In some embodiments, the system further comprises: a vehicular cellular receiver, to receive a first batch of data packets over a first cellular link; an occupant device having a cellular receiver, to receive a second batch of data packets over a second cellular link; a data consumption unit, located within said vehicle, to receive said first batch of data packets from said vehicular cellular receiver, and also to receive said second batch of data packets from the occupant device over a wired link.

In some embodiments, the system is a self-driving vehicle which comprises said vehicular communication bonding unit, and which further comprises: a route navigation unit for navigating autonomous driving of said self-driving vehicle, wherein the route navigation unit is to select a particular route towards a destination point based also on the communication bandwidth that is estimated to be available to sad self-driving vehicle along said particular route.

In some embodiments, said bonded wireless communication connection also transports to a remote recipient data-packets of a broadband data-stream of a Light Detection and Ranging (LIDAR) sensor of said vehicle.

In some embodiments, said bonded wireless communication connection also transports to a remote recipient data-packets of a broadband data-stream that (i) is generated by or in the vehicle or a module or system associated with the vehicle, (ii) is dynamically compressed and encoded in real-time by or in the vehicle prior to transmission, by performing at least one of: dynamic compression or dynamic encoding, that takes into account at least one of: (a) total bandwidth that is available for transmitting and broadband data-stream from said vehicle to said remote recipient over a bonded set of multiple communication links, and (b) bandwidth requirements of one or more other vehicular units or vehicular applications.

In some embodiments, said bonded wireless communication connection transports to a remote recipient data-packets of at least one of: (i) a broadband data-stream of a Light Detection and Ranging (LIDAR) sensor of said vehicle, (ii) a broadband data-stream of a camera of said vehicle; wherein said data-packets, that are transported from said vehicle to said remote recipient, are dynamically compressed and encoded within the vehicle by taking into account at least one of: (a) total bandwidth that is available for transmitting sand broadband data-stream from said vehicle to said remote recipient over a bonded set of multiple communication links, and (b) bandwidth requirements of one or more other vehicular units or vehicular applications.

In some embodiments, said bonded wireless communication connection transports to a remote recipient data-packets of both: (i) a broadband data-stream of a vehicular Light Detection and Ranging (LIDAR) sensor of said vehicle, (ii) a broadband data-stream of a vehicular camera of said vehicle; wherein said data-packets, that are transported from said vehicle to said remote recipient, are dynamically compressed and encoded within the vehicle by taking into account at least one of: (a) total bandwidth that is available for transmitting sand broadband data-stream from said vehicle to said remote recipient over a bonded set of multiple communication links, and (b) bandwidth requirements of one or more other vehicular units or vehicular applications; wherein said data-packets, that are transported from said vehicle to said remote recipient, further comprise one or more synchronization indicators that enable the remote recipient to match between (I) a first particular data-portion from the broadband data-stream of the vehicular LIDAR, and (II) a second particular data-portion from the broadband data-stream of the vehicular camera, wherein the first and second particular data-portions relate to a concurrent time-slot.

In some embodiments, said data-packets further comprise at least one of: (i) an indicator of a vehicular location of said vehicular LIDAR, (ii) an indicator of a vehicular location of said vehicular camera, (iii) an indication of an angular orientation of said vehicular LIDAR, (iv) an indication of an angular orientation of said vehicular camera.

In some embodiments, said vehicular communication bonding unit is associated with a vehicular driving unit able to receive, from a remote source, commands that remotely drive said vehicle.

In some embodiments, said vehicular communication bonding unit is associated with a vehicular driving unit, that is able to assist in driving said vehicle, and that is able to receive from a remote source one or more driving commands that are transmitted to the vehicle over one or more of the available communication links which have the lowest momentary latency; wherein the vehicular communication bonding unit is configured to disregard packets having the same ID identifiers which are received more than once over any subset of the available communication links.

In some embodiments, said vehicular communication bonding unit is to transport from said vehicle to a remote recipient, concurrently and via a bonded set of multiple communication links, a first data-stream of a first application and a second data-stream or a second application; wherein said first data-stream is associated with a first priority parameter; wherein said second data-stream is associated with a second priority parameter; wherein, if the first priority parameter is greater than the second priority parameter, then the vehicular communication bonding unit is to (i) pause transport of the second data-stream, and (ii) allocate an increased bandwidth to the transport of the first data-stream.

In some embodiments, said vehicular communication bonding unit is to transport from said vehicle to a remote recipient, concurrently and via a bonded set of multiple communication links, a first data-stream of a first application and a second data-stream or a second application; wherein said first data-stream is associated with a first priority parameter; wherein said second data-stream is associated with a second priority parameter; wherein, if the first priority parameter is greater than the second priority parameter, then the vehicular communication bonding unit is to (i) modify an encoding parameter of the second data-stream to reduce bandwidth consumption of the transport of the second data-stream, and (ii) allocate an increased bandwidth to the transport of the first data-stream.

In some embodiments, said vehicular communication bonding unit is to transport from said vehicle to a remote recipient, concurrently and via a bonded set of multiple communication links, a first data-stream of a first application and a second data-stream or a second application; wherein said first data-stream is associated with a first priority parameter; wherein said second data-stream is associated with a second priority parameter; wherein, if the first priority parameter is greater than the second priority parameter, then the vehicular communication bonding unit is to perform the transport of the first data-stream via one or more transceivers that have a latency that is greater than the latency of one or more other transceivers that are used to transport the second data-stream.

In some embodiments, a communication system for a vehicle comprises: a vehicular communication bonding unit, to create a bonded wireless communication connection that transports data-packets of a data-stream from said vehicle a remote recipient, by transporting said data-packets over at least two wireless communication links simultaneously; wherein the vehicular communication bonding unit utilizes a vehicular transceiver, that is configured to provide wireless communication services to one or more vehicular units, to transmit a first batch of said data-packets of a particular data-stream, over a first cellular communication link that connects between said vehicular cellular transceiver and the remote server that transmits said particular data-stream; wherein the vehicular communication bonding unit utilizes at least one mobile end-user device of an occupant of a vehicle, to transmit a second batch of said data-packets of said particular data-stream, over a second cellular communication link that connects between said mobile end-user device and said remote server. In some embodiments, said bonded wireless communication connection transports to said remote recipient data-packets of a broadband data-stream of a Light Detection and Ranging (LIDAR) sensor of said vehicle. In some embodiments, said bonded wireless communication connection transports to said remote recipient data-packets of at least one of: (i) a broadband data-stream of a Light Detection and Ranging (LIDAR) sensor of said vehicle, (ii) a broadband data-stream of a camera of said vehicle. In some embodiments, said vehicle further comprises a vehicular driving unit able to receive, from said remote recipient, commands that remotely drive said vehicles.

In some embodiments, an apparatus comprises: a route navigation unit for a self-driving vehicle, wherein the route navigation unit is to recommend a particular route towards a destination point based on the communication bandwidth that is estimated to be available to said self-driving vehicle along said particular route. In some embodiments, the apparatus comprises a route-segment selector unit, (a) to determine that a first route segment leads to said destination point; (b) to determine that a second, alternate, route segment also leads to said destination point; (c) to estimate that a first communication bandwidth will be available to said self-driving vehicle along the first route-segment; (d) to estimate that a second communication bandwidth will be available to said self-driving vehicle along the second route segment; (e) to determine that the first communication bandwidth is greater than the second communication bandwidth; (f) based on the determining of step (e), to command said self-driving vehicle to drive through the first route-segment and not through the second alternate route-segment.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic sensor(s), optical sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Rust, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
   a vehicular bonding/multi-link agent unit, configured to operate as a part of a vehicle,
      and configured to receive vehicular data that is captured by a particular Vehicular Sensor which is one of: (i) a vehicular camera of said vehicle, (ii) a vehicular microphone of said vehicle, (iii) a vehicular LIDAR of said vehicle, (iv) another type of vehicular sensor of said vehicle,
      and configured to generate from data sensed by said particular Vehicular Sensor, a vehicular sensor data-stream of packets,
      and further configured to create a bonded wireless communication connection that transports data-packets of said vehicular sensor data-stream of packets from said vehicle to a remote server via multiple-links wireless communication, by uploading some data-packets of said vehicular sensor data-stream via a vehicular transceiver that is an integrated component of said vehicle, and by simultaneously uploading some other data-packets of said vehicular senor data-stream via a transceiver of a mobile electronic device that is held and operated by an occupant of said vehicle;
   wherein the mobile electronic device of said occupant, and the vehicular transceiver of said vehicle, operate in concert to simultaneously upload different packets of said same vehicular sensor data-stream that carry information sensed by said particular Vehicular Sensor, based on a packet distribution scheme that takes into account at least: (a) current available uploading bandwidth of said vehicular transceiver, and (b) available uploading bandwidth of said mobile electronic device of said occupant, and (c) current latency of wireless communication of said vehicular transceiver, and (d) current latency of wireless communication of said mobile electronic device of said occupant;
   wherein said vehicular bonding/multi-link agent unit is configured to transport from said vehicle to a remote recipient, concurrently and via a bonded set of multiple communication links, a first data-stream of a first application and a second data-stream or a second application;
   wherein said first data-stream is associated with a first priority parameter;
   wherein said second data-stream is associated with a second priority parameter;
   wherein, if the first priority parameter is greater than the second priority parameter, then the vehicular bonding/multi-link agent unit is to (i) pause an ongoing transport of an ongoing transmission session of the second data-stream which is associated with the second priority parameter, and (ii) allocate an increased bandwidth to transport of the first data-stream that is associated with the first priority parameter.

2. The system of claim 1,
   wherein the vehicular bonding/multi-link agent unit utilizes a vehicular satellite transceiver to receive a first batch of said data-packets of a particular data-stream, over a satellite communication link that connects between said vehicular satellite transceiver and the remote server that transmits said particular data-stream;
   wherein the vehicular communication bonding unit utilizes at least one mobile end-user device of an occupant of a vehicle, to receive a second batch of said data-packets of said particular data-stream, over a cellular communication link that connects between said mobile end-user device and said remote server.

3. The system of claim 1,
   wherein the vehicular bonding/multi-link agent unit is associated with a vehicular multimedia player that plays an incoming streaming video,
   wherein the incoming streaming video is re-assembled at the vehicular bonding/multi-link agent unit by an assembly engine that receives packets from at least:
   (i) a first wireless transceiver that wirelessly receives a first batch of said packets of said incoming streaming video, and (ii) a second wireless transceiver that wirelessly receives a second batch of said packets of said incoming streaming video, wherein the first and second wireless transceivers receive said batches of packets concurrently.

4. The system of claim 1,
   wherein the vehicular bonding/multi-link agent unit is to allocate to a vehicular wireless transceiver to download a first amount of packets of an incoming transmission,
   wherein the vehicular bonding/multi-link agent unit is to allocate to a wireless transceiver of an end-user device within the vehicle to concurrently download a second amount of packets of said incoming transmission,
   wherein the vehicular bonding/multi-link agent unit is to re-assemble a single data-stream, that belongs to a single application, from said first amount of packets and said second amount of packets.

5. The system of claim 1,
wherein the vehicular bonding/multi-link agent unit is to inequitably allocate packets of an incoming data-stream to be downloaded by a set of wireless transceivers that comprise at least: (i) a vehicular transceiver, and (ii) a transceiver of a mobile device of a passenger of the vehicle.

6. The system of claim 1,
wherein a vehicular data-consumption unit receives packets, of an incoming data stream, from both: (i) a vehicular wireless transceiver, and (ii) a cellular transceiver of a mobile electronic device of an occupant of the vehicle,
wherein the mobile electronic device of the occupant of the vehicle receives said packets from a remote server over a cellular communication link, and transmits said packets to said vehicular data-consumption unit over a short-range wireless communication link.

7. The system of claim 1, further comprising:
a cellular hand-off predictor unit, (i) to estimate in advance an upcoming cellular hand-off in one or more available cellular connections, and (ii) to trigger via said vehicular bonding/multi-link agent unit an excess download of packets prior to said upcoming cellular hand-off, wherein said packets are intended for consumption during said cellular hand-off.

8. The system of claim 1, further comprising:
a cellular hand-off predictor unit, (i) to estimate in advance an upcoming cellular hand-off in one or more available cellular connections, and (ii) to selectively reduce the amount of data-traffic that is transferred over said one or more available cellular connections during the estimated upcoming cellular hand-off.

9. The system of claim 1, further comprising:
an upload/download adjustment unit, (I) to adjust a packet transport rate of a vehicular transceiver based on measured performance characteristics of said vehicular transceiver, and also (II) to adjust a packet transport rate of a transceiver of a mobile device of an occupant of the vehicle, based on measured performance characteristics of said transceiver of said mobile device of said occupant of the vehicle.

10. The system of claim 1, further comprising:
an upload/download adjustment unit, (I) to adjust a packet transport rate of a vehicular transceiver based on predicted performance characteristics of said vehicular transceiver, and also (II) to adjust a packet transport rate of a transceiver of a mobile device of an occupant of the vehicle, based on predicted performance characteristics of said transceiver of said mobile device of said occupant of the vehicle.

11. The system of claim 1, further comprising:
a bandwidth query controller to query with a cellular network element about available or expected bandwidth for data transport for at least one cellular transceiver of said vehicle, and to receive a response indicating the available bandwidth.

12. The system of claim 11,
wherein based on said response, a link reservation unit is to reserve a wireless communication link that guarantees at least a pre-defined throughput for said vehicle during a pre-defined time-slot or while being within a pre-defined geographical area.

13. The system of claim 12, further comprising:
a link-reservation bidding module to select said wireless communication link out of one or more candidate providers that perform a bidding process to provide said link to said vehicle.

14. The system of claim 1, further comprising:
a communication map generator to generate a representation of a geographical map indicating available bandwidth at various route-segments.

15. The system of claim 1, further comprising:
a communication map generator to generate a representation of a geographical map indicating available bandwidth at various route-segments, and indicating for at least one route-segment a total available bandwidth that is estimated to be available to a particular vehicle that utilizes a bonded set of multiple communication links.

16. The system of claim 1, further comprising:
a communication map generator to generate a representation of a geographical map indicating at least one of: (i) available bandwidth, (ii) reliability, (iii) latency, that characterizes various route-segments, with regard to one or more wireless communication networks that have coverage in at least one of said various route-segments.

17. The system of claim 1, further comprising:
a communication map generator to generate a representation of a geographical map indicating, for at least one route-segment, for at least one of down-stream communication and up-stream communication, at least one of: (i) an estimated total bandwidth that is estimated to be available by utilizing a particular bonded set of wireless communication links, (ii) an estimated maximum latency that is measured or that is derived from measured data, (iii) an estimated minimum latency that is measured or that is derived from measured data, (iv) an estimated maximum error rate that is measured or that is derived from measured data, (v) an estimated minimum error rate that is measured or that is derived from measured data.

18. The system of claim 1, further comprising:
a communication map generator to generate a map indicating bandwidth that is available for a particular application at various route-segments during one or more time-slots.

19. The system of claim 1, further comprising:
a communication map generator to generate a map which indicates, (i) that at a first route-segment a particular application is expected to have sufficient bandwidth, and (ii) that at a second route-segment said particular application is expected to have insufficient bandwidth.

20. The system of claim 1, further comprising:
a vehicle route modification unit, to modify a suggested route of motion of said vehicle, based on the estimated bandwidth that is estimated to be available to said vehicle at various route-segments.

21. The system of claim 1, further comprising:
a vehicle route modification unit, to modify a suggested route of motion of said vehicle towards a destination point, by replacing (I) a first route-segment that is estimated to provide to said vehicle a first bandwidth, with (II) a second route-segment, which is longer than the first route-segment, but which is expected to provide to said vehicle a second bandwidth that is greater than said first bandwidth.

22. The system of claim 1, further comprising:
a Virtual SIM credentials obtainer module, to obtain from a remote server a set of Virtual SIM credentials that enables a transceiver within said vehicle to be serviced ad hoc by a cellular network that did not previously service said transceiver.

23. The system of claim 1, further comprising:
a vehicular prioritizing unit, to enforce an order of priority of servicing two or more vehicular applications that consume bandwidth, by allocating to each one of said vehicular applications, a portion of a total available from that is available through an aggregated virtual multi-link communication connection that is used by said vehicle communication system.

24. The system of claim 1, further comprising:
an opt-in module to selectively add to a virtual broadband connection of said vehicle, only mobile end-user devices that opt-in to participate in and to contribute at least one of uplink bandwidth and downlink bandwidth to said virtual broadband connection of said vehicle.

25. The system of claim 1, further comprising:
a vehicular cellular receiver, to receive a first batch of data packets over a first cellular link;
an occupant device having a cellular receiver, to receive a second batch of data packets over a second cellular link;
a data consumption unit, located within said vehicle, to receive said first batch of data packets from said vehicular cellular receiver, and also to receive said second batch of data packets from the occupant device over a local intra-vehicle short-range wireless link.

26. The system of claim 1, further comprising:
a vehicular cellular receiver, to receive a first batch of data packets over a first cellular link;
an occupant device having a cellular receiver, to receive a second batch of data packets over a second cellular link;
a data consumption unit, located within said vehicle, to receive said first batch of data packets from said vehicular cellular receiver, and also to receive said second batch of data packets from the occupant device over a local intra-vehicle Bluetooth link.

27. The system of claim 1, further comprising:
a vehicular cellular receiver, to receive a first batch of data packets over a first cellular link;
an occupant device having a cellular receiver, to receive a second batch of data packets over a second cellular link;
a data consumption unit, located within said vehicle, to receive said first batch of data packets from said vehicular cellular receiver, and also to receive said second batch of data packets from the occupant device over a wired link.

28. The system of claim 1,
wherein the system is a self-driving vehicle which comprises said vehicular bonding/multi-link agent unit, and which further comprises:
a route navigation unit for navigating autonomous driving of said self-driving vehicle,
wherein the route navigation unit is to select a particular route towards a destination point based also on the communication bandwidth that is estimated to be available to said self-driving vehicle along said particular route.

29. The system of claim 1,
wherein said bonded wireless communication connection also transports to a remote recipient data-packets of a broadband data-stream of a Light Detection and Ranging (LIDAR) sensor of said vehicle.

30. The system of claim 1,
wherein said bonded wireless communication connection also transports to a remote recipient data-packets of a broadband data-stream that (i) is generated by or in the vehicle or a module or system associated with the vehicle, (ii) is dynamically compressed and encoded in real-time by or in the vehicle prior to transmission, by performing at least one of: dynamic compression or dynamic encoding, that takes into account at least one of: (a) total bandwidth that is available for transmitting and broadband data-stream from said vehicle to said remote recipient over a bonded set of multiple communication links, and (b) bandwidth requirements of one or more other vehicular units or vehicular applications.

31. The system of claim 1,
wherein said bonded wireless communication connection transports to a remote recipient data-packets of at least one of: (i) a broadband data-stream of a Light Detection and Ranging (LIDAR) sensor of said vehicle, (ii) a broadband data-stream of a camera of said vehicle,
wherein said data-packets, that are transported from said vehicle to said remote recipient, are dynamically compressed and encoded within the vehicle by taking into account at least one of: (a) total bandwidth that is available for transmitting sand broadband data-stream from said vehicle to said remote recipient over a bonded set of multiple communication links, and (b) bandwidth requirements of one or more other vehicular units or vehicular applications.

32. The system of claim 1,
wherein said bonded wireless communication connection transports to a remote recipient data-packets of both: (i) a broadband data-stream of a vehicular Light Detection and Ranging (LIDAR) sensor of said vehicle, (ii) a broadband data-stream of a vehicular camera of said vehicle;
wherein said data-packets, that are transported from said vehicle to said remote recipient, are dynamically compressed and encoded within the vehicle by taking into account at least one of: (a) total bandwidth that is available for transmitting sand broadband data-stream from said vehicle to said remote recipient over a bonded set of multiple communication links, and (b) bandwidth requirements of one or more other vehicular units or vehicular applications;
wherein said data-packets, that are transported from said vehicle to said remote recipient, further comprise one or more synchronization indicators that enable the remote recipient to match between (I) a first particular data-portion from the broadband data-stream of the vehicular LIDAR, and (II) a second particular data-portion from the broadband data-stream of the vehicular camera, wherein the first and second particular data-portions relate to a concurrent time-slot.

33. The system of claim 32,
wherein said data-packets further comprise at least one of: (i) an indicator of a vehicular location of said vehicular LIDAR, (ii) an indicator of a vehicular location of said vehicular camera, (iii) an indication of an angular orientation of said vehicular LIDAR, (iv) an indication of an angular orientation of said vehicular camera.

34. The system of claim 1,
wherein said vehicular bonding/multi-link agent unit is associated with a vehicular driving unit able to receive, from a remote source, commands that remotely drive said vehicle.

35. The system of claim 1,
wherein said vehicular bonding/multi-link agent unit is associated with a vehicular driving unit, that is able to assist in driving said vehicle, and that is able to receive from a remote source one or more driving commands that are transmitted to the vehicle over one or more of the available communication links which have the lowest momentary latency; wherein the vehicular bonding/multi-link agent unit is configured to disregard packets having the same ID identifiers which are received more than once over any subset of the available communication links.

36. The system of claim 1,
wherein said vehicular bonding/multi-link agent unit is to transport from said vehicle to a remote recipient, concurrently and via a bonded set of multiple communication links, a first data-stream of a first application and a second data-stream or a second application;
wherein said first data-stream is associated with a first priority parameter;
wherein said second data-stream is associated with a second priority parameter;
wherein, if the first priority parameter is greater than the second priority parameter, then the vehicular bonding/multi-link agent unit is to (i) modify an encoding parameter of the second data-stream to reduce bandwidth consumption of the transport of the second data-stream, and (ii) allocate an increased bandwidth to the transport of the first data-stream.

37. The system of claim 1,
wherein said vehicular bonding/multi-link agent unit is to transport from said vehicle to a remote recipient, concurrently and via a bonded set of multiple communication links, a first data-stream of a first application and a second data-stream or a second application;
wherein said first data-stream is associated with a first priority parameter;
wherein said second data-stream is associated with a second priority parameter;
wherein, if the first priority parameter is greater than the second priority parameter, then the vehicular bonding/multi-link agent unit is to perform the transport of the first data-stream via one or more transceivers that have a latency that is greater than the latency of one or more other transceivers that are used to transport the second data-stream.

38. A method,
that is implemented via a vehicular bonding/multi-link agent unit which operates as a part of a vehicle, the method comprising:
(A) at said vehicular bonding/multi-link agent unit,
receiving vehicular data that is captured by a particular Vehicular Sensor which is one of: (i) a vehicular camera of said vehicle, (ii) a vehicular microphone of said vehicle, (iii) a vehicular LIDAR of said vehicle, (iv) another type of vehicular sensor of said vehicle;
(B) at said vehicular bonding/multi-link agent unit,
generating, from data sensed by said particular Vehicular Sensor, a vehicular sensor data-stream of packets; and creating a bonded wireless communication connection that transports data-packets of said vehicular sensor data-stream of packets from said vehicle to a remote server via multiple-links wireless communication, by uploading some data-packets of said vehicular sensor data-stream via a vehicular transceiver that is an integrated component of said vehicle, and by simultaneously uploading some other data-packets of said vehicular sensor data-stream via a transceiver of a mobile electronic device that is held and operated by an occupant of said vehicle;
(C) configuring, via at said vehicular bonding/multi-link agent unit, the mobile electronic device of said occupant and the vehicular transceiver of said vehicle, to operate in concert to simultaneously upload different packets of said same vehicular sensor data-stream that carry information sensed by said particular Vehicular Sensor, based on a packet distribution scheme that takes into account at least: (a) current available uploading bandwidth of said vehicular transceiver, and (b) available uploading bandwidth of said mobile electronic device of said occupant, and (c) current latency of wireless communication of said vehicular transceiver, and (d) current latency of wireless communication of said mobile electronic device of said occupant;
(D) at said vehicular bonding/multi-link agent unit, transporting from said vehicle to a remote recipient, concurrently and via a bonded set of multiple communication links, a first data-stream of a first application and a second data-stream or a second application;
wherein said first data-stream is associated with a first priority parameter;
wherein said second data-stream is associated with a second priority parameter;
wherein, if the first priority parameter is greater than the second priority parameter, then the vehicular bonding/multi-link agent unit is to (i) pause an ongoing transport of an ongoing transmission session of the second data-stream which is associated with the second priority parameter, and (ii) allocate an increased bandwidth to transport of the first data-stream that is associated with the first priority parameter.

\* \* \* \* \*